United States Patent [19]

Matsushima et al.

[11] Patent Number: 5,696,999
[45] Date of Patent: Dec. 9, 1997

[54] IMAGE VIBRATION REDUCTION DEVICE

[75] Inventors: Jun Matsushima, Yokohama; Tadashi Otani, Ohtawara; Sueyuki Ohishi, Tokyo, all of Japan

[73] Assignee: Nikon Corporation, Tokyo, Japan

[21] Appl. No.: 712,550

[22] Filed: Sep. 11, 1996

[30] Foreign Application Priority Data

Sep. 12, 1995 [JP] Japan .................. 7-234511
Sep. 14, 1995 [JP] Japan .................. 7-237483
Sep. 14, 1995 [JP] Japan .................. 7-262201

[51] Int. Cl.$^6$ .................. G03B 5/00; G02B 27/64
[52] U.S. Cl. .................. 396/55; 359/554
[58] Field of Search .................. 396/52, 55; 348/208; 359/554

[56] References Cited

U.S. PATENT DOCUMENTS 5,585,884  12/1996  Onuki .................. 396/55 X

FOREIGN PATENT DOCUMENTS 2-66535    3/1990   Japan .
4-301822  10/1992   Japan .

Primary Examiner—W. B. Perkey

[57] ABSTRACT

An image vibration reduction device for reducing an image vibration on an imaging surface includes a vibration reduction optical system movable to reduce the image vibration and constituting part of an imaging optical system, and a vibration reduction optical system displacement detector including a light-emission unit and a light-reception unit using an optical position detection element to optically detect a change in position of the vibration reduction optical system. The device also includes a light-emission amount automatic adjustment means for adjusting a light-emission amount of the light-emission unit at a predetermined time on the basis of an output from the light-reception unit.

60 Claims, 59 Drawing Sheets

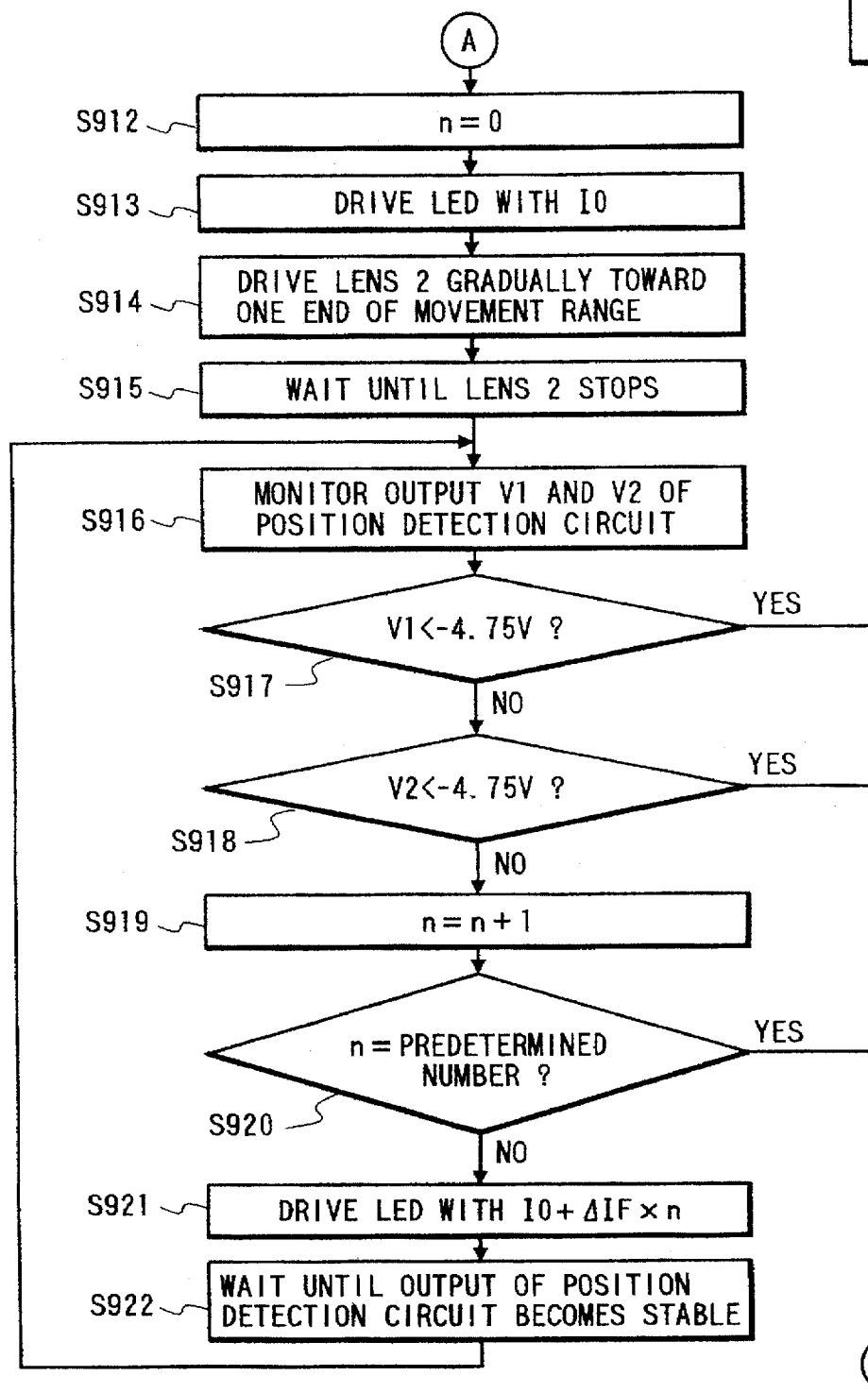

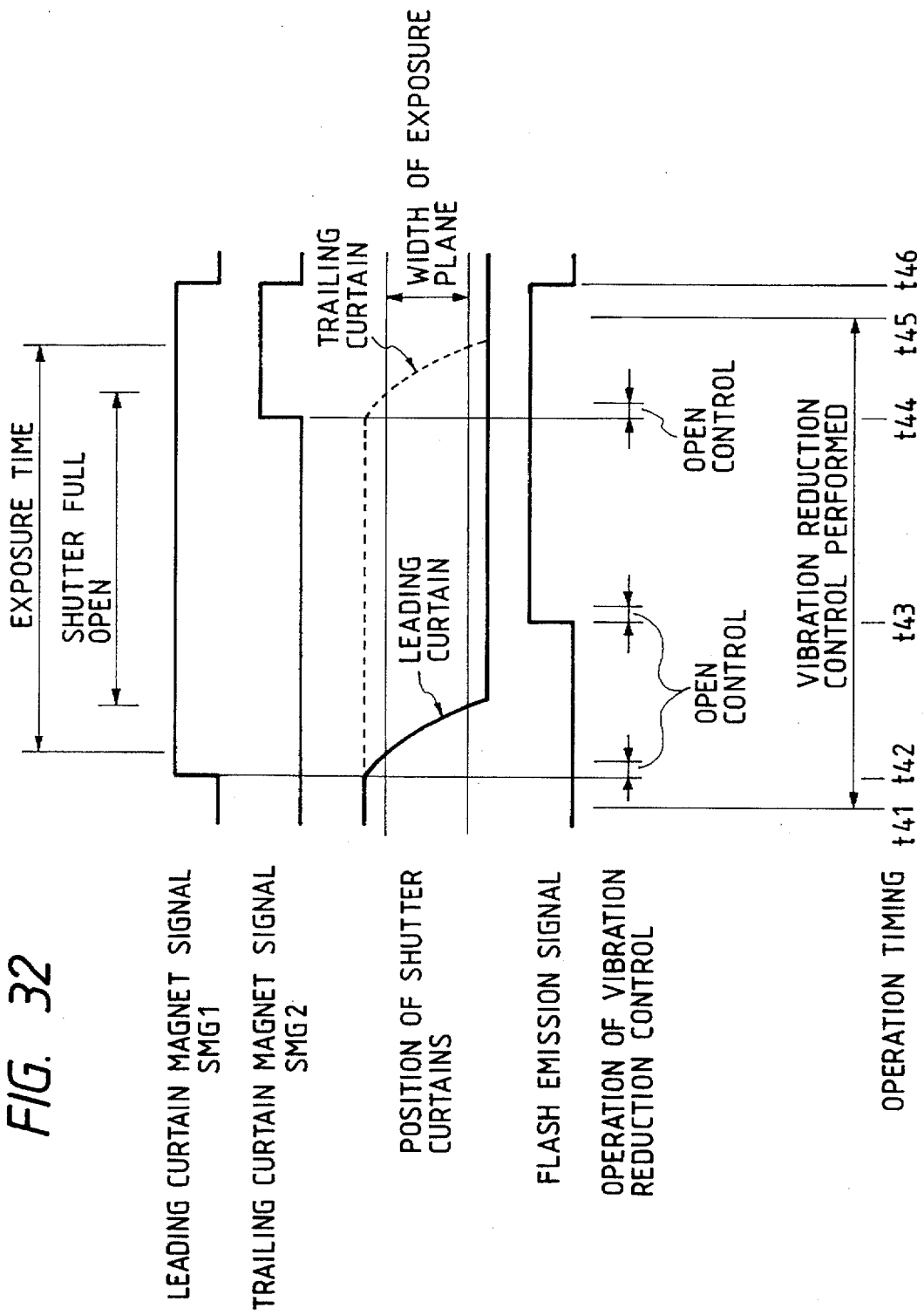

FIG. 45
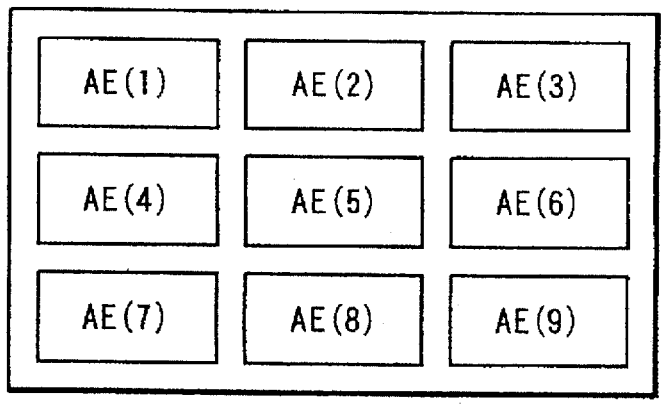
FIG. 46A
[HORIZONTAL]   [LEVEL]   [WEIGHTING OF RANGING AND PHOTOMETRY]
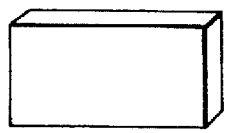 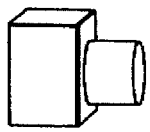 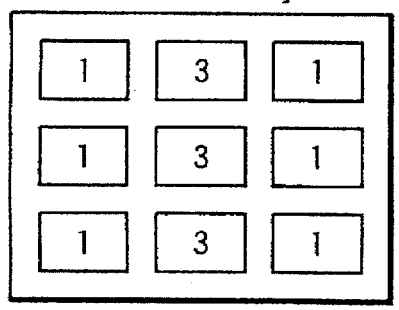
FIG. 46B
[HORIZONTAL]   [UPWARD]   [WEIGHTING OF RANGING AND PHOTOMETRY]
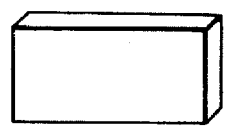 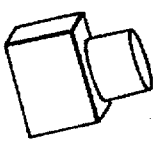 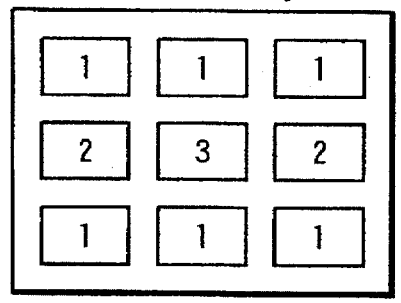

FIG. 47A
[HORIZONTAL]   [DOWNWARD]   [WEIGHTING OF RANGING AND PHOTOMETRY]
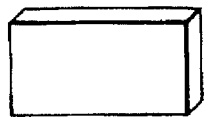
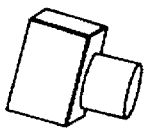
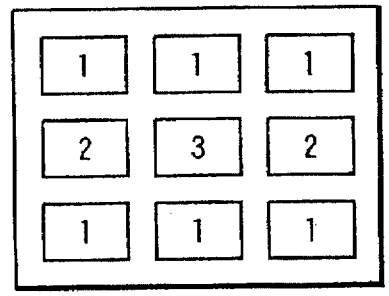
FIG. 47B
[OBLIQUE 1]   [LEVEL]   [WEIGHTING OF RANGING AND PHOTOMETRY]
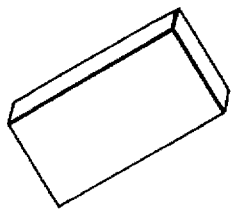
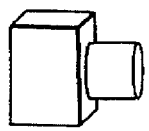
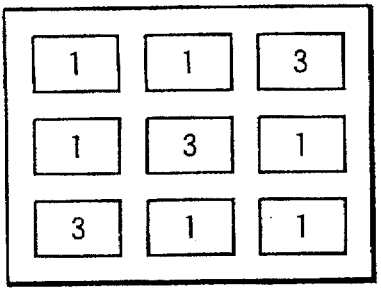
FIG. 48A
[OBLIQUE 2]   [LEVEL]   [WEIGHTING OF RANGING AND PHOTOMETRY]
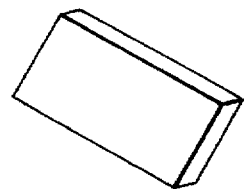
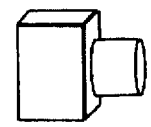
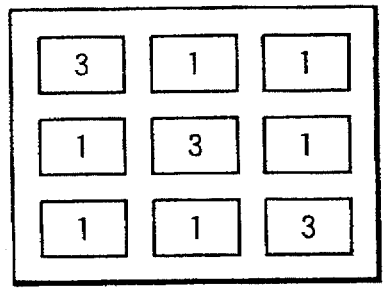
FIG. 48B
[VERTICAL]   [LEVEL]   [WEIGHTING OF RANGING AND PHOTOMETRY]
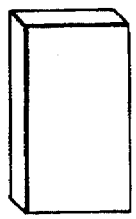
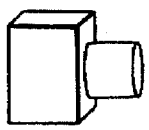
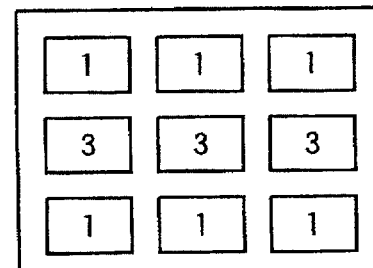

FIG. 57A
FIG. 57B
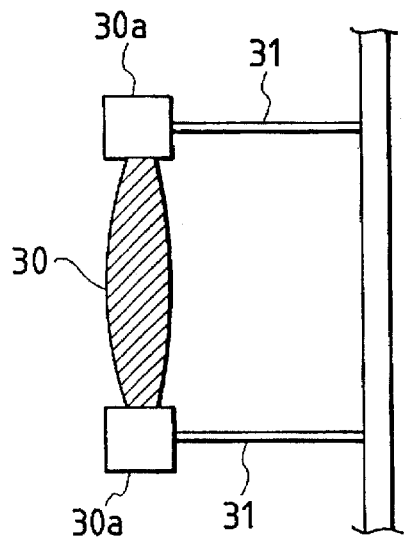
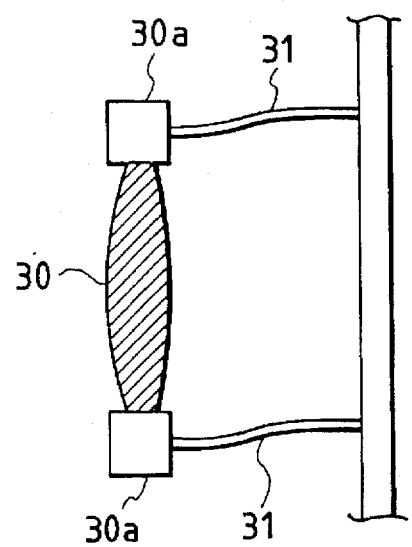
FIG. 58
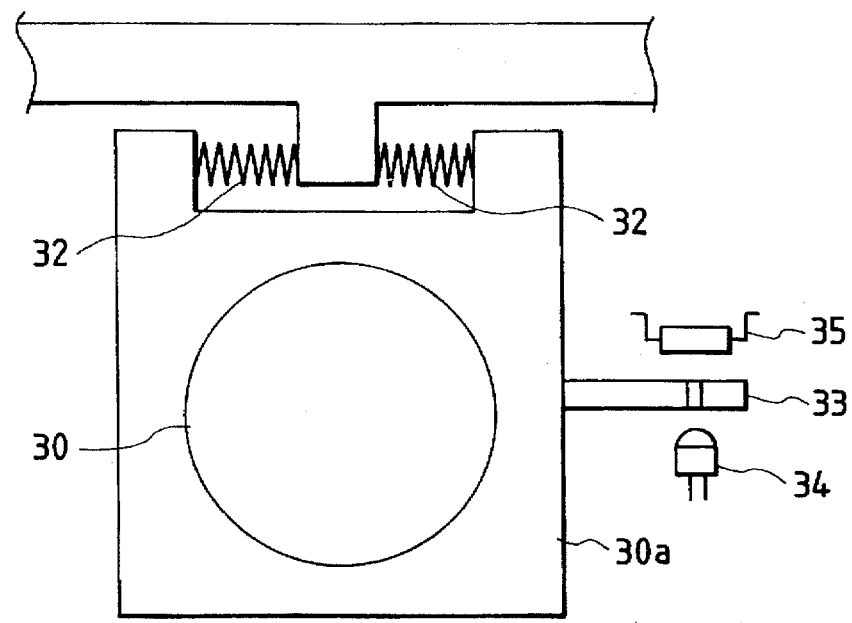

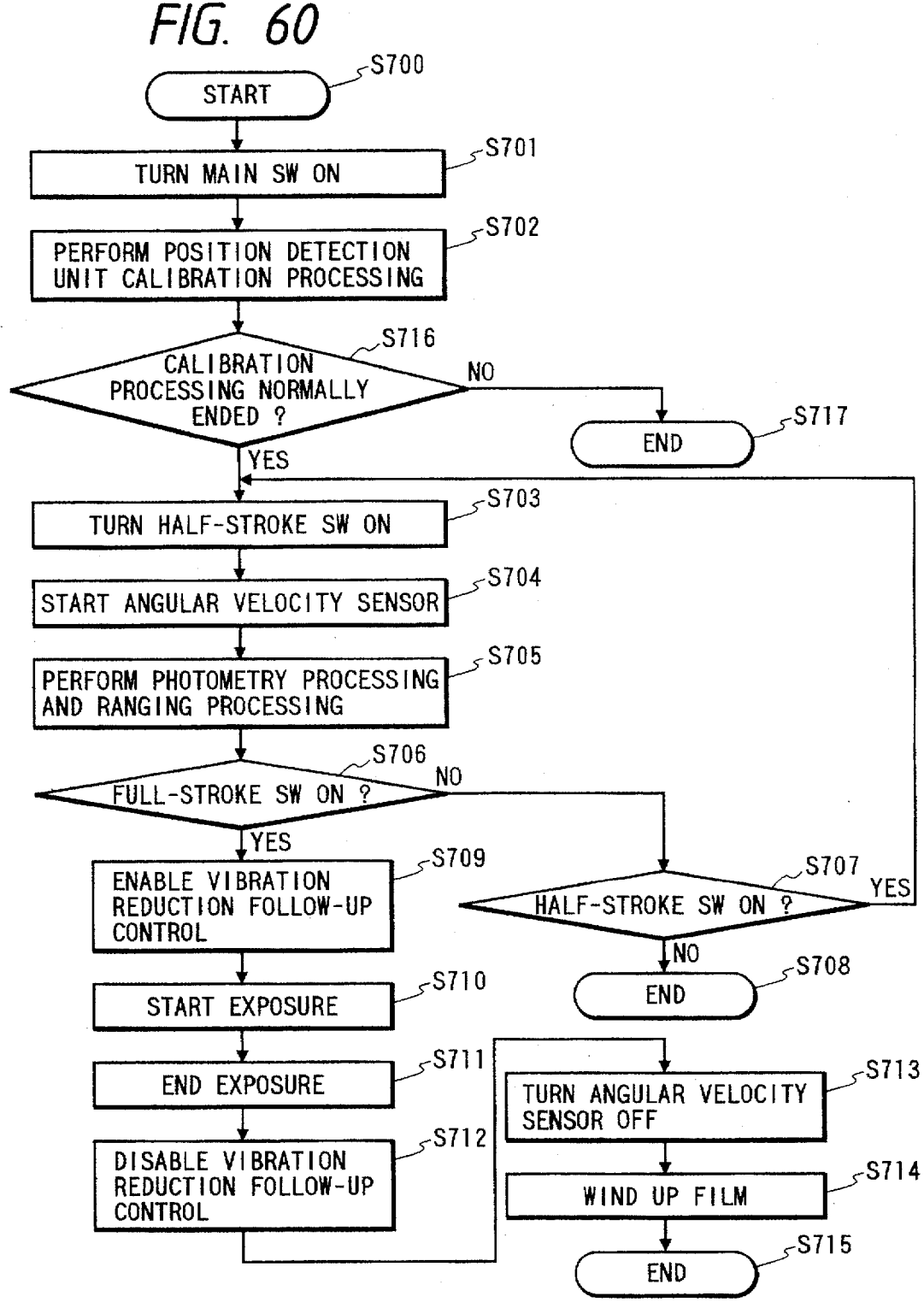

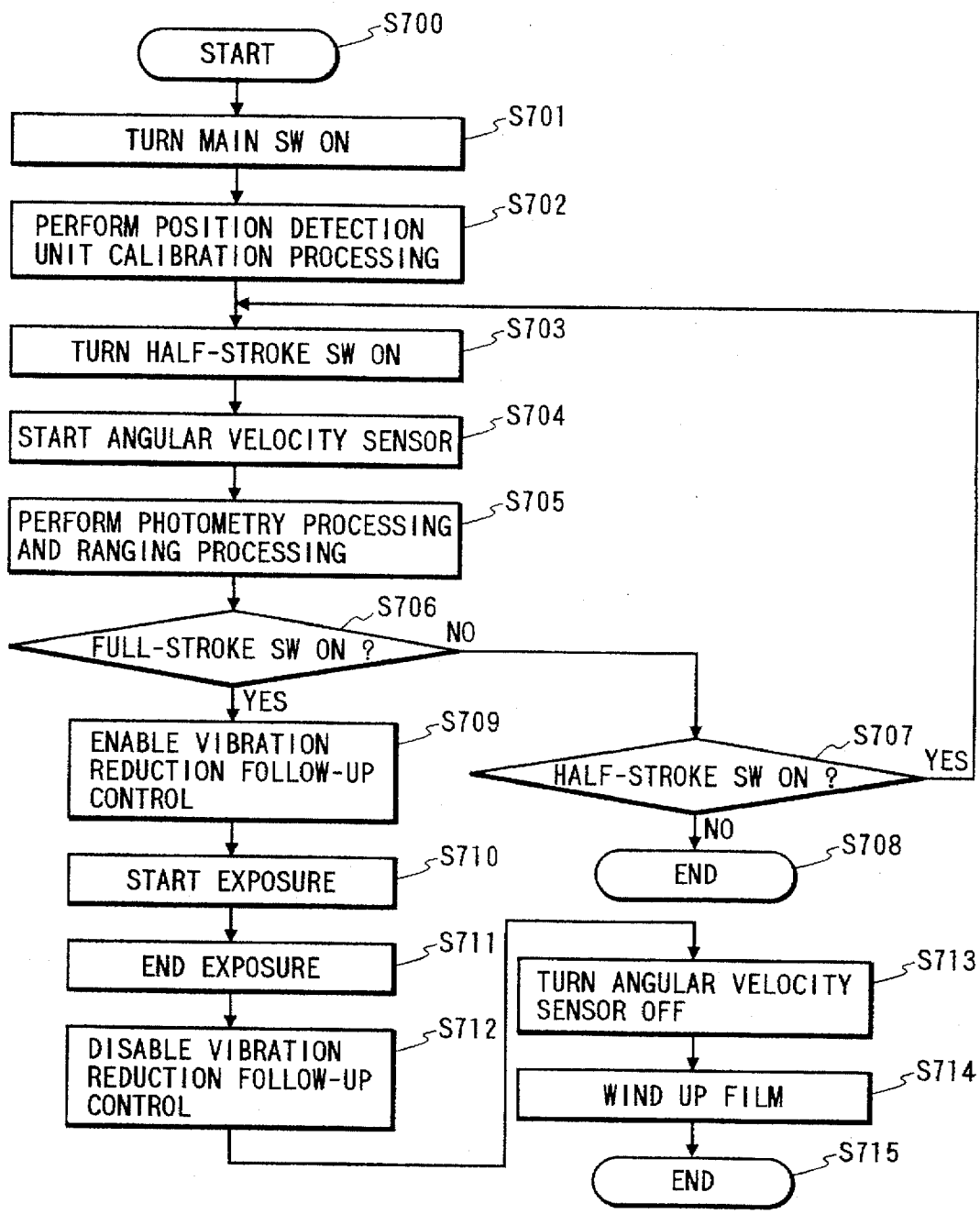

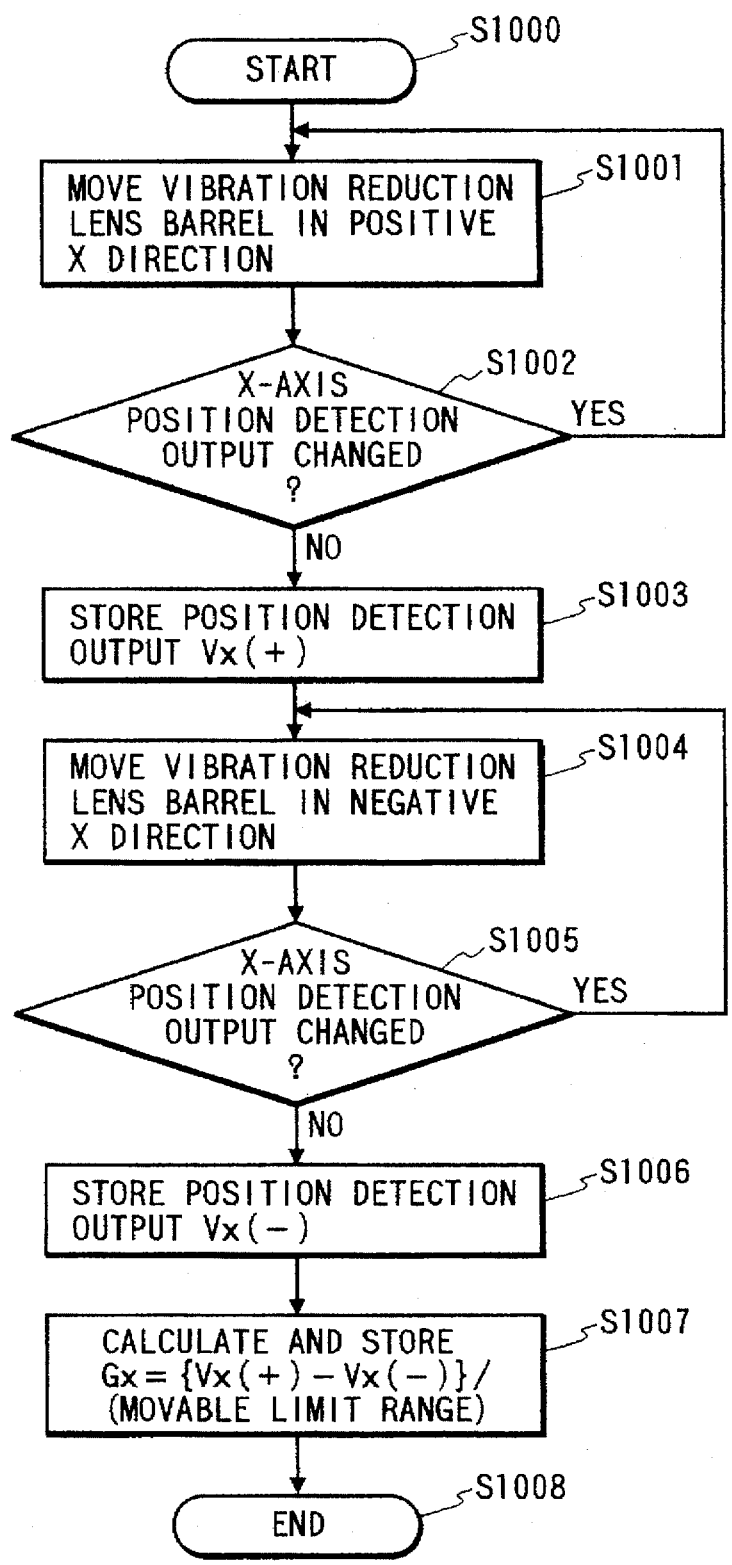

IMAGE VIBRATION REDUCTION DEVICE

BACKGROUND OF THE INVENTION

1. Field of the Invention

The present invention relates to an image vibration reduction device for reducing image vibrations in an image taking apparatus such as a camera, binoculars, or the like.

2. Related Background Art

Conventionally, a vibration reduction device of this type has a mechanism for detecting camera shake so as to prevent image vibrations on the imaging surface or the film surface, and reducing vibrations on the imaging surface in correspondence with the detected vibration amount. As a camera shake detection mechanism, a camera popularly uses a mechanism for detecting the angular velocity of camera shake, and a video movie camera popularly uses a mechanism for detecting the image vibration amount on the basis of images. A reduction mechanism shifts some lenses (to be referred to as a vibration reduction lens hereinafter) of an image taking lens in two orthogonal directions (one of these directions will be defined as a yawing direction, and the other will be defined as a pitching direction hereinafter), which are perpendicular to the image taking optical axis, in accordance with the detected vibration amount, thereby reducing vibrations on the imaging surface.

The following mechanism of the vibration reduction lens is known. That is, as described in Japanese Patent Application Laid-open No. 2-66535, for a vibration reduction lens, four support rods are disposed to be parallel to the optical axis. One end of each of the support rods is attached to the lens, and the other end thereof is attached to a member of a camera main body. FIGS. 57A and 57B are sectional views showing an example of this vibration reduction mechanism.

A vibration reduction lens 30 of the mechanism of this correction lens is held by a lens holding member 30a, which is supported by four support rods 31. The four support rods 31 can elastically flex, and are supported by a member of a camera main body in a cantilever manner (state in (57A)). Therefore, when the support rods 31 flex, the vibration reduction lens 30 can move in directions perpendicular to the optical axis (the right-and-left direction on the drawing surface), as shown in (57B).

Also, Japanese Patent Application Laid-open No. 4-301822 discloses another mechanism, and FIG. 58 shows it. In this camera shake reduction mechanism, a slide shaft attached to the lens holding member 30a of the vibration reduction lens 30 linearly slides with respect to the member of the camera main body. Therefore, the vibration reduction lens 30 moves in the direction of the slide shaft. The slide shaft is elastically held near the neutral position by two coil springs 32 disposed to clamp therebetween a bearing of the camera main body. Another vibration reduction lens mechanism with the above-mentioned arrangement is arranged in a direction perpendicular to the shift direction, so that the vibration reduction lens can arbitrarily move within a predetermined movement range on a plane perpendicular to the optical axis.

As a means for driving the vibration reduction lens 30, a moving coil actuator with the following arrangement is known. Drive coils for the yawing and pitching directions are attached to the holding member 30a of the vibration reduction lens 30 shown in FIGS. 57A, 57B, and 58, and magnets are attached to a support portion on the camera main body (or image taking lens) side in correspondence with these coils, thus constituting a kind of electromagnetic actuator. When currents are supplied to the coils for the yawing and pitching directions, the coils generate electromagnetic forces, and the vibration reduction lens 30 moves in the corresponding directions.

As a method of detecting the position of the vibration reduction lens 30, an optical position detection method to be described below is known. For example, as shown in FIG. 58, a slit member 33 is attached to the holding member 30a of the vibration reduction lens 30, and a light-emitting diode 34 and a one-dimensional SPD 35 serving as a position detection element are attached to the camera main body side at positions sandwiching the slide member 33 therebetween. Light projected by the light-emitting diode 34 passes through the slit of the slit member 33, and becomes incident on the PSD 35. A process circuit (to be described later) calculates the barycentric position of the incident light on the basis of the output from the PSD 35. Since the barycentric position of the incident light changes depending on the position of the vibration reduction lens 30, the position of the vibration reduction lens 30 is consequently detected. Position detection units each having the above-mentioned arrangement are arranged in the yawing and pitching directions to detect the positions, in the yawing and pitching directions, of the vibration reduction lens.

In general, the barycentric position of light incident on a one-dimensional PSD can be calculated based on two output currents I1 and I2 of the one-dimensional PSD, and is uniquely determined by the value $(I1-I2)/(I1+I2)$, as is well known. Similarly, the position of the vibration reduction lens 30 is calculated based on the output currents I1 and I2 from the two terminals of the PSD 35. A circuit for detecting the position of the vibration reduction lens 30 based on the outputs from the PSD 35 normally has a circuit arrangement shown in FIG. 59. A circuit constituted by an operational amplifier OP31 and resistors R31 and R32, and a circuit constituted by an operational amplifier OP32 and resistors R33 and R34 respectively convert output currents I1 and I2 from the PSD 35 into voltages (corresponding to voltages V1 and V2). A circuit constituted by an operational amplifier OP33 and resistors R35, R36, R37, and R38, and a circuit constituted by an operational amplifier OP34 and resistors R39, R40, R41, and R42 respectively constitute a subtracter and an adder for outputting voltages (corresponding to voltages V3 and V4) proportional to $(I1-I2)$ and $(I1+I2)$ on the basis of the voltage-converted outputs I1 and I2. The obtained outputs proportional to $(I1-I2)$ and $(I1+I2)$ are input to a divider DIV1, and a voltage (corresponding to V5) proportional to $(I1-I2)/(I1+I2)$ is output. The obtained output V5 proportional to $(I1-I2)/(I1+I2)$ indicates the barycentric position of light that was emitted by the light-emitting diode 34 and passed through the slit of the slit member 33, i.e., the position of the vibration reduction lens 30.

The light-emitting diode 34 is driven with a constant voltage or constant current by a drive circuit 36 for a light emitter using a known technique.

As vibration reduction control, a method disclosed in Japanese Patent Application Laid-open No. 4-301822 or the like is known as an example of vibration reduction control using the elastically supported vibration reduction lens 30. In this method, in order to perform appropriate vibration reduction on the basis of vibration information output from a vibration detection circuit, a vibration reduction lens target position is calculated, and the currents to be supplied to the coils constituting the electromagnetic actuators are controlled by a servo circuit using an analog hardware arrangement on the basis of the vibration reduction lens target position and the actual vibration reduction lens position detected by the above-mentioned circuit, thus attaining vibration reduction control on the imaging surface.

Conventionally, in designing a camera with such vibration reduction function, the camera must be designed placing emphasis on, e.g., the ranging performance and photometry performance since a user purchases such camera expecting not a common low-price compact camera but a camera with superior functions other than the vibration reduction function as well. For example, the ranging function must use a multiple ranging type, the photometry function must use a multiple photometry type, and the algorithm for calculating the focusing amount on the basis of multiple ranging values and the algorithm for calculating the exposure amount on the basis of multiple photometry values must also be highly advanced. For example, a technique for detecting the orientation difference of a camera, e.g., detecting using a vertical/horizontal position sensor whether a user holds the camera in the vertical or horizontal position, and feeding back the detection result to the above-mentioned algorithm, has been proposed.

However, such conventional image vibration reduction device suffers the following problems.

The first problem is posed by the characteristics of a light-emitting diode used as a light-emission unit for detecting a vibration reduction lens position. Assume that a light-emitting diode is driven at a constant drive current and ordinary temparatures. In this case, it should be noted that the light-emission amounts of light-emitting diodes vary and the light-emission amounts of some light-emitting diodes in an expected range of about +100% to −50%. When such variations in light-emission amounts are present, the vibration reduction lens position detection unit described above, i.e., an output operation circuit in the PSD 35 must have a maximum circuit gain in consideration of the positional detection resolution of the vibration reduction lens 30. The vibration reduction lens detection unit must be designed and arranged to always perform normal operations such that all outputs from the detection units are not saturated. The voltage range of a power supply for operating this circuit is limited. For this reason, the allowable design range of the circuit gain is limited, and the circuit gain must be set to a considerably small value even if the positional detection resolution of the vibration reduction lens 30 is sacrificed accordingly. To eliminate this drawback, the variations in light-emission amounts of the light-emitting diodes must be adjusted in the individual cameras even with a higher cost.

The second problem is associated with temperature dependence of the light emission amount of a light-emitting diode. The first problem can be solved when the light-emission amounts of the diodes are adjusted one by one at ordinary temperatures. Another problem is posed by a change in forward voltage of a light-emitting diode depending on the ambient temperature. To solve this problem, there is known a technique using a constant current drive circuit for always driving the light-emitting diode at a constant current even with a higher cost. Even if the drive circuit for keeping the drive current for the light-emitting diode constant is used to always flow a constant drive current to the light-emitting diode, its light-emission amount changes depending on the ambient temperature. For example, it is reported that the light-emission amount changes in several tens of % in the normal operation temperature range of a camera.

In order to solve these problems, Japanese Patent Application Laid-open No. 4-301822 discloses a scheme in which a drive current for a light-emitting diode is controlled by negative feedback using a sum I1+I2 of two currents output from a PSD. The circuit arrangement is complicated to result in high cost.

Under the above circumstances, the light-emission amount of the light-emitting diode is conventionally adjusted in each individual camera at ordinary temparatures. At the same time, in the PSD processing circuit, the circuit gain must be set relatively low so as to allow a normal circuit operation such that all outputs are not saturated in the camera operation temperature range even if the positional detection resolution of the vibration lens is sacrificed accordingly. Alternatively, the above conventional problems are solved by complicating the circuit arrangement even with a higher cost.

The output processing circuit of the PSD 35 poses the third problem as follows. A problem is posed by an element constituting the circuit, and particularly the characteristics of an operational amplifier. A general operational amplifier is different from an ideal operational amplifier in an input offset voltage, an input offset current, and an input bias current. These characteristics have temperature dependence which adversely affects the positional detection accuracy of the vibration reduction lens. The input offset current of a general bipolar operational amplifier of an ordinary temparatures is typically about several nA to several tens of nA and at maximum about 100 nA. The input offset current value in the camera operation temperature range with respect to ordinary temparatures changes about several tens of %. The output current of the PSD 35 is used in the maximum range of about several hundreds of nA to several μA and is not large enough to neglect the characteristics of the operational amplifier. In addition, the dark current of the PSD 35 also adversely affects the detection accuracy. The dark current of the PSD is known to exponentially increase with respect to a temperature rise. The influences of characteristics of a divider DIV1, each resistor, and the like cannot be neglected, either. These factors adversely affect the positional detection accuracy of the vibration reduction lens 30. To eliminate these error factors, positional detection of the vibration reduction lens must be adjusted in each individual camera even with a higher cost. In addition, the input offset voltage, the input offset current, the input bias current, the dark current of the PSD 35, and the like have temperature dependence. Even if the errors can be eliminated at ordinary temparatures by adjustment, errors depending on the ambient temperature cannot be eliminated. The operational amplifier can be of a type having a low input bias current, a low offset current, and a low offset voltage, and the PSD 35 can be of a type having a small dark current to reduce the positional detection errors, but this arrangement results in high cost. In addition, a divider is generally more expensive than an operational amplifier or the like, resulting in high cost.

FIG. 63 is a block diagram showing an arrangement of a camera with a vibration reduction device.

A CPU 112 is a processing unit for controlling the image taking functions of a camera, such as ranging and photometry and controlling a vibration reduction function. Outputs from a photometry circuit 111, a main switch 113, a half-stroke switch 114, a full-stroke switch 115, vibration detection units 131X and 131Y, a ranging circuit 141, and the like are connected to the CPU 112.

An image taking lens 120 comprises lenses 121 and 122, a vibration reduction lens 123, a focusing lens 124, and the like, surrounded by a broken line in FIG. 63. The vibration reduction lens 123 changes the optical axis of the image taking lens to reduce the vibrations. The vibration reduction lens 123 is supported movably in the X- and Y-axis directions. The vibration reduction lens 123 is driven in the X- or Y-axis direction by an actuator 136X or 136Y through an actuator drive circuit 135X or 135Y on the basis of a vibration reduction control signal from the CPU 112.

The focusing lens 124 is a lens which moves along the optical axis to adjust the focusing state. The focusing lens 124 is driven by a motor 144 through a motor drive circuit 143 on the basis of a focus control signal from the CPU 112.

A lens position detection unit 137 (see FIG. 66) is arranged to detect the position of the vibration reduction lens 123. Outputs from position sensors 138X and 138Y are connected to the CPU 112 through lens position detection circuits 139X and 139Y.

A lens position detection unit 147 is arranged to detect the position of the focusing lens 124 and connected to the CPU 112.

FIGS. 64A, 64B and 64C are views showing the detailed structure of a vibration reduction lens drive unit, and FIGS. 65A and 65B are views showing a support structure for the vibration reduction lens.

The vibration reduction lens 123 is driven in the X- or Y-axis direction by the actuator 136X or 136Y.

The actuator 133X is a drive actuator for the X-axis direction and comprises a movement coil 136X-1, a magnet 136X-2, and yokes 136X-3 and 136X-4. The movement coil 136X-1 is energized to generate a force in the X-axis direction. Similarly, the actuator 136Y is a drive actuator for the Y-axis direction. A movement coil 136Y-1 is energized to generate a force in the Y-axis direction.

As shown in FIGS. 65A and 65B, the vibration reduction lens 123 is held in a vibration reduction lens barrel 151. The vibration reduction lens barrel 151 is cantilevered by four flexible support rods 152 and movable in a direction perpendicular to the optical axis.

FIG. 66 is a block diagram showing the control system for the vibration reduction unit.

The vibration reduction unit 131 monitors the vibration motion of the camera and comprises an angular velocity sensor 132 and an integral processing circuit 133. The angular velocity sensor 132 comprises a piezoelectric vibration sensor for detecting a Coriolis force. The integral processing circuit 133 time-integrates the output from the angular velocity sensor 132 and converts the output into the vibration angle of the camera.

A vibration reduction control unit 111-1 generates target drive position information for the vibration reduction lens 123 on the basis of the output from the vibration detection unit 131 and outputs it to a lens drive unit 134. In this case, a servo processing circuit 111-1a performs phase compensation for the difference between the target drive position information and the current position information of the vibration reduction lens 123 which is detected by the lens position detection unit 137.

The lens drive unit 134 moves the vibration reduction lens 123 on the basis of the target drive position information from the vibration reduction control unit 111-1 and comprises a drive circuit 135 and an actuator 136. The drive circuit 135 supplies a drive current to the actuator 136 on the basis of a signal from the servo processing circuit 111-1a. The actuator 136 moves the vibration reduction lens 123 in a plane perpendicular to the optical axis on the basis of this drive current. The movement of the vibration reduction lens 123 is monitored by the optical lens position detection unit 137 and fed back to the servo processing circuit 111-1a.

The lens position detection unit will be described below.

The lens position detection unit 137 has the optical detectors 138 in the X- and Y-axis directions to detect the position of the vibration reduction lens 123.

As shown in FIGS. 64A, 64B and 64C, the position sensors 138X and 138Y are mounted on the vibration reduction lens barrel 151 and comprise detection slits 138X-1 and 138Y-1 as holes elongated in the X- and Y-directions, infrared-emitting diodes (IREDs) 138X-2 and 138Y-2 mounted on a top plate 154, one-dimensional position detection diodes (PSDs) 138X-3 and 138Y-3 mounted on a bottom plate 153 to receive light projected from the IREDs 138X-2 and 138Y-2 and incident through the detection slits 138X-1 and 138Y-1, and the like.

The movements of the detection slits 138X-1 and 138Y-1, i.e., the movements of the vibration reduction lens 123 are the movements of light incident on the PSDs 138X-3 and 138Y-3. Each of the PSDs 138X-3 and 138Y-3 outputs position information of light incident on the light-reception surface thereof as two current values and processes these two current values to detect the position.

The arithmetic operation of the lens position will be described with reference to FIGS. 67, 68A, and 68B.

FIG. 67 is a circuit diagram showing an operation circuit for calculating the position of slit light from the output currents from the PSD.

Two current values I1 and I2 output from the PSD 138-3 are converted into voltage values V1 and V2 by a current/voltage converter 139-1. These two voltage values V1 and V2 are input to an operation unit 139-2. The operation unit 139-2 calculates a slit light position x on the light-reception surface of PSD 138-3 and outputs it as a voltage value VO.

FIG. 68A is a graph showing the two current values I1 and I2 with respect to the position on the one-dimensional PSD 138-3. Referring to FIG. 68A, an abscissa x represents coordinates on the light-reception surface of the PSD 138-3, and the center of the light-reception surface is defined as the origin. Reference symbol L denotes the overall length of the light-reception surface of the PSD 138-3. An ordinate I represents current values. The current values I1 and I2 flowing on the PSD 138-3 change depending on the position of the light-reception surface, and the graph of I1 and I2 is symmetrical about the I-axis.

Referring to FIGS. 64A, 64B and 64C, when the light beam from the IRED 138-2 is incident on the PSD 138-3 through the slit 138-1, the PSD-138-3 outputs the two current values I1 and I2 corresponding to the slit light position on the light-reception surface. For example, when slit light beam is incident at the position x on the PSD 138-3, the current values I1 and I2 corresponding to this position are output.

FIG. 69 is a graph showing the relationship between the slit light position on the PSD and the output voltage value. An abscissa x in the graph of FIG. 69 represents coordinates on the light-reception surface of the PSD, and the center of the light-reception surface is defined as the origin. An ordinate V represents the output voltage values. As will be apparent from FIG. 69, the slit light position is proportional to the output voltage value. The output voltage value from the operation unit 139-2 is monitored to detect the slit light position, i.e., the position of the vibration reduction lens 123.

In the vibration reduction device shown in FIG. 66, however, the position of the vibration reduction lens 123 is not directly monitored by the lens position detection unit 137, but is indirectly monitored as the outputs from the PSD 138-3 upon light emission of the IRED 138-3 through the slit 138-1 attached to the member 151 integrally formed with the vibration reduction lens 123. The monitored outputs are fed back.

For this reason, when an error is present between the position of the vibration reduction lens 123 and the output from the lens position detection unit 137, the error cannot be compensated under the control. An error directly occurs in the position of the vibration reduction lens 123.

In the conventional vibration reduction device, the position of the vibration reduction lens 123 and the position of the PSD 138-3 are calibrated. This calibration is performed by driving the vibration reduction lens 123 within the movable limit range immediately upon turning the main switch on.

An operation from the power-on of the main switch of the camera shown in FIG. 63 to the end of image taking will be described with reference to FIG. 70.

The CPU 112 starts processing (step S700), receives an ON signal from the main switch 113 (step S701), and calibrates the position of the vibration reduction lens 123 and the outputs from the PSD 138-3 (step S702).

Upon reception of an ON signal from the half-stroke SW 114 (step S703), the CPU 112 turns the angular velocity sensor 132 on (step S704). After photometry processing and ranging processing are performed (step S705), the CPU 112 determines whether the full-stroke SW 115 is turned on (step S706). If NO in step S706, the flow advances to step S707.

If YES in step S706, the CPU 112-determines whether the half-stroke SW 114 is turned on (step S707). If YES in step S707, the flow returns to step S703. If the half-stroke SW 114 is kept off, processing is ended.

If the CPU 112 determines in step S706 that the full-stroke SW 115 is turned on, vibration reduction follow-up control is enabled (step S709). Exposure is started (step S710). When a predetermined period of time has elapsed, exposure is ended (step S711). Then vibration reduction follow-up control is ended (step S712), and the angular velocity sensor 132 is turned off (step S713). Finally, the film is wound up (step S714), and a series of processing operations are ended (step S715).

FIG. 71 is a flow chart showing the flow of X-axis calibration processing between the position of the vibration reduction lens and the position outputs from the PSD.

FIGS. 72A and 72B are views showing the movements of the vibration reduction lens in X-axis calibration. The right direction in FIGS. 72A and 72B is the positive X direction, and the upper direction in FIGS. 72A and 72B is the positive Y direction.

Calibration processing will be described with reference to the flow chart in FIG. 71.

When processing is started in step S1000, the vibration reduction lens barrel 151 is moved in the positive X direction (step S1001) to detect an X-axis position detection output and determine whether the X-axis position detection output is changed (step S1002). When the output is changed, the flow returns to step S1001 to move the vibration reduction lens barrel 151 in the positive X direction.

In step S1002, when the X-axis position detection output does not change, the position of the vibration reduction lens barrel 151 is located at a movable limit member 153X-1, as shown in FIG. 72A. The flow advances to step S1003. In step S1003, this X-axis position detection output Vx(+) is stored.

The vibration reduction lens barrel 151 is moved in the negative X direction (step S1004) to detect an X-axis position detection output and determine whether the X-axis position detection output is changed (step S1005). If YES in step S1005, the flow returns to step S1004 to move the lens barrel in the negative X direction.

When the X-axis position detection output does not change in step S1005, the position of the vibration reduction lens barrel 151 is located at a movable limit member 153X-2. The flow then advances to step S1006. In step S1006, this X-axis position detection output Vx(−) is stored.

Finally, in step S1007, $Gx=\{Vx(+)-Vx(-)\}/$(movable limit range) is calculated and stored, thereby ending the calibration processing (step S1008).

X-axis calibration processing has been described, but Y-axis calibration processing is similarly performed.

The vibration reduction device described with reference to FIGS. 63, 64A, 64B, 65A, 65B, 66, 67, 68A, 68B, 69, 70, 71, 72A and 72B calibrates the position of the vibration reduction lens 123 and the position outputs from the PSD 138 such that the vibration reduction lens barrel 151 is driven once immediately upon turning the main switch 113 on.

When the vibration reduction lens barrel 151 abuts against the limit member 153, an accurate calibration value may not be obtained due to vibrations. This cannot be detected prior to image taking, and highly accurate vibration reduction may not be performed.

SUMMARY OF THE INVENTION

It is an object of the present invention to provide a highly accurate, inexpensive vibration reduction device.

An image vibration reduction device according to the present invention comprises a vibration reduction optical system which moves to reduce an image vibration caused by a vibration of an image taking apparatus, vibration reduction optical system displacement detection means, constituted by a light-emission unit and a light-reception unit using an optical position detection element, for optically detecting a change in position of the vibration reduction optical system, and light-emission amount automatic adjustment means for self-adjusting a light-emission amount of the light-emission unit at a predetermined time on the basis of an output from the light-reception unit.

The movable range of the vibration reduction optical system is a predetermined value, and the light-emission amount automatic adjustment means self-adjusts the light-emission amount on the basis of an output from the light-reception unit which is obtained upon movement of the vibration reduction optical system within the movable range.

The light-emission amount automatic adjustment means self-adjusts the light-emission amount on the basis of an output from the light-reception unit which is obtained upon movement of the vibration reduction optical system to at least one end of the movable range.

The light-emission amount automatic adjustment means self-adjusts the light-emission amount so as to change the light-emission amount of the light-emission unit and prevent saturation of an output from the light-reception unit when the vibration reduction optical system is moved to at least one end of the movable range.

The light-emission unit comprises a light-emission element and a plurality of resistors. One terminal of each of the plurality of resistors is commonly connected to the light-emission unit, and the other terminal of each of the plurality of resistors which is not commonly connected to the light-emission element receives a digital signal, thereby changing the light-emission amount.

The predetermined timing is a timing at which a user operation is performed. More specifically, light-emission amount automatic adjustment is performed at a timing in response to a battery power-on operation of the image vibration reduction device, a timing in response to a change in state of the main switch, a timing in response to depression of a release button to the half-stroke position, a timing in response to depression of the release button to the full-stroke position, or a timing immediately before exposure.

An image vibration reduction device according to the present invention comprises a vibration reduction optical system which moves to reduce an image vibration caused by a vibration of an image taking apparatus, vibration reduction optical system displacement detection means, constituted by a light-emission unit and a light-reception unit using an optical position detection element, for optically detecting a change in position of the vibration reduction optical system, non-light-emission displacement output detection means for detecting an output from the light-reception unit at a predetermined timing at which a light-emission amount of the light-emission unit is defined as zero, and displacement correction means for correcting an output from the vibration reduction optical system displacement detection means using an output from the non-light-emission displacement output detection means.

The predetermined time is a time when a user operation is performed. More specifically, the output from the light-reception unit upon definition of the light-emission amount of the light-emission unit as zero is detected at a time in response to a battery loading operation of the image vibration reduction device, a time in response to a change in state of the main switch, a time in response to depression of the release button of a camera, to which the vibration reduction device is applied, to the half- or full-stroke position, or a time immediately before exposure.

An image vibration reduction device according to still another aspect of the present invention comprises a vibration reduction optical system which moves within a predetermined movable range so as to reduce an image vibration caused by a vibration of an-image taking apparatus, vibration reduction optical system displacement detection means for optically detecting a displacement of the vibration reduction optical system, position detection automatic adjustment means for calculating adjustment values for calculating a position of the vibration reduction optical system at a predetermined time in accordance with outputs from the vibration reduction optical system displacement detection means at one end and the other end of the predetermined movable range, and vibration reduction optical system position calculation means for calculating position information of the vibration reduction optical system in accordance with at least an output from the vibration reduction optical system displacement detection means and the adjustment values from the position detection automatic adjustment means.

The predetermined time is a time when a user operation is performed. More specifically, light-emission amount automatic adjustment can be performed at a time in response to a battery loading operation of the image vibration reduction device, a time in response to a change in state of the main switch, a time in response to depression of the release button of a camera, to which the vibration reduction device is applied, to the half- or full-stroke position, or a time immediately before exposure.

A vibration reduction device according to still another aspect of the present invention comprises a vibration reduction optical system for reducing an image vibration caused by a vibration, a drive unit for driving the vibration reduction optical system, a position detection unit for detecting a position of the vibration reduction optical system, and a calibration unit for calibrating the position detection unit by moving the vibration reduction optical system by a predetermined range, wherein the calibration unit moves the vibration reduction optical system a plurality of times within the predetermined range.

The calibration unit can drive the vibration reduction optical system a plurality of times within the predetermined range to obtain a plurality of calibration values. In this case, the calibration unit may be arranged to determine that the position detection unit or the drive unit is abnormal when a predetermined number of calibration values of the plurality of calibration values do not fall within the predetermined range. Alternatively, the calibration unit may define the average value of the plurality of calibration value as a calibration value, or the calibration unit may be arranged to determine that the position detection unit or the drive unit is abnormal when a difference between the plurality of calibration values is larger than a predetermined value.

BRIEF DESCRIPTION OF THE DRAWINGS

FIG. 32 is a timing chart of the vibration reduction control under exposure according to the embodiment shown in FIG. 1;

FIG. 45 is a view showing the image taking field angles and photometry regions of a photometry circuit according to the embodiment shown in FIG. 1;

FIGS. 46A and 46B are views showing the tilt of the camera and the weighting values of the ranging and photometry values according to the embodiment shown in FIG. 1;

FIGS. 47A and 47B are views showing the tilt of the camera and the weighting values of the ranging and photometry values according to the embodiment shown in FIG. 1;

FIGS. 48A and 48B are views showing the tilt of the camera and the weighting values of the ranging and photometry values according to the embodiment shown in FIG. 1;

FIGS. 57A and 57B are sectional views showing the arrangement of a conventional vibration reduction lens mechanism;

FIG. 58 is a view showing the arrangement of the conventional vibration reduction lens mechanism;

FIG. 60 is a flow chart showing the operation of a CPU in a camera having a vibration reduction device as an embodiment of the present invention;

FIG. 70 is a flow chart showing the operation of the CPU of the camera shown in FIG. 63;

FIG. 71 is a flow chart showing the flow of X-axis calibration processing between the position of the vibration reduction lens and the position outputs from the PSD.

DETAILED DESCRIPTION OF THE PREFERRED EMBODIMENTS

The arrangement of a camera according to an embodiment of the present invention will be described below with reference to the accompanying drawings.

Figure 1:
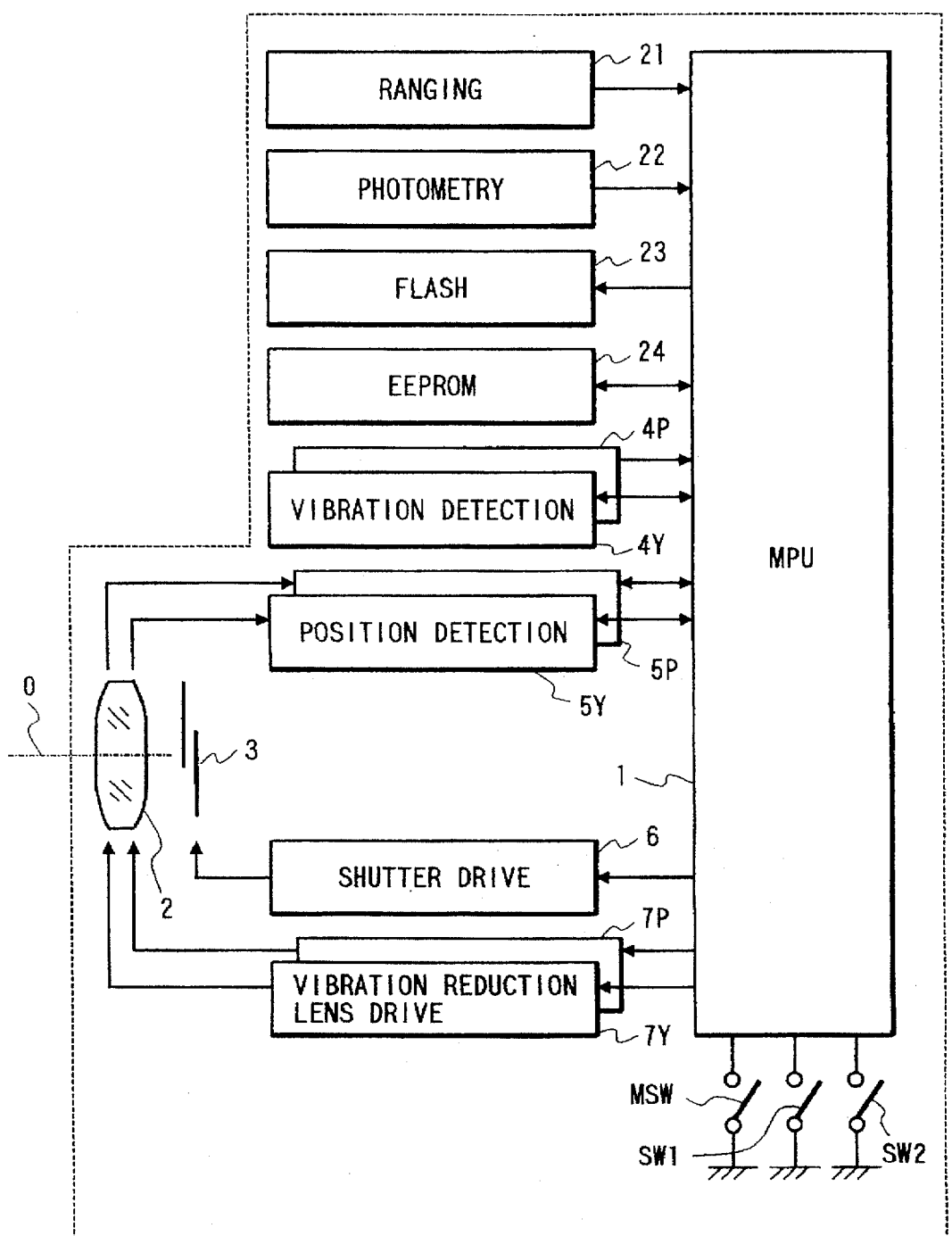
FIG. 1 is a block diagram showing the overall arrangement of a camera with an image vibration reduction mechanism according to an embodiment of the present invention.

FIG. 1 is a block diagram showing the overall arrangement according to the embodiment of the present invention. A lens 2 is a lens or a lens group that constitutes a portion of an image taking optical system which is normally constituted by a plurality of lenses. The imaging taking optical system is disposed in a lens barrel 200 of an image taking lens which is detachable from a camera main body 100. A vibration reduction mechanism reduces vibrations on the imaging surface by shifting the lens 2 on a plane substantially perpendicular to an optical axis O. The lens 2 will be referred to as a vibration reduction lens hereinafter (components other than the vibration reduction lens 2 of the image taking optical system are not shown). The vibration reduction lens 2 is shifted by a vibration reduction lens mechanism (to be described later) in two directions, i.e., in a predetermined direction (to be referred to as a yawing direction hereinafter) substantially perpendicular to the image taking optical axis O, and in another predetermined direction (to be referred to as a pitching direction hereinafter) which is substantially perpendicular to the image taking optical axis and is also perpendicular to the yawing direction.

Figure 2:
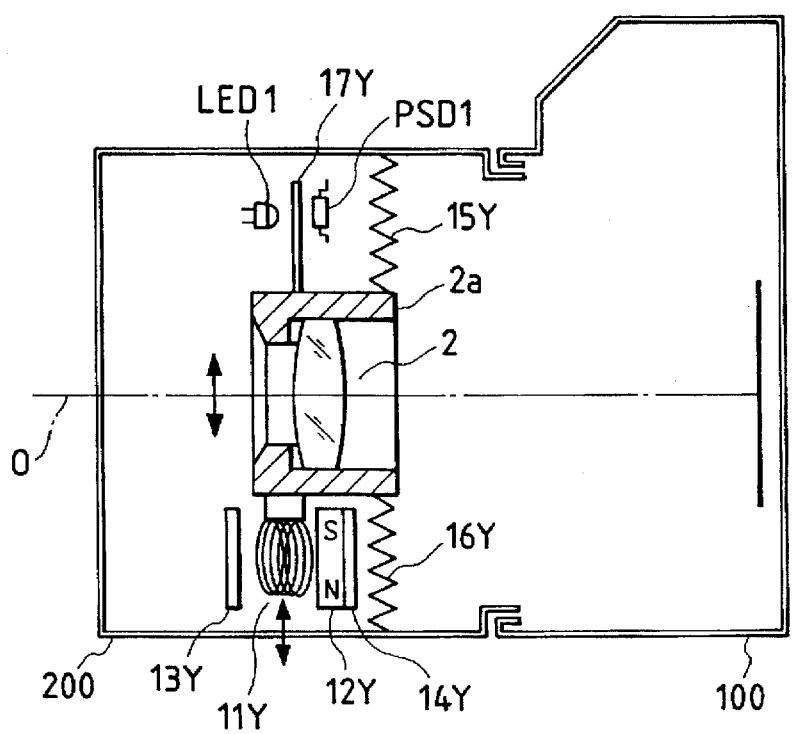
FIG. 2 is a sectional view showing the arrangement of components 5Y, 5P, 7Y, and 7P shown in FIG. 1.

FIG. 2 illustrates the arrangement of a drive mechanism 7Y (7P) for driving the vibration reduction lens 2 to shift in the yawing (pitching) direction, and a position detection mechanism 5Y (5P) of the vibration reduction lens 2. The vibration reduction lens 2 is held by a lens holding member 2a, which is elastically, i.e., movably supported by springs 15Y and 16Y at substantially a predetermined position with respect to the lens barrel member 200. The holding member 2a is formed into a cylindrical shape, and a coil 11Y is attached to its outer surface. On the other hand, a magnet 12Y polarized in two poles, and yokes 13Y and 14Y consisting of a material such as iron having high magnetic permeability are attached to the lens barrel member 200 to surround the coil 11Y, as shown in FIG. 2, and constitute a kind of electromagnetic actuator. In this mechanism, when a current is supplied to the coil 11Y, the coil 11Y generates an electromagnetic force, and the vibration reduction lens 2 moves in the yawing direction substantially perpendicular to the optical axis O.

The movement range of the vibration reduction lens 2 is set to be a predetermined range in advance due to mechanical limitations, and the lens 2 does not move beyond this range. A slit member 17Y is attached to the holding member 2a at a position opposing the coil 11Y to sandwich the vibration reduction lens 2 therebetween, and it moves together with the holding member 2a. At the corresponding position on the lens barrel member 200 side, a light-emitting diode LED1 and one-dimensional position sensitive light detector 1 (to be referred to as a PSD1 hereinafter) serving as a position detection element are attached. A control unit (MPU) 1 detects the barycentric position of light passing through the slit member 17Y of light emitted by the LED1 on the basis of the output from the PSD1, thereby detecting the position of the vibration reduction lens 2.

The vibration reduction lens drive mechanism and the position detection mechanism of the vibration reduction lens 2 in the pitching direction have the same arrangement as that of the above-mentioned mechanisms in the yawing direction. The holding mechanism of the vibration reduction lens 2 and the drive mechanisms may adopt conventional ones shown in FIGS. 57A, 57B and 58.

The control unit 1 performs the control of the overall camera including vibration reduction control, shutter control, and the like, and uses a one-chip microcomputer, or the like. The control unit 1 will be referred to as an MPU 1 hereinafter. The vibration reduction lens drive mechanisms 7Y and 7P drive the vibration reduction lens 2 in the yawing and pitching directions by controlling the currents to be supplied to the coil 11Y for the yawing direction and a coil 11P (not shown) for the pitching direction, respectively. The MPU 1 drives the vibration reduction lens 2 to an arbitrary position within the predetermined movement range by controlling the vibration reduction lens drive mechanisms 7Y and 7P in the yawing and pitching directions. A shutter 3 controls the exposure amount of a light beam from an object passing through the image taking optical system on the film surface. The shutter 3 is normally in the closed state. The shutter 3 is released by a required amount and for a required period of time via a shutter drive circuit 6 under the control of the MPU 1, and is closed after an elapse of a predetermined period of time, thus attaining an exposure operation on the film surface.

The position detection mechanisms 5Y and 5P respectively detect the positions, in the yawing and pitching directions, Of the vibration reduction lens 2, and the MPU 1 recognizes the position of the vibration reduction lens 2 by monitoring the output signals from these mechanisms. Vibration detection mechanisms 4Y and 4P respectively detect vibrations generated in the camera in the yawing and pitching directions, and output the detection results to the MPU 1.

The MPU 1 is connected to switches MSW, SW1, and SW2 as those to be operated by the user and arranged in the camera main body 100. The switch MSW is a main switch that allows the MPU 1 to perform the principal operation of the camera in the ON state. The switch SW1 is a half-stroke or halfway switch which is turned on when the user presses the release switch of the camera halfway. When the half-stroke switch SW1 is turned on while the main switch MSW is in the ON state, the MPU 1 performs main operations for an image taking preparation, e.g., a ranging operation, a photometry operation, and the like. The switch SW2 is a release (full-stroke) switch which is turned on when the user presses the release button of the camera to its full-stroke position. When the release switch SW2 is turned on while the main switch MSW is in the ON state, the MPU 1 performs an image taking operation, operates the shutter drive circuit or mechanism 6 to open the shutter by a required amount and for a required period of time and then close it.

A ranging mechanism 21 is of multiple ranging type, performs ranging operations of a plurality of regions obtained by dividing the image taking frame, and outputs the detection results to the MPU 1. A photometry mechanism 22 is of multiple photometry type, performs photometry operations of a plurality of regions obtained by dividing the object luminance in the image taking frame, and outputs the detection results to the MPU 1. A flash unit 23 is a device which emits flash, is charged at a known timing by a known technique, and emits light in response to a light-emission signal supplied from the MPU 1. An EEPROM 24 is a nonvolatile memory, which stores adjustment values associated with vibration reduction, other adjustment values associated with the camera, and the like.

In addition, the camera system incorporates a power supply for operating the above-mentioned mechanisms, the MPU 1, and the like, switches, other electrical mechanisms, and the like, but a detailed description of components that do not relate to the present invention will be omitted. The MPU 1 includes an A/D conversion function for converting analog outputs from the vibration detection mechanisms 4Y and 4P, the vibration reduction lens position detection mechanisms 5Y and 5P, and the like into digital values. Also, the MPU 1 includes a D/A conversion function for converting digital values used therein into analog values, and can control, e.g., the vibration reduction lens drive mechanisms 7Y and 7P by analog signals.

The respective mechanisms of this camera system will be explained in detail hereinafter while laying stress on their operations. Note that two sets of mechanisms associated with vibration reduction are required in correspondence with the yawing and pitching directions, as described above. However, since these mechanisms have substantially the same mechanism arrangement and perform substantially the same operations, the following explanation about the mechanism and operation will be basically given only for the yawing direction.

The operation of the position detection mechanism for detecting the position of the vibration reduction lens 2 will be described below. In general, a one-dimensional PSD (position sensitive light detector) is known as a position detection element. In this embodiment as well, the one-dimensional PSD is used in position detection of the vibration reduction lens 2, and an example thereof will be described below. The slit member 17Y in the yawing direction moves together with a change in position, in the yawing direction, of the vibration reduction lens 2, and light projected from the light-emitting diode LED1 passes through the slit member 17Y and is incident on the one-dimensional PSD1. The MPU 1 calculates the barycentric position of light passing through the slit member, i.e., the position, in the yawing direction, of the vibration reduction lens 2, on the basis of the ratio between two currents I1 and I2 output from the PSD1. A calculation formula for this purpose will be described below.

Let L be the total length of the PSD1 and x be the barycentric position of slit light or a vibration reduction lens position LRY while the central position of the PSD1 is assumed to be a zero coordinate position. Then, formula 1 below ideally holds:

$$2X/L = (I1-I2)/(I1+I2) \qquad \text{formula 1}$$

For the sake of simplicity, the following description will use concrete values in dimensions. However, the present invention is not limited to these values as long as the conditions to be described below are satisfied.

Figure 3:
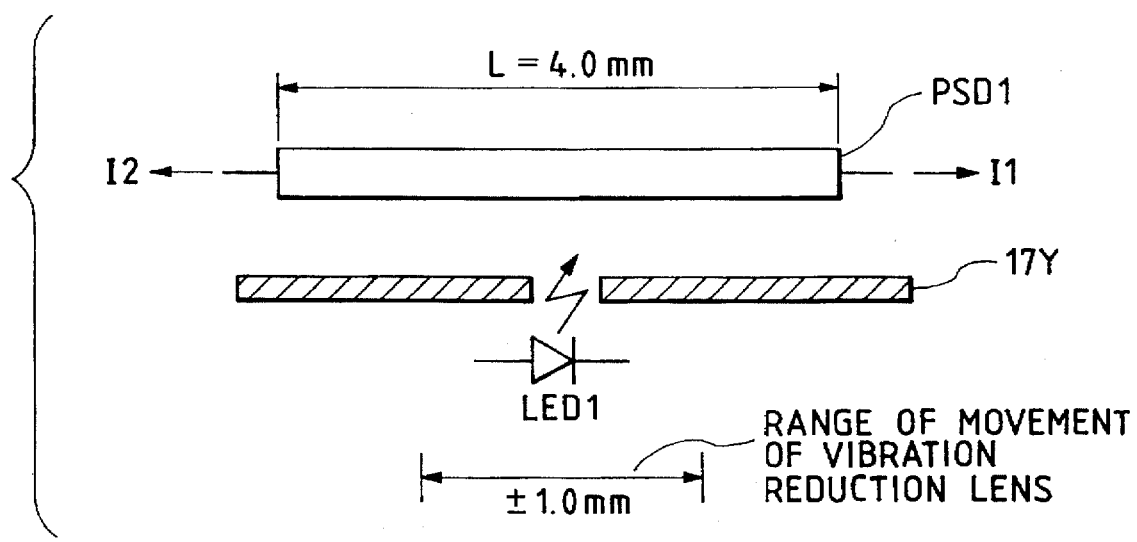
FIG. 3 is a view showing the arrangement of a vibration reduction lens position detection unit 5Y.
Figure 4A:
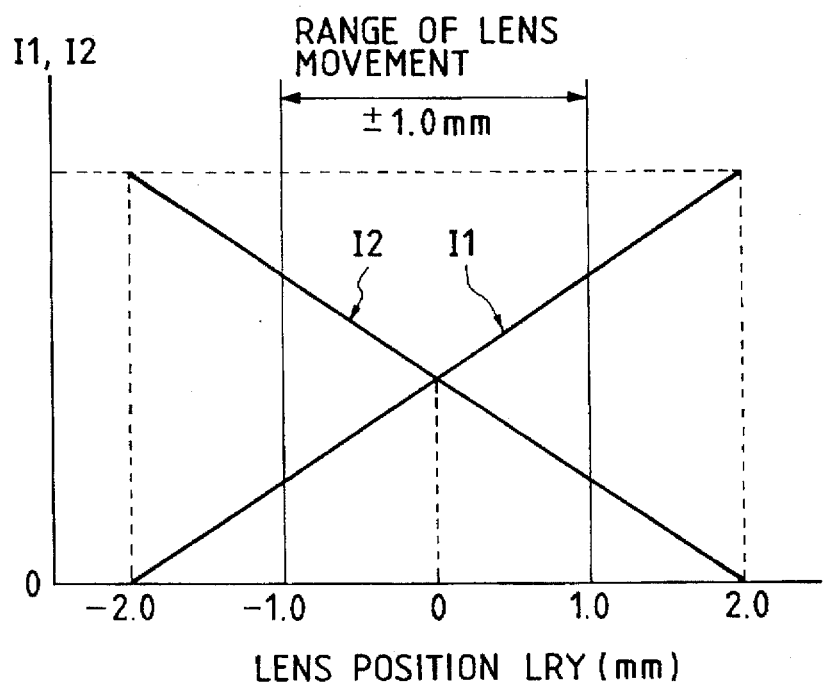
FIGS. 4A and 4B are graphs showing the current relationship of a vibration reduction lens drive circuit shown in FIG. 3.
Figure 4B:
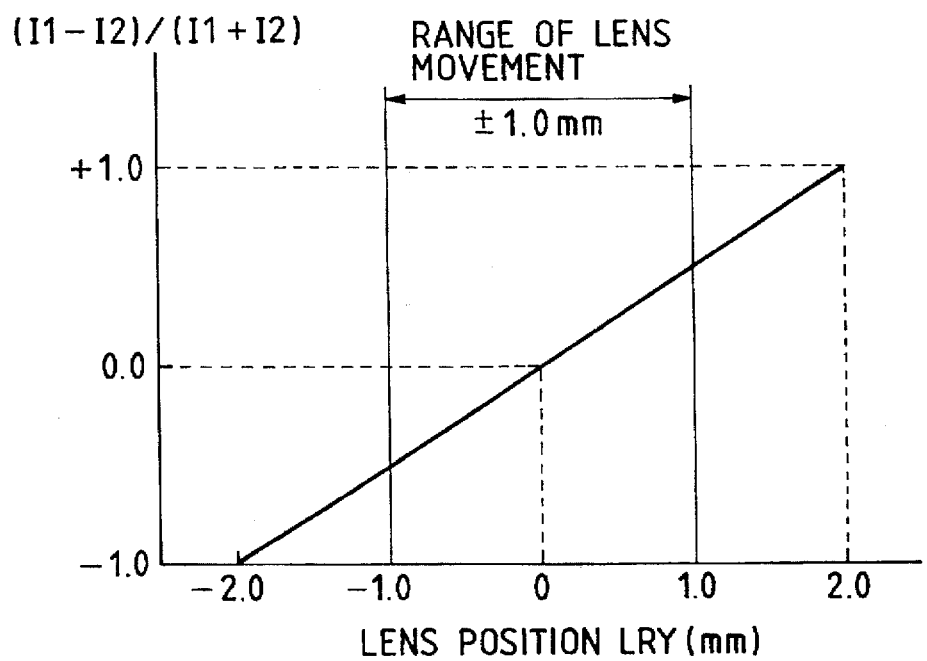

As shown in FIG. 3, assuming that the effective total length L of the PSD is 4.0 [mm], the movement range, in the yawing and pitching directions, of the vibration reduction lens 2 is ±1.0 [mm], and the vibration reduction lens 2 is located at the center of the movement range, light from the above-mentioned slit member is incident at substantially the central position of the PSD1. FIGS. 4A and 4B show the relationship among the position, in the yawing direction, of the vibration reduction lens 2, the outputs I1 and I2 from the PSD1, and the right-hand side in formula 1 under the above-mentioned condition. Also, the position, in the pitching direction, of the vibration reduction lens is also detected by a similar member arrangement.

Figure 5:
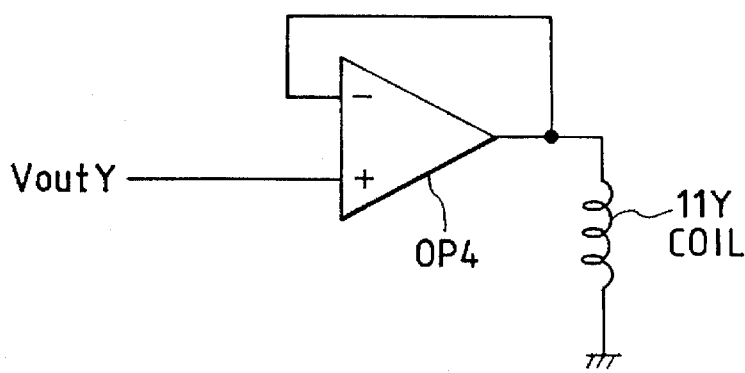
FIG. 5 is a circuit diagram of a vibration reduction lens drive mechanism 7Y.
Figure 7:
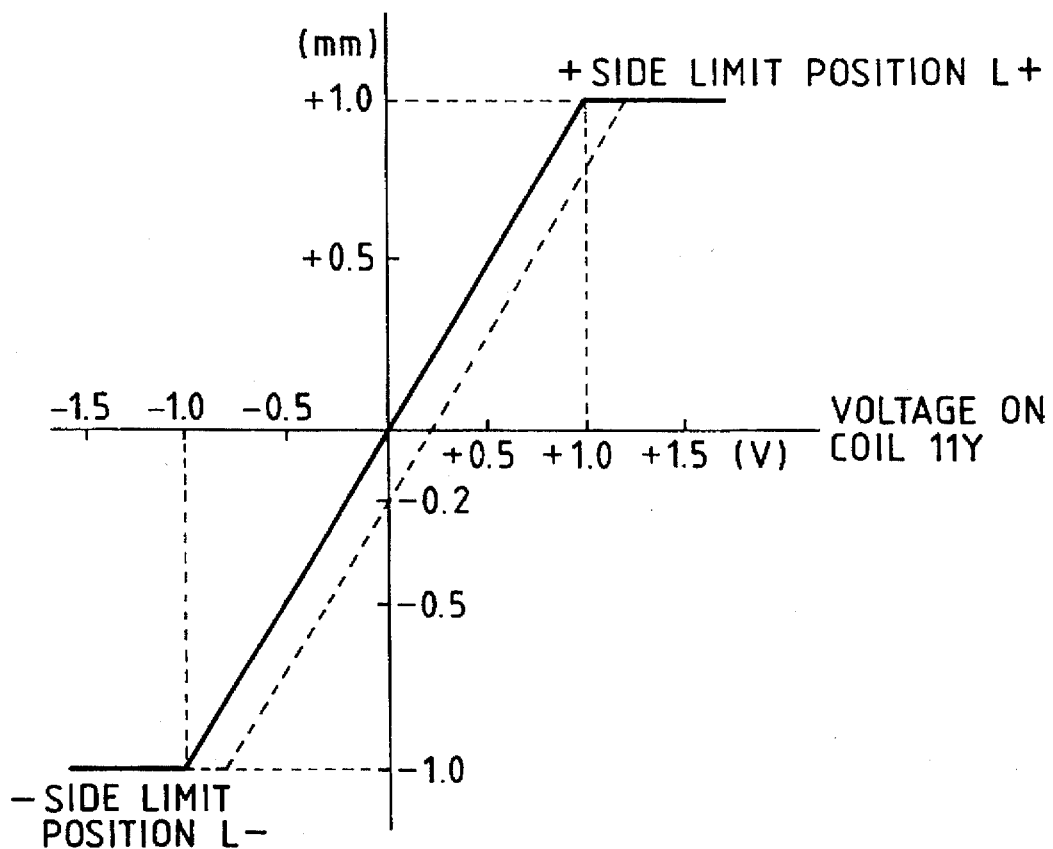
FIG. 7 is a graph showing the relationship between the voltage to be applied to the coil 11Y and the position of a vibration reduction lens.
Figure 6A:
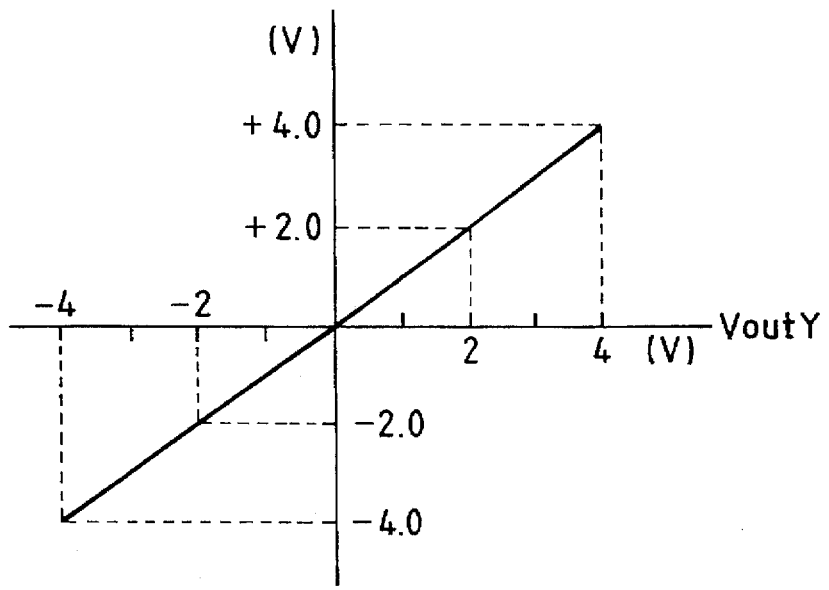
FIG. 6A is a graph showing the relationship between the voltage VoutY and the voltage to be applied a coil 11Y.

FIG. 5 shows an embodiment of the vibration reduction lens drive mechanism 7Y in the yawing direction. The coil 11Y in the yawing direction is driven by a voltage which is applied from a power operational amplifier OP4 and is substantially linear with respect to an output voltage VoutY from the MPU 1. FIG. 6A shows the relationship between the voltage VoutY and the voltage to be applied to the coil 11Y. The electrical resistance value of the coil 11Y can be considered to be nearly constant since a change in resistance due a temperature rise can be ignored if the energization time is short. For this reason, the coil 11Y is driven by a current proportional to the output voltage VoutY from the MPU 1, and provides a drive force substantially proportional to the output voltage VoutY from the MPU 1 together with the magnet 12Y. FIG. 7 shows an example of the relationship between the voltage to be applied to the coil 11Y and the position of the vibration reduction lens 2 under a stationary condition. Since the holding member 2a of the vibration reduction lens 2 is elastically supported, as described above, the elastic force (spring force) of the spring 15Y or 16Y increases in proportion to the outward change in position from the central position (defined to be "0" for the sake of convenience) of the movement range, in the yawing direction, of the vibration reduction lens, and the holding member 2a and the vibration reduction lens 2 are positionally balanced at a position where the elastic force and a magnetic drive force generated by the drive current supplied to the coil 11Y balance each other. This state is indicated by a solid line in FIG. 7. FIG. 7 illustrates that the vibration reduction lens 2 moves 1 [mm] per 1 [V] of the voltage to be applied to the coil 11Y. The vibration reduction lens 2 has a movement range from a position −1.0 [mm] to +1.0 [mm], and is never driven to a position beyond this range. Since the vibration reduction lens 2 is influenced by its weight (gravity), the position of the vibration reduction lens 2 under the stationary condition offsets toward the + or − side depending on the way the weight is supported. Also, when the elastic force to be applied to the vibration reduction lens 2 offsets to toward the + or − side, the position of the vibration reduction lens 2 under the stationary condition offsets.

Figure 6B:
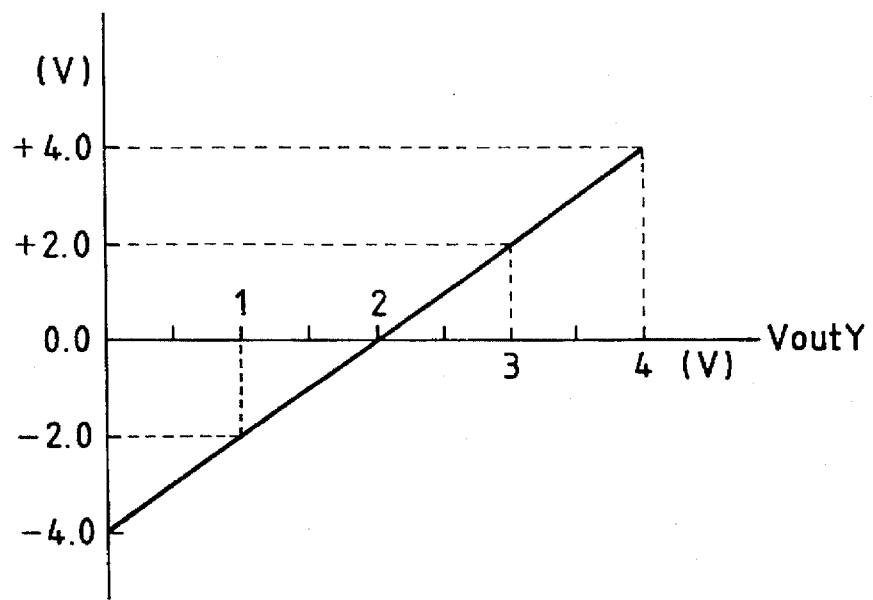
FIG. 6B is a graph showing a modification of FIG. 6A.

In FIG. 7, the dotted line indicates a case wherein the position of the vibration reduction lens 2 shifts by −0.2 [mm] due to its weight or the offset elastic force. Note that the MPU 1 incorporates a D/A converter that generates an arbitrary voltage for obtaining the output VoutY. Note that most of D/A converters incorporated in normal one-chip microcomputers used as the MPU 1 can generate only a positive voltage in most cases. In such case, the vibration reduction lens drive mechanism 7Y is designed to have input/output characteristics, as shown in FIG. 6B. Alternatively, a linear motor drive IC which is used in a tracking control actuator for a compact disk drive in recent years and obtains a linear drive voltage with respect to the input voltage may be used. The following description will be continued using the type shown in FIG. 6A, for the sake of simplicity.

Figure 8A:
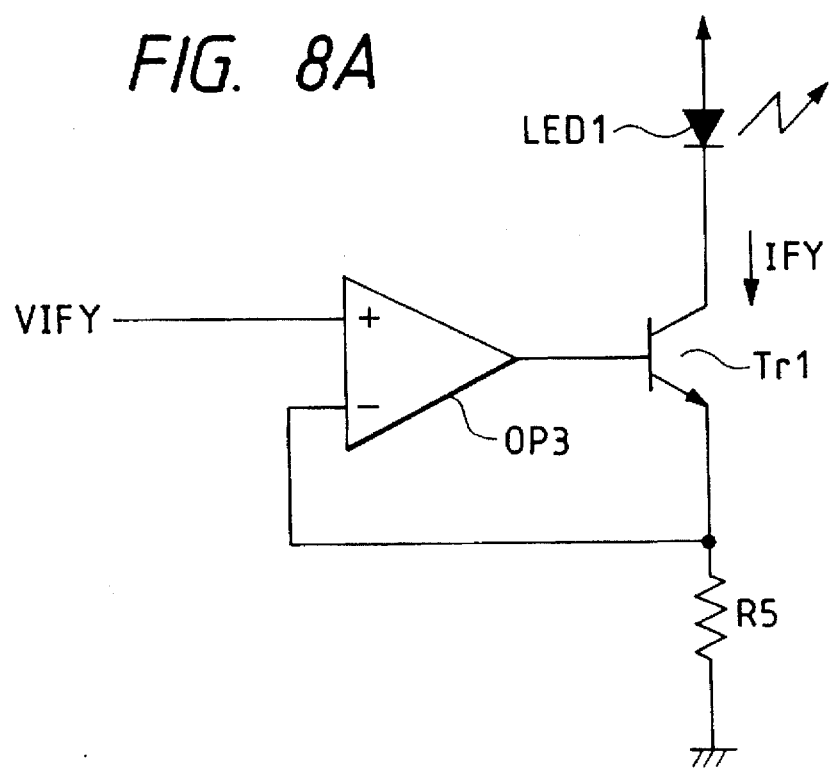
FIGS. 8A and 8B are circuit diagrams showing examples of a light-emission unit in a vibration reduction lens position detection mechanism.

An embodiment of the vibration reduction lens position detection mechanism 5Y in the yawing direction will be explained below. The vibration reduction lens position detection mechanism 5Y is divided into a light-emission unit mechanism and a light-receiving unit circuit. FIG. 8A shows the first embodiment of the light-emission unit circuit in the yawing direction. An input VIFY of this circuit is connected to the input of an operational amplifier OP3, and is current-amplified by a transistor Tr1, thus driving the light-emitting diode LED1. Note that an infrared light-emission type light-emitting diode is used as the LED1. Alternatively, a laser diode may be used owing to its high coherence. If the resistor R5 is assumed to have a resistance RIF, a driving current IFY supplied to the LED1 and the input voltage VIFY of this circuit roughly satisfy a relation given by formula 2:

$$IFY = VIFY/RIF \quad \text{formula 2}$$

Note that the MPU 1 incorporates a D/A converter or the like that generates an arbitrary voltage for obtaining the output VIFY.

Figure 8B:
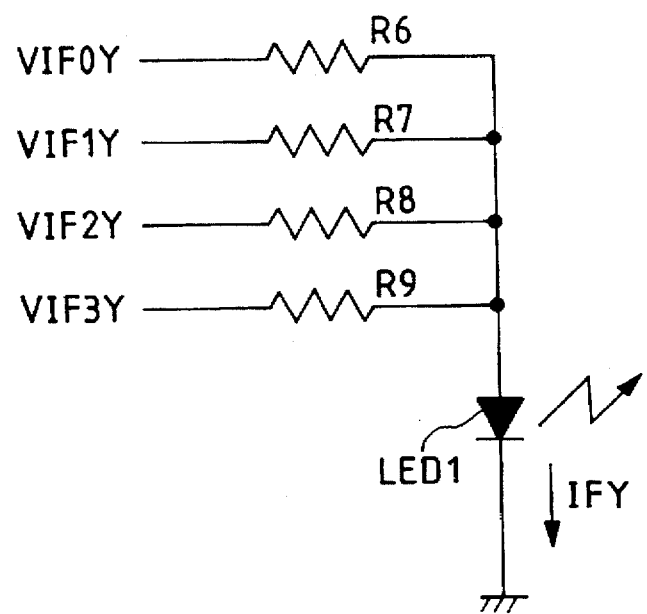
Figure 9:
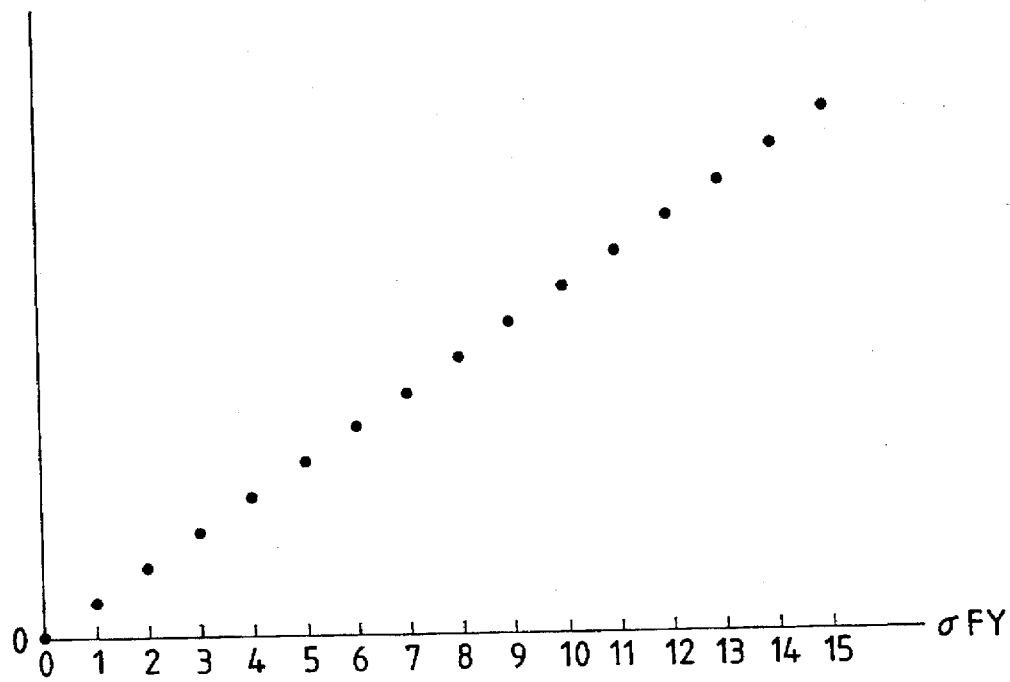
FIG. 9 is a graph showing the input/output characteristics of the light-emission unit of the vibration reduction lens position detection mechanism shown in FIG. 7.

FIG. 8B shows the second embodiment of the light-emission unit circuit in the yawing direction. FIG. 8B shows an example of a circuit which changes the drive current IFY of the LED1 by four-bit data, i.e., digital inputs VIF0Y, VIF1Y, VIF2Y, and VIF3Y each having predetermined High level or predetermined Low level. The inputs VIF0Y, VIF1Y, VIF2Y, and VIF3Y are connected to the MPU 1, and can set 16 different setting values "0" to "15" in correspondence with the combinations of High and Low levels of the four bits. By appropriately setting resistors R6, R7, R8, and R9, the drive current IFY can be roughly linearly controlled with respect to 16 different setting values σFY "0" to "15" determined by the combinations of VIF0Y, VIF1Y, VIF2Y, and VIF3Y. FIG. 9 shows the relationship between σFY and IFY.

Figure 10:
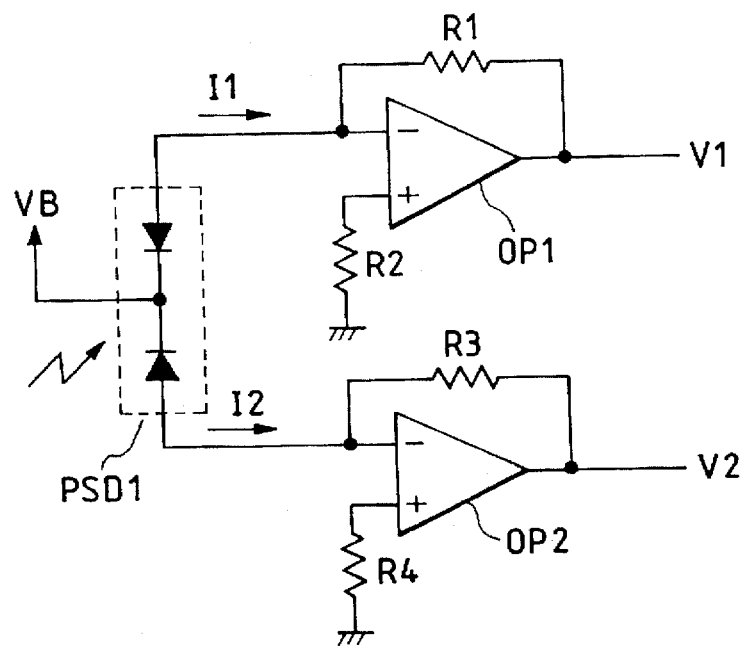
FIG. 10 is a circuit diagram of a detection unit in a vibration reduction lens position detection circuit according to the embodiment shown in FIG. 1.

FIG. 10 shows the circuit of the detection unit in the vibration reduction lens position detection mechanism 5Y in the yawing direction. As an element for detecting the position of the vibration reduction lens, a one-dimensional PSD is used. A light beam emitted by the LED1 and passing through the slit of the slit member 17Y becomes incident on a certain position of the PSD1. The incident position of the light beam on the PSD1 changes depending on the position, in the yawing direction, of the vibration reduction lens 2, and the ratio between the output currents I1 and I2 from the PSD1 also changes depending on the position, in the yawing direction, of the vibration reduction lens 2. The PSD1 is applied with a reverse bias voltage VB by a known method, so that its high-speed response characteristics are assured. The output currents I1 and I2 from the PSD1 are input to current-voltage converters respectively constituted by operational amplifiers OP1 and OP2, and resistors R1, R2, R3, and R4, and voltage-converted outputs V1 and V2 are output to the MPU 1. Note that the resistances of the resistors R2 and R4 are determined to cancel the influence of the input bias currents to the operational amplifiers OP1 and OP2 on the outputs V1 and V2. The MPU 1 incorporates an A/D converter and can monitor the voltages V1 and V2.

Note that most of A/D converters built in normal one-chip microcomputers used as the MPU 1 can generate only a positive voltage in most cases. In such case, an appropriate A/D converter may be arranged outside the MPU 1, or the outputs V1 and V2 may be appropriately inverted and amplified using a known technique to obtain positive voltage outputs. Alternatively, the circuit may be designed, so that the terminals on the GND side of the resistors R2 and R4 in FIG. 10 are connected to an appropriate reference voltage, and the outputs V1 and V2 shifted by the reference voltage are obtained.

Figure 11:
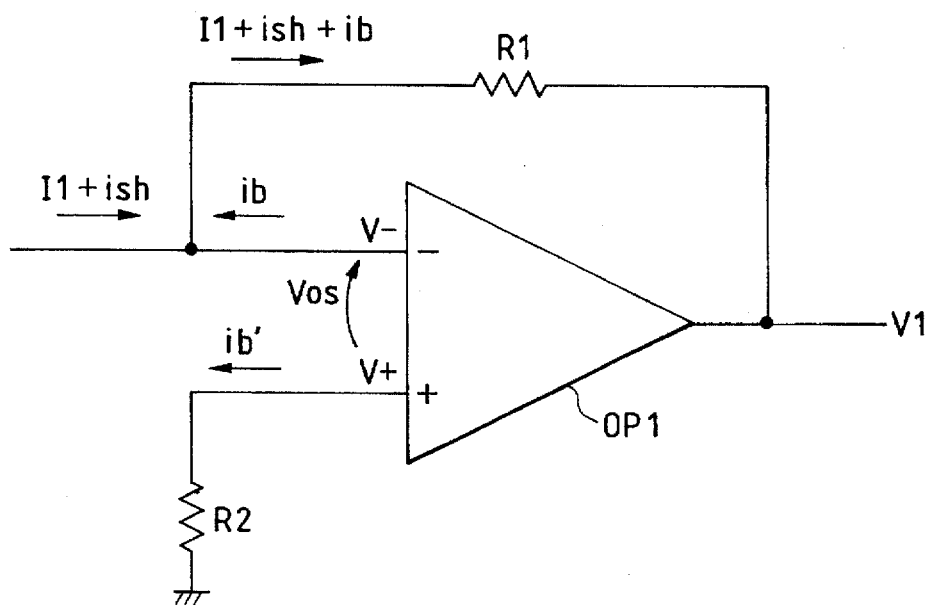
FIG. 11 is a circuit diagram for explaining the operation of the detection unit in the vibration reduction lens position detection circuit according to the embodiment shown in FIG. 1.

The circuit of the detection unit shown in FIG. 10 will be analyzed in detail below. FIG. 11 shows in detail the voltage and current values of the upper circuit portion in FIG. 10. Let I1 be the output current of the PSD1, ish be the dark current, ib be the input bias current at the −input terminal of the operational amplifier OP1, ib' be the input bias current at the + input terminal of the operational amplifier OP1, Vos be the input offset voltage, and Rf and Rb be the resistances of the resistors R1 and R2. Also, the directions of the currents and voltages are as shown in FIG. 11. In this case, the respective voltages satisfy relations given by formulas 3, 4, and 5 below:

$$V+ = ib' \times Rb \quad \text{formula 3}$$

$$V- = Vos + V+ \quad \text{formula 4}$$

$$\begin{aligned} V1 &= Vos + ib' \times Rb \\ &\quad -(I1 + ish + ib) \times Rf + V- \\ &= -I1 \times Rf + \{Vos + (ib' \times Rb - ib \times Rf) - ish \times Rf\} \end{aligned} \quad \text{formula 5}$$

As shown in formula 5, V1 includes an error under the influence of the input offset voltage Vos, the input bias currents ib and ib', and the dark current ish with respect to an output voltage −I1×Rf obtained when an ideal operational amplifier and an ideal PSD are used. If Rb=Rf is set and ios=ib'−ib, formula 5 is rewritten as formula 6 below:

$$V1 = -I1 \times Rf + \{Vos + ios \times Rf - ish \times Rf\} \quad \text{formula 6}$$
$$= (-I1 + ios - ish) \times Rf + Vos$$

Note that ios corresponds to the input offset current of the operational amplifier OP1. As can be seen from formulas 5 and 6, V1, and V2, which is similarly output as in V1, are output as voltages respectively proportional to I1 and I2 when the influence of the input offset voltage Vos, the input bias currents ib and ib', the dark current ish, and the like is negligibly small.

Figure 12:
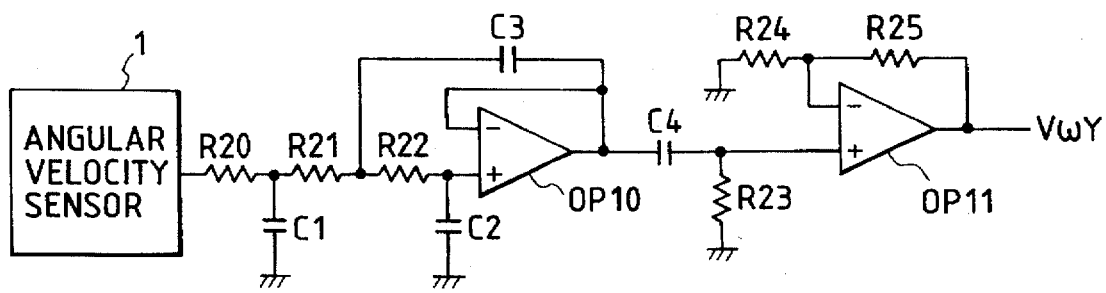
FIG. 12 is a circuit diagram of a vibration detection circuit according to the embodiment shown in FIG. 1.
Figure 13:
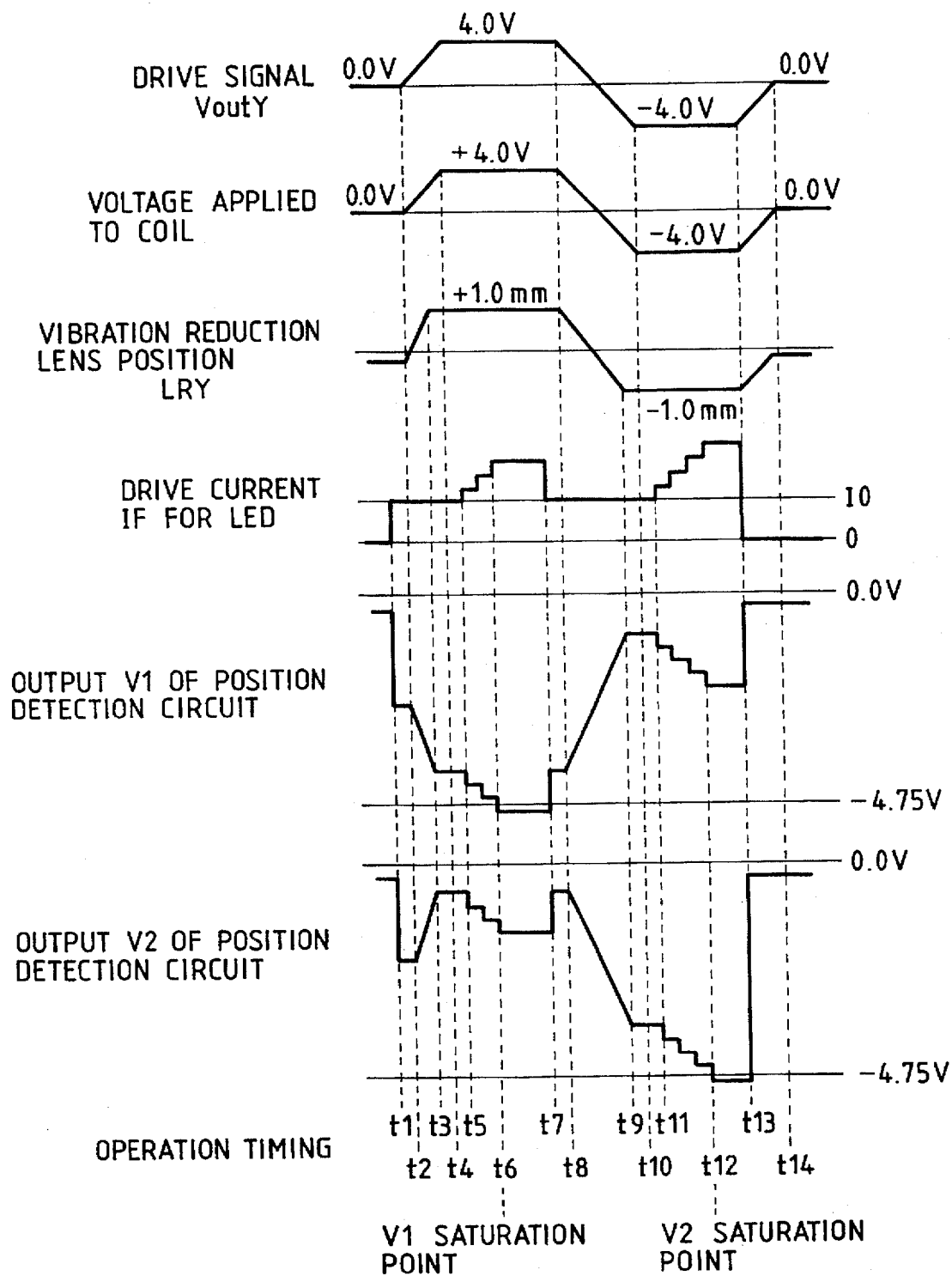
FIG. 13 is a timing chart showing the adjustment operation of a light-emission unit in the vibration reduction lens position detection circuit according to the embodiment shown in FIG. 1.

An embodiment of the vibration detection mechanism 4Y will be described below with reference to FIG. 12. An angular velocity sensor 1 detects the angular velocity of camera shake generated in the camera, and generates an output corresponding to the detected angular velocity. The sensor 1 uses a piezoelectric vibration type gyro for detecting the Coriolis' force. A circuit constituted by resistors R20, R21, and R22, capacitors C1, C2, and C3, and an operational amplifier OP10 is a low-pass filter circuit for removing high-frequency components independently of camera shake, especially, high-frequency noise components of the angular velocity sensor, from the output from the angular velocity sensor 1. A circuit-constituted by a capacitor C4 and a resistor R23 constitutes a high-pass filter for removing low-frequency components independently of camera shake. A circuit constituted by an operational amplifier OP11, and resistors R24 and R25 non-inverting-amplifies the output from the above-mentioned high-pass filter to a voltage level that can be easily processed in the MPU 1, and outputs it to the MPU 1. VωY represents this output. The output VωY obtained by the vibration detection mechanism in the yawing direction is substantially proportional to the angular velocity, in the yawing direction, generated in the camera. Note that the vibration detection mechanism 4P in the pitching direction detects the angular velocity, in the pitching direction, generated in the camera by the same circuit arrangement.

Adjustment of the light-emission amount of the light-emission unit in the vibration reduction lens position detection mechanism 5Y in the yawing direction will be explained below. This function is provided to automatically adjust variations in light-emission amount and changes in light-emission amount due to changes in temperature of the light-emitting diode used in the light-emission unit in the vibration reduction lens position detection mechanism by the camera itself at a predetermined camera operation timing (to be described later) without requiring any adjustment by an external adjustment device of the camera, so as to assure a broad dynamic range of the output form the vibration reduction lens position detection mechanism, thereby obtaining sufficiently high position detection resolution of the vibration reduction lens 2. An embodiment of the adjustment of the light-emission amount of the light-emission unit will be explained below.

The light-emission amount of the light-emitting diode LED1 is adjusted, so that the output voltages V1 and V2 from the detection unit of the vibration reduction lens position detection mechanism 5Y fall within a predetermined voltage range at all the positions within the movement range, in the yawing direction, of the vibration reduction lens 2, and a maximum light-emission amount is obtained. More specifically, the vibration reduction lens 2 is driven to each end of the movement range in the yawing direction, and the outputs V1 and V2 from the detection unit in the vibration reduction lens position detection mechanism 5Y in the yawing direction are monitored while changing the drive current to be supplied to the light-emitting diode LED1 in the yawing direction at that time, thereby detecting the maximum drive current of the light-emitting diodes LED1 in the yawing direction at which V1 and V2 do not have a voltage value lower than a predetermined voltage (−4.75 [V] in this embodiment). The outputs V1 and V2 from the vibration reduction lens position detection mechanism 5Y in the yawing direction monotonously increase or decrease with respect to changes in position of the vibration reduction lens 2, as shown in FIG. 4A. Therefore, when this adjustment is performed at each end of the movement range of the vibration reduction lens, as described above, the outputs V1 and V2 never become lower than the predetermined voltage and the light-emission amount of the light-emitting diode can assume a maximum value independently of the position of the vibration reduction lens 2 in the movement range.

Likewise, the vibration reduction lens 2 is driven to each end of the movement range in the pitching direction, and the outputs V1 and V2 from the detection unit in the vibration reduction lens position detection mechanism 5Y in the pitching direction are monitored while changing the drive current of a light-emitting diode in the pitching direction, thereby detecting the maximum drive current of the light-emitting diode in the pitching direction, at which the outputs V1 and V2 do not become lower than −4.75 [V].

Figure 14:
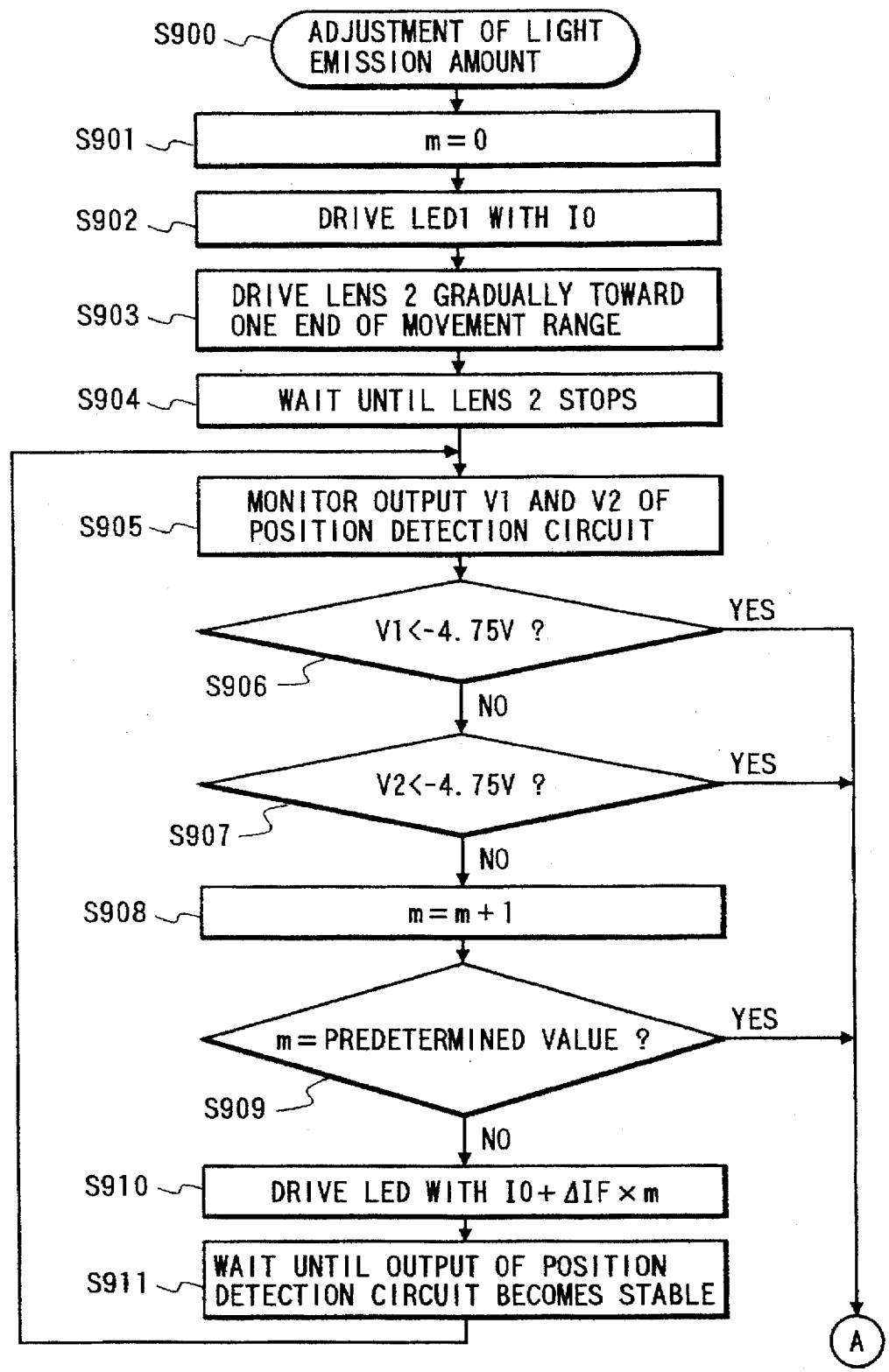
FIG. 14 is a flow chart showing the adjustment operation of the light-emission unit in the vibration reduction lens position detection circuit according to the embodiment shown in FIG. 1.
Figure 15B:
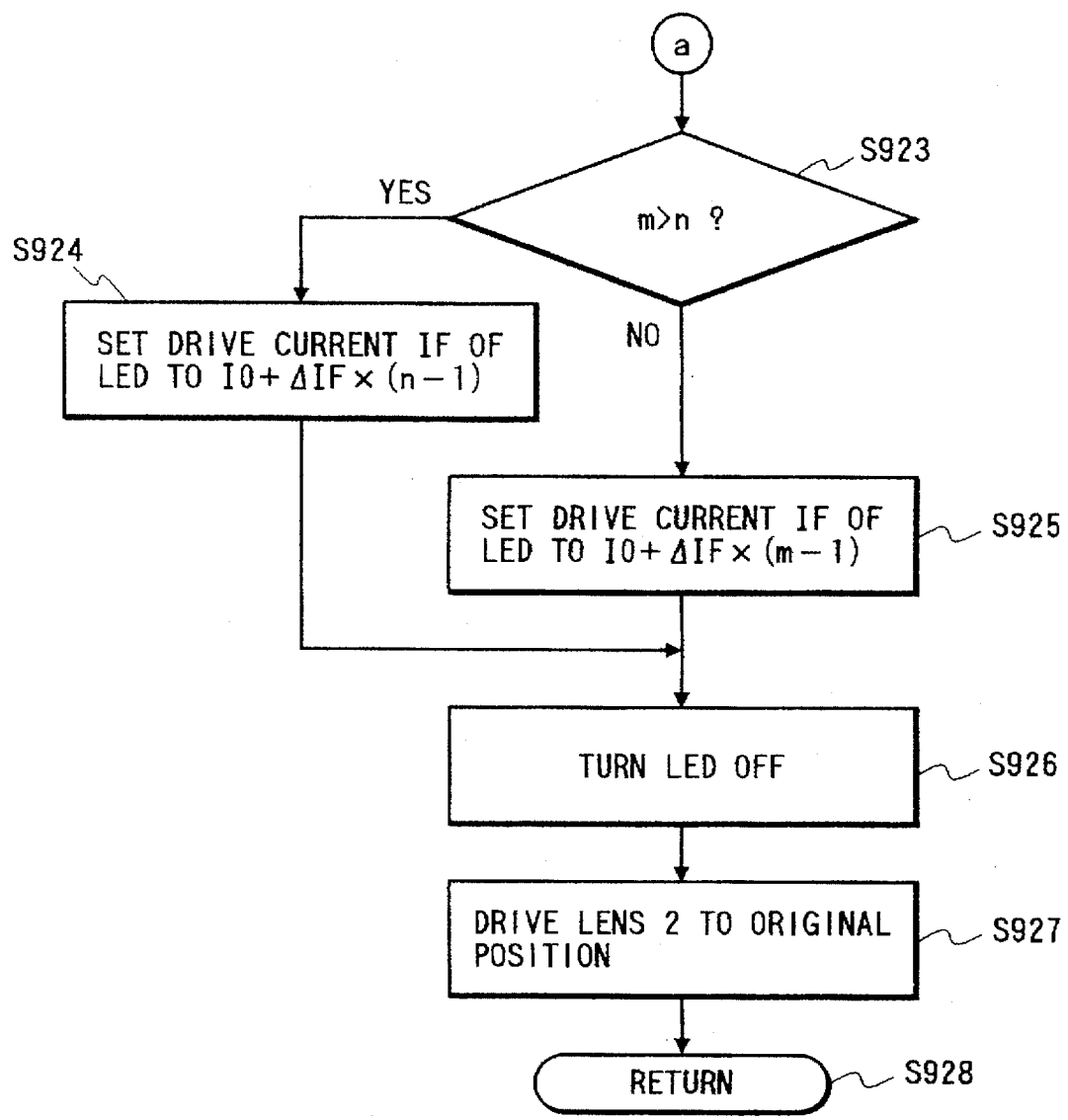
FIG. 15 is comprised of FIGS. 15A and 15B illustrating flow charts showing the adjustment operation of the light-emission unit in the vibration reduction lens position detection circuit according to the embodiment shown in FIG. 1.

An example of the adjustment of the light-emission amount of the light-emitting diode LED1 in the yawing direction will be described below with reference to FIGS. 13, 14, 15A and 15B. Note that the same control is performed in the pitching direction to adjust the light-emission amount of the light-emitting diode although a detailed description thereof will be omitted. FIGS. 14, 15B and 15B are flow charts showing the flow of control of a portion associated with the adjustment of the light-emission amount of the LED1 in the yawing direction of a software program incorporated in the MPU 1. The processing starts from step S900, and "0" as an initial value is set in a counter m in step S901. In step S902, the LED1 is driven with a predetermined drive current initial value I0 (corresponding to time t1 of "operation timing" in FIG. 13). The current value I0 in step S902 is assumed to be a current value at which the outputs V1 and V2 are never saturated even when the LED1 is driven with this current value upon design, in consideration of the use temperature range of the camera, and the like. In step S903, the vibration reduction lens 2 is driven gradually toward the end on the + side of the movement range in the yawing direction. The input VoutY of the vibration reduction lens drive mechanism 7Y (FIG. 5) is gradually increased from 0.0 [V] to +4.0 [V] during the period between operation times t2 to t4 in the timing chart in FIG. 13. With this operation, the voltage applied to the coil 11Y gradually changes from 0.0 [V] to +4.0 [V], and the vibration reduction lens 2 is driven gradually toward the + side in the yawing direction. At time t3, the vibration reduction lens 2 collides against the end on the +side of the movement range (the position +1.0 [mm] of the vibration reduction lens). When the vibration reduction lens 2 is driven toward the end on the + side of the movement range, the outputs V1 and V2 from the vibration reduction lens position detection mechanism 5Y in the yawing direction are monitored in step S905 (corresponding to time t5 in FIG. 13). When the vibration reduction lens 2 collides against the end of the movement range, it may bounce slightly, i.e., the voltage values V1 and V2 may fluctuate. In such case, a time required until the bounce settles down is assured before monitor time t5 of V1 and V2 (corresponding to the processing in step S904 in FIG. 14). If it is determined in step S906 that the monitored output V1 is lower than a predetermined voltage (−4.75 [V] in this case), the flow advances to step S912 (see FIG. 15A). On the other hand, if NO in step S906, and if it is determined in step S907 that the monitored output V2 is lower than a predetermined voltage (−4.75 [V] in this case), the flow advances to step S912; otherwise, the value of the counter m is incremented by 1 in step S908, and it is checked in step S909 if m has reached a predetermined value. If it is determined in step S909 that m=the predetermined value, the flow advances to step S912; otherwise, the LED1 is driven with a drive current calculated by I0+ΔIF×m in step S910. In step S911, the control waits until the outputs V1 and V2 from the detection unit in the vibration reduction lens position detection mechanism 5Y in the yawing direction become stable, and thereafter, the flow returns to step S905. The processing operations in steps S905 to S911 are repeated until V1<−4.75 [V], V2<−4.75 [V], or m=the predetermined value holds. In this manner, the drive current IF of the LED1 is gradually increased, and a maximum drive current IF of the LED1 at which the outputs V1 and V2 from the detection unit of the vibration reduction lens position detection unit 5Y in the yawing direction at the end on the + side of the movement range do not become lower than a predetermined voltage (−4.75 [V] in this case) is obtained as I0+ΔIF×(m−1). The state of the drive current of the LED1 and the outputs V1 and V2 will be explained below with reference to the timing chart of FIG. 13. The drive current of the LED1 is gradually increased in units of increments ΔIF from time t5, and when the drive current is increased at time t6, the voltage V1 becomes lower than the predetermined voltage (−4.75 [V]).

In step S912 shown in FIG. 15A, "0" as an initial value is set in a counter n. In step S913, the LED1 is driven with a predetermined drive current initial value I0 (corresponding to time t7 in FIG. 13). In step S914, the vibration reduction lens 2 is driven gradually toward the end on the–side of the movement range in the yawing direction. The input VoutY of the vibration reduction lens drive mechanism 7Y (FIG. 5) is gradually decreased from +4.0 [V] to −4.0 [V] during the period between operation times t8 to t10 in the timing chart in FIG. 13. With this operation, the voltage applied to the coil 11Y gradually changes from +4.0 [V] to −4.0 [V], and the vibration reduction lens 2 is driven gradually toward the–side in the yawing direction. At time t9, the vibration reduction lens 2 collides against the end on the–side of the movement range (the position −1.0 [mm] of the vibration reduction lens). When the vibration reduction lens 2 is driven toward the end on the–side of the movement range, the outputs V1 and V2 from the vibration reduction lens position detection mechanism 5Y in the yawing direction are monitored in step S916 (corresponding to time t11 in FIG. 13). When the vibration reduction lens 2 collides against the end of the movement range, it may bounce slightly, i.e., the voltage values V1 and V2 may fluctuate. In such case, a time required until the bounce settles down is assured before monitor time t11 of V1 and V2 (corresponding to the processing in step S915 in FIG. 15A). If it is determined in step S917 that the monitored output V1 is lower than a predetermined voltage (−4.75 [V] in this case), the flow advances to step S923. On the other hand, if NO in step S917, and if it is determined in step S918 that the monitored output V2 is lower than a predetermined voltage (−4.75 [V] in this case), the flow advances to step S923; otherwise, the value of the counter n is incremented by 1 in step S919, and it is checked in step S920 if n has reached a predetermined value. If it is determined in step S920 that n=the predetermined value, the flow advances to step S923; otherwise, the LED1 is driven with a drive current calculated by I0+ΔIF×n in step S921. In step S922, the control waits until the outputs V1 and V2 from the detection unit in the vibration reduction lens position detection mechanism 5Y in the yawing direction become stable, and thereafter, the flow returns to step S916. The processing operations in steps S916 to S922 are repeated until V1<−4.75 [V], V2<−4.75 [V], or n=the predetermined value holds. In this manner, the drive current IF of the LED1 is gradually increased, and a maximum drive current IF of the LED1 at which the outputs V1 and V2 from the detection unit of the vibration reduction lens position detection unit 5Y in the yawing direction at the end on the–side of the movement range do not become lower than a predetermined voltage (−4.75 [V] in this case) is obtained as I0+ΔIF×(n−1). The state of the drive current of the LED1 and the outputs V1 and V2 will be explained below with reference to the timing chart of FIG. 13. The drive current of the LED1 is gradually increased in units of increments ΔIF from time t11, and when the drive current is increased at time t12, the voltage V2 becomes lower than the predetermined voltage (−4.75 [V]).

Subsequently, it is checked in step S923 if m>n. If m>n, i.e., n is smaller than m, the optimal drive current of the LED1 is set to be I0+ΔIF×(n−1) in step S924; if m≦n, i.e., n is not smaller than m, the optimal drive current of the LED1 is set to be I0+ΔIF×(m−1) in step S925. Thereafter, in each case, the flow advances to step S926, and the light-emitting diode LED1 is turned off (corresponding to time t13 in FIG. 13). In step S927, the vibration reduction lens 2 is driven toward the vicinity of the original position in the yawing direction. The input VoutY of the vibration reduction lens drive mechanism 7Y (FIG. 5) is increased gradually from −4.0 [V] to 0.0 [V] during the period from time t13 to time t14 in FIG. 13. With this operation, the voltage applied to the coil 11Y in the yawing direction gradually changes from −4.0 [V] to 0.0 [V], and the vibration reduction lens 2 is driven gradually to the vicinity of the original position in the yawing direction. In step S928, the adjustment control of the light-emission amount in the yawing direction ends.

The circuit of the light-emission unit used in the above-mentioned adjustment of the light-emission amount of the light-emitting diode LED1 may be either of the type shown in FIG. 8A or 8B. The increment ΔIF of the drive current of the light-emitting diode LED1, and the initial drive current I0 may be appropriately selected. For example, when the circuit of the light-emission unit adopts the type shown in FIG. 8A, and ΔIF is finely set, the light-emission amount can be adjusted with higher precision. Alternatively, the initial drive current I0 may be set to be "0".

Adjustment of the detection unit in the vibration reduction lens position detection mechanism 5Y will be explained below. First, the significance of the adjustment of the detection unit in the vibration reduction lens position detection mechanism 5Y will be explained.

As can be seen from formulas 5 and 6, the influence of the input bias currents of the operational amplifiers OP1 and OP2 can be theoretically canceled by setting the resistance of the resistor Rb to be an appropriate value. The remaining influence is accounted for by the input offset current values of the operational amplifiers OP1 and OP2, the input offset voltage value, and the dark current value of the PSD1 on the outputs V1 and V2. If these values are always constant under every use conditions of the camera, they may be adjusted by a circuitry or software of, e.g., a one-chip microcomputer or the like upon delivery of each camera. However, since the input offset current values, the input offset voltage value, and the dark current value respectively have temperature dependence, even when the above-mentioned adjustment is performed, these errors may increase depending on the temperature condition when the camera is used. In order to reduce output errors caused by these factors, in the first method, the light-emission amount of the light-emitting diode may be increased. However, the maximum rating of the light-emitting diode has an upper limit in practice. In the second method, operational amplifiers with low input offset values and low input bias currents may be used. However, such operational amplifiers are generally expensive, resulting in an increase in cost.

Figure 16:
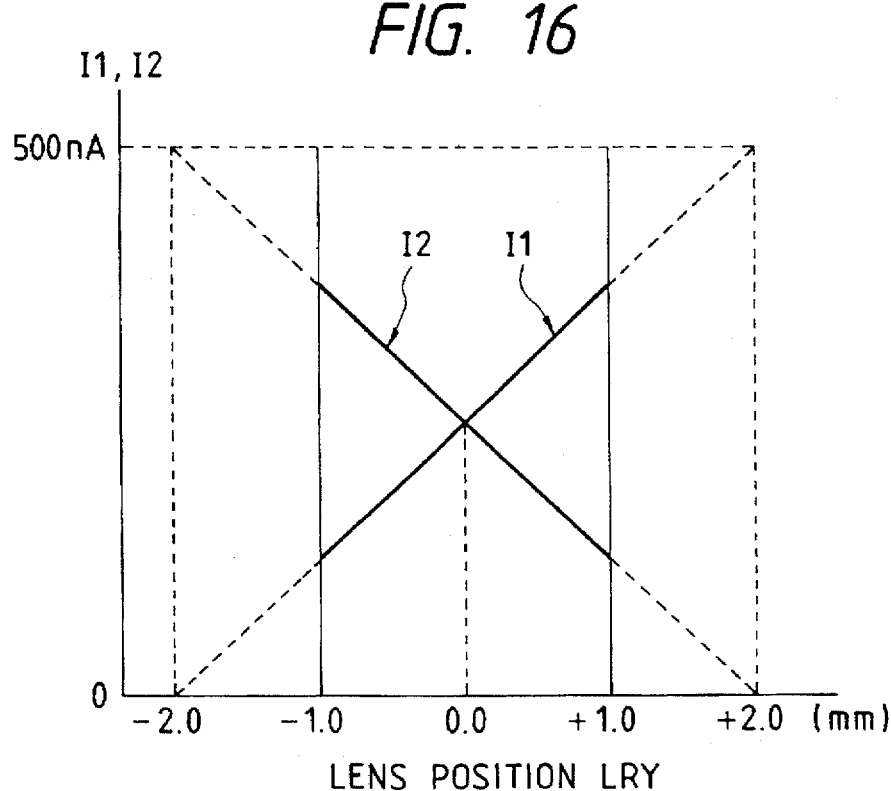
FIG. 16 is a graph for explaining the adjustment operation of the detection unit in the vibration reduction lens position detection circuit according to the embodiment shown in FIG. 1.
Figure 17:
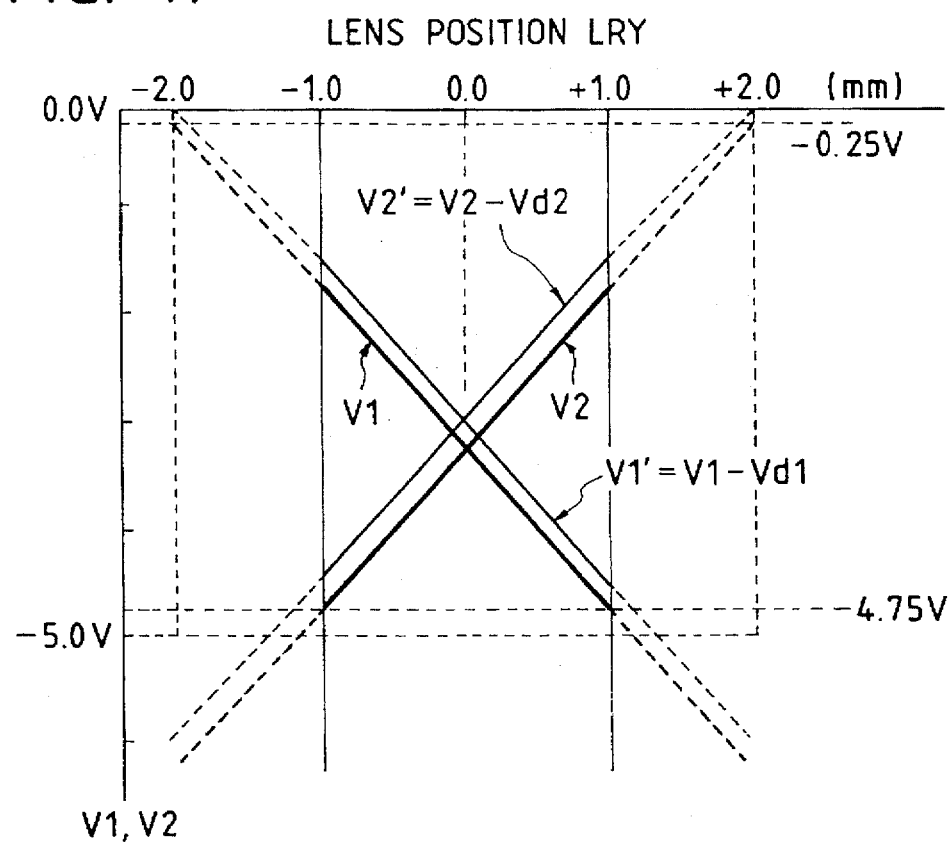
FIG. 17 is a graph for explaining the adjustment operation of the detection unit in the vibration reduction lens position detection circuit according to the embodiment shown in FIG. 1.

Such problems will be explained below using concrete numerical values. As a first example, assume that as a result of the above-mentioned adjustment of the light-emission amount of the light-emitting diode LED1, the output currents I1 and I2 of the PSD1 are output while being offset upon a change in position, in the yawing direction, of the vibration reduction lens 2, as shown in FIG. 16 (note that the dark current of the PSD1 is not included in I1 and I2 for the sake of convenience), and the output voltages V1 and V2 of the detection unit are output with an error of −0.25 [V] from ideal outputs (indicated by thin solid lines V1' and V2' in FIG. 17) under the influence of the dark current of the PSD1, the input offset voltages and the input offset currents of the operational amplifiers OP1 and OP2, and the like, as indicated by bold solid lines V1 and V2 in FIG. 17. The error of −0.25 [V] is a practical value, and is generated when, for example, input offset currents as low as about 20 nA of the operational amplifiers OP1 and OP2 are generated. Since V1 and V2 should ideally become output voltages proportional to I1 and I2, the vibration reduction lens position LRY in the yawing direction is determined by formula 7 below on the basis of the relation given by formula 1:

$$LRY = \gamma \times \{(V1-V2)/(V1+V2)\} \qquad \text{formula 7}$$

For $\gamma = 2.0$ [mm] since the PSD1 has a total length L=4.0 [mm] and the movement range, in the yawing direction, of the vibration reduction lens 2 is 2.0 [mm].

Figure 18:
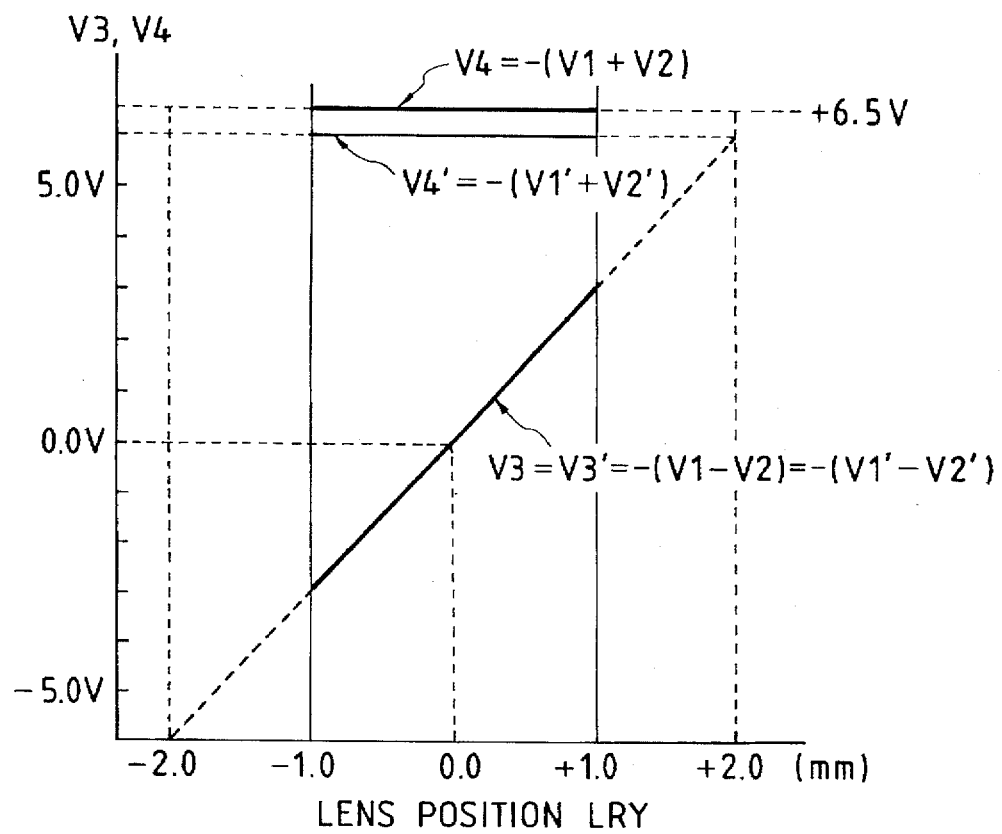
FIG. 18 is a graph for explaining the adjustment operation of the detection unit in the vibration reduction lens position detection circuit according to the embodiment shown in FIG. 1.
Figure 19:
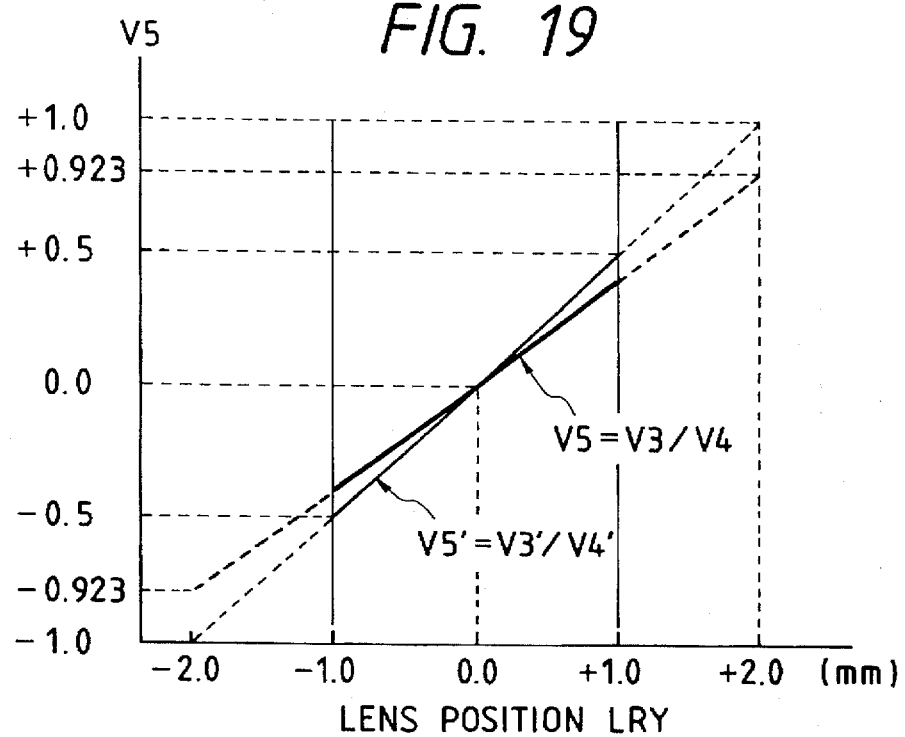
FIG. 19 is a graph for explaining the adjustment operation of the detection unit in the vibration reduction lens position detection circuit according to the embodiment shown in FIG. 1.

However, the vibration reduction lens position LRY in the yawing direction calculated by formula 7 suffers an error of about −7.7% with respect to an ideal line indicated by a thin solid line V5' in FIG. 19, as indicated by a bold solid line V5 in FIG. 19. Note that V3=−(V1−V2) and V4=−(V1+V2) as intermediate calculation results of formula 7 are indicated by bold solid lines in FIG. 18.

Figure 20:
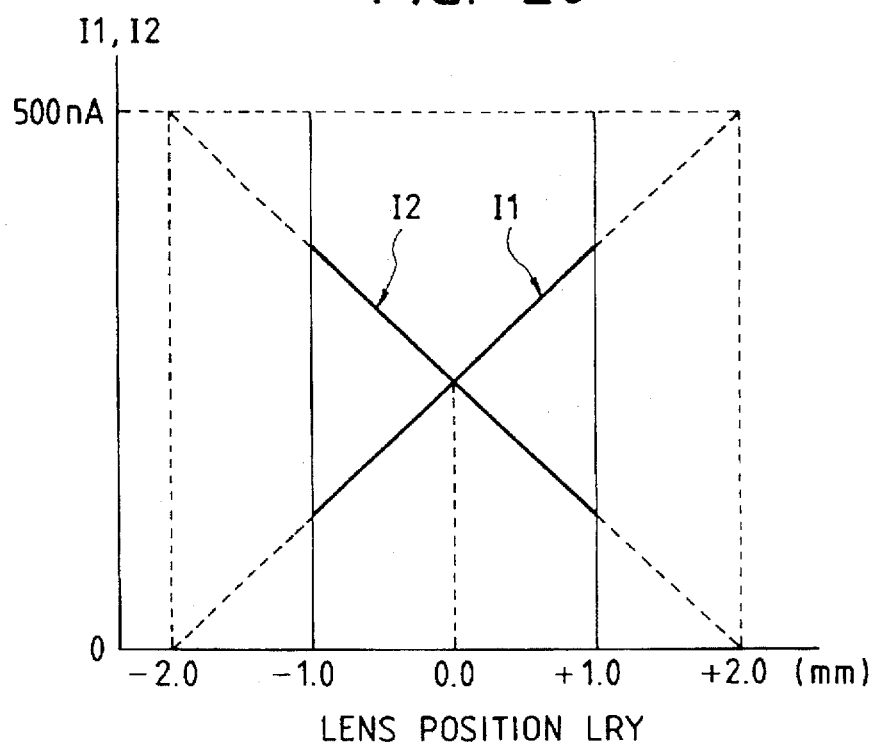
FIG. 20 is a graph for explaining the adjustment operation of the detection unit in the vibration reduction lens position detection circuit according to the embodiment shown in FIG. 1.
Figure 21:
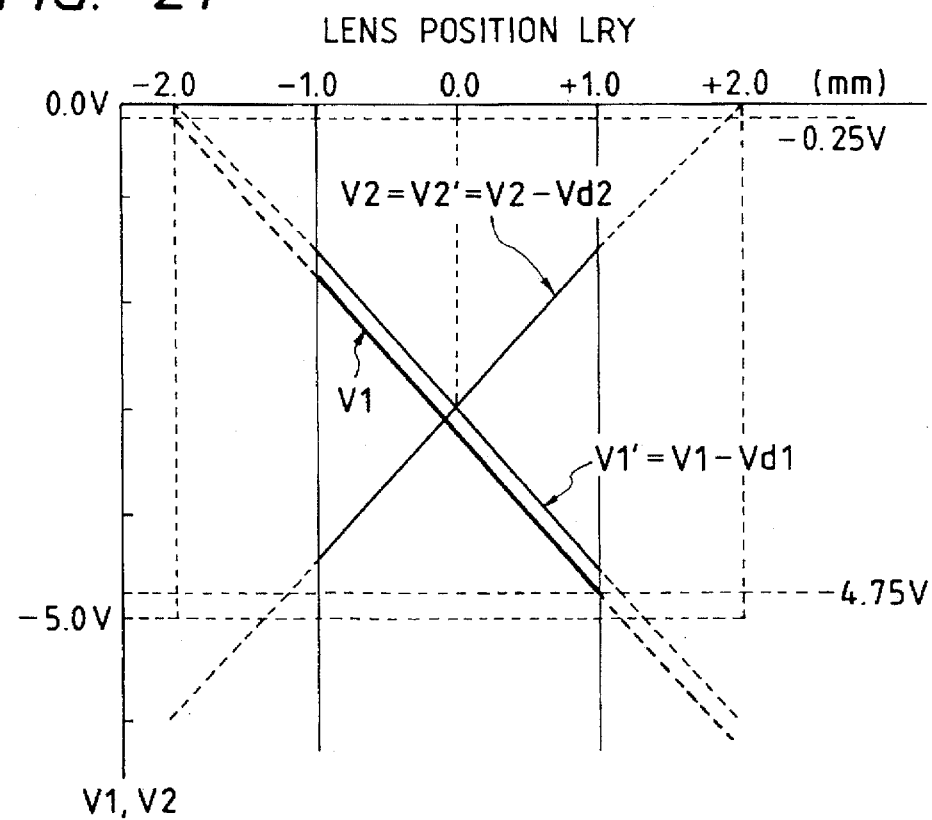
FIG. 21 is a graph for explaining the adjustment operation of the detection unit in the vibration reduction lens position detection circuit according to the embodiment shown in FIG. 1.
Figure 22:
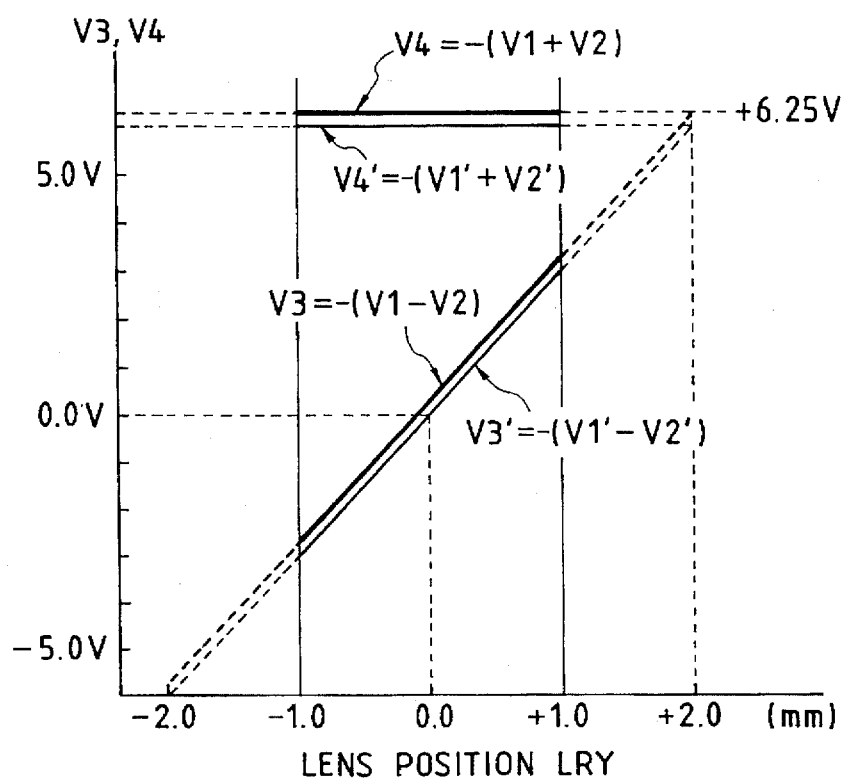
FIG. 22 is a graph for explaining the adjustment operation of the detection unit in the vibration reduction lens position detection circuit according to the embodiment shown in FIG. 1.
Figure 23:
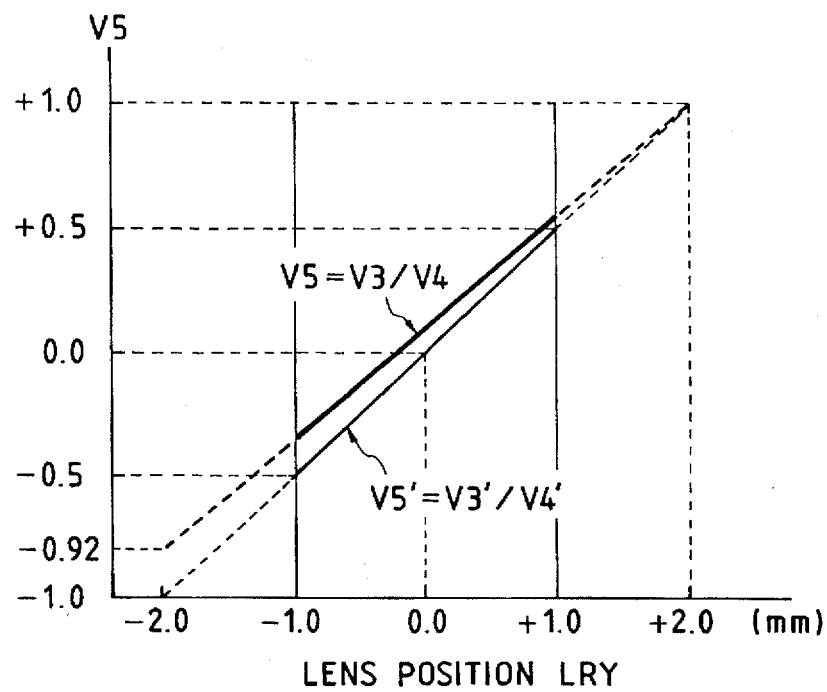
FIG. 23 is a graph for explaining the adjustment operation of the detection unit in the vibration reduction lens position detection circuit according to the embodiment shown in FIG. 1.

As a second example, assume that as a result of the above-mentioned adjustment of the light-emission amount of the light-emitting diode LED1, the output currents I1 and I2 of the PSD1 are output while being offset upon a change in position, in the yawing direction, of the vibration reduction lens 2, as shown in FIG. 20 (note that the dark current of the PSD1 is not included in I1 and I2 for the sake of convenience), and the output voltages V1 and V2 of the detection unit are output, as indicated by bold solid lines V1 and V2 in FIG. 21, while only V1 is offset by an error of −0.25 [V] from ideal outputs (indicated by thin solid lines V1' and V2' in FIG. 21) under the influence of the dark current of the PSD1, the input offset voltages and the input offset currents of the operational amplifiers OP1 and OP2, and the like. Since V1 and V2 should ideally become output voltages proportional to I1 and I2, the vibration reduction lens position LRY in the yawing direction is determined by formula 7 above. However, the vibration reduction lens position LRY in the yawing direction calculated by formula 7 suffers an error of about −8% at maximum with respect to an ideal line indicated by a thin solid line V5' in FIG. 23, as indicated by a bold solid line V5 in FIG. 23. Note that V3=−(V1−V2) and V4=−(V1+V2) as intermediate calculation results of formula 7 are indicated by bold solid lines in FIG. 22.

Even when the influence of the dark current of the PSD1, the input offset voltages and input offset currents of the operational amplifiers, and the like is adjusted upon delivery of each camera, such adjustment does not provide any drastic solution since these error factors have temperature dependence.

The mechanical positional relationship between the above-mentioned slit member and the PSD1 or the like varies in each camera, and hence, the vibration reduction lens position LRY calculated based on the outputs V1 and V2 from the detection unit of the vibration reduction lens position detection mechanism 5Y in the yawing direction includes an error unless each camera is adjusted. More specifically, the zero position calculated by formula 7 does not always match the center of the movement range, in the yawing direction of the vibration reduction lens 2, or $\gamma$ in formula 7 varies in each camera.

In order to solve the above-mentioned problem, according to this embodiment, the camera itself automatically calculates an adjustment value used upon calculation of the vibration reduction lens position from the outputs from the vibration reduction lens position detection mechanism at a predetermined camera operation timing (to be described later) without requiring any adjustment by an external adjustment device of the camera, thereby detecting the position of the vibration reduction lens 2 with high precision.

During vibration reduction control, assume that the vibration reduction lens position LRY [mm] in the yawing direction calculated using formulas 8, 9, and 10 below is used:

$$LRY = \gamma \times \{(V1'-V2')/(V1'+V2')-s\} \qquad \text{formula 8}$$

for $$V1' = V1 - Vd1 \qquad \text{formula 9}$$

$$V2' = V2 - Vd2 \qquad \text{formula 10}$$

In formula 8, $\gamma$ in formula 7 is used as a variable, the term s for adjusting the central position of the movement range of the vibration reduction lens 2 is added, and V1 and V2 are corrected by Vd1 and Vd2 determined by adjustment to be described below. Vd1 and Vd2 are the adjustment values indicating the voltages of the outputs V1 and V2 obtained when the LED1 does not emit light, $\gamma$ is the gamma adjustment value indicating the slope of a straight line representing the relationship between (V1'−V2')/(V1'+V2') and the vibration reduction lens position LRY in the yawing direction shown in FIG. 24, and s is the shift adjustment value indicating correction, in the horizontal direction, of the straight line shown in FIG. 24. These adjustment values are calculated by an automatic adjustment method to be described below.

An embodiment of the method of automatically calculating the adjustment values used upon calculation of the vibration reduction lens position on the basis of the outputs from the vibration reduction lens position detection mechanism by the camera itself will be explained below.

An example of the control contents of the adjustment of the detection unit in the vibration reduction lens position detection mechanism in the yawing direction will be explained below with reference to the timing chart shown in FIG. 25 and the flow chart shown in FIG. 26. Note that the same control is made in the pitching direction to adjust the vibration reduction lens position detection mechanism. FIG. 26 is a flow chart showing the flow of adjustment control of the vibration reduction lens position detection mechanism in the yawing direction of a software program incorporated in the MPU 1. The processing starts from step S300. In step S301, the outputs V1 and V2 from the detection unit in the vibration reduction lens position detection mechanism 5Y in the yawing direction are monitored in the non-emission state of the LED1 in the light-emission unit, and the monitored values are respectively set to be Vd1 and Vd2 (corresponding to operation time t21 in FIG. 25). The voltages Vd1 and Vd2 can be considered as those influenced by the dark current of the PSD1, the input offset voltages and input offset currents of the operational amplifiers OP1 and OP2, and the like. If the position detection of the vibration reduction lens 2 in the vibration reduction control is performed relatively soon after this adjustment, since the change factors of Vd1 and Vd2 such as a change in temperature are negligible, the vibration reduction lens position LRY in the yawing direction can be calculated by formula 8 using V1' and V2' calculated by formulas 9 and 10 using the monitored values Vd1 and Vd2, thereby accurately detecting the vibration reduction lens position while canceling the influence of the dark current of the PSD1, the input offset voltages and input offset currents of the operational amplifiers, and the like.

Figure 25:
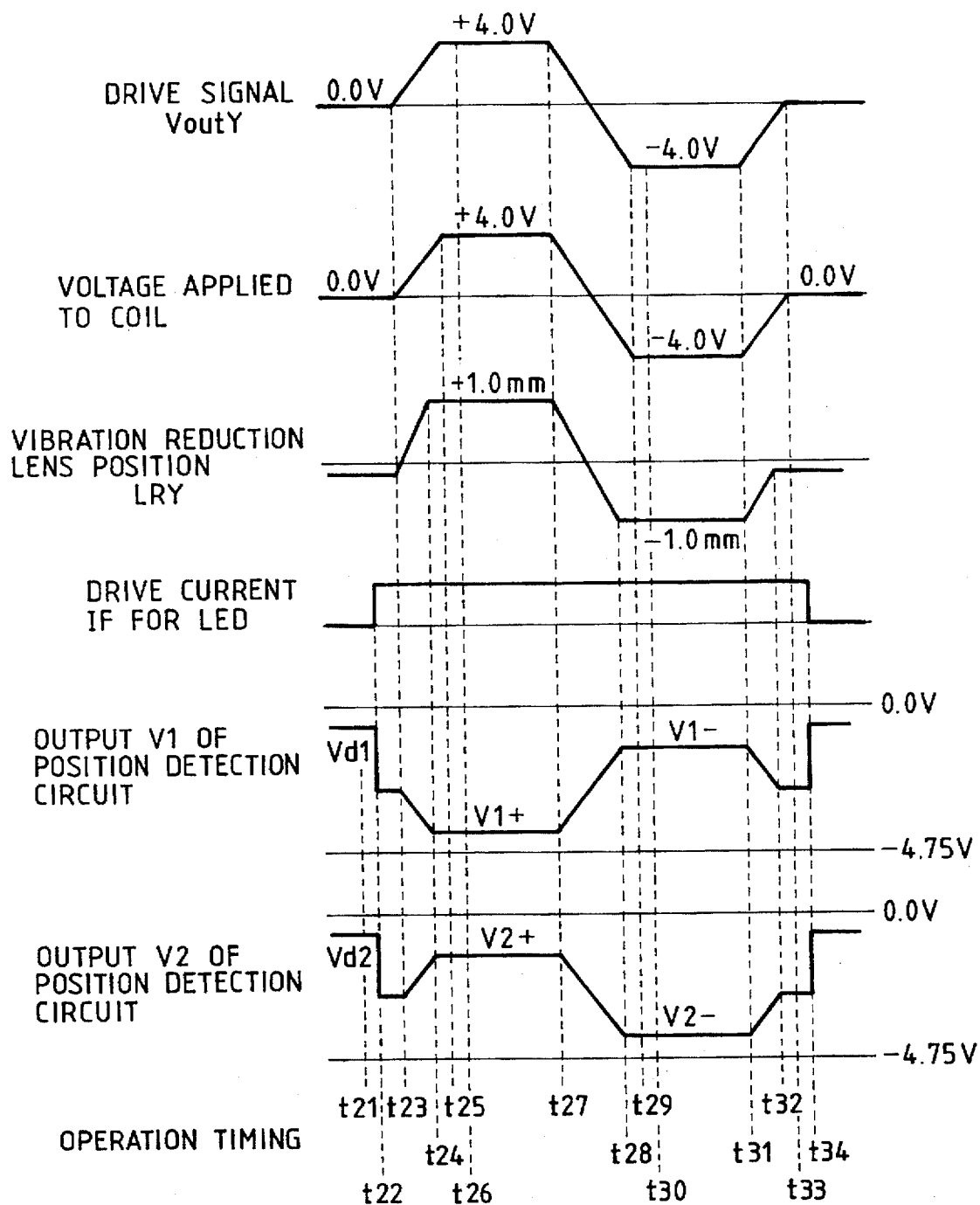
FIG. 25 is a timing chart showing the adjustment operation of the detection unit in the vibration reduction lens position detection circuit according to the embodiment shown in FIG. 1.
Figure 26:
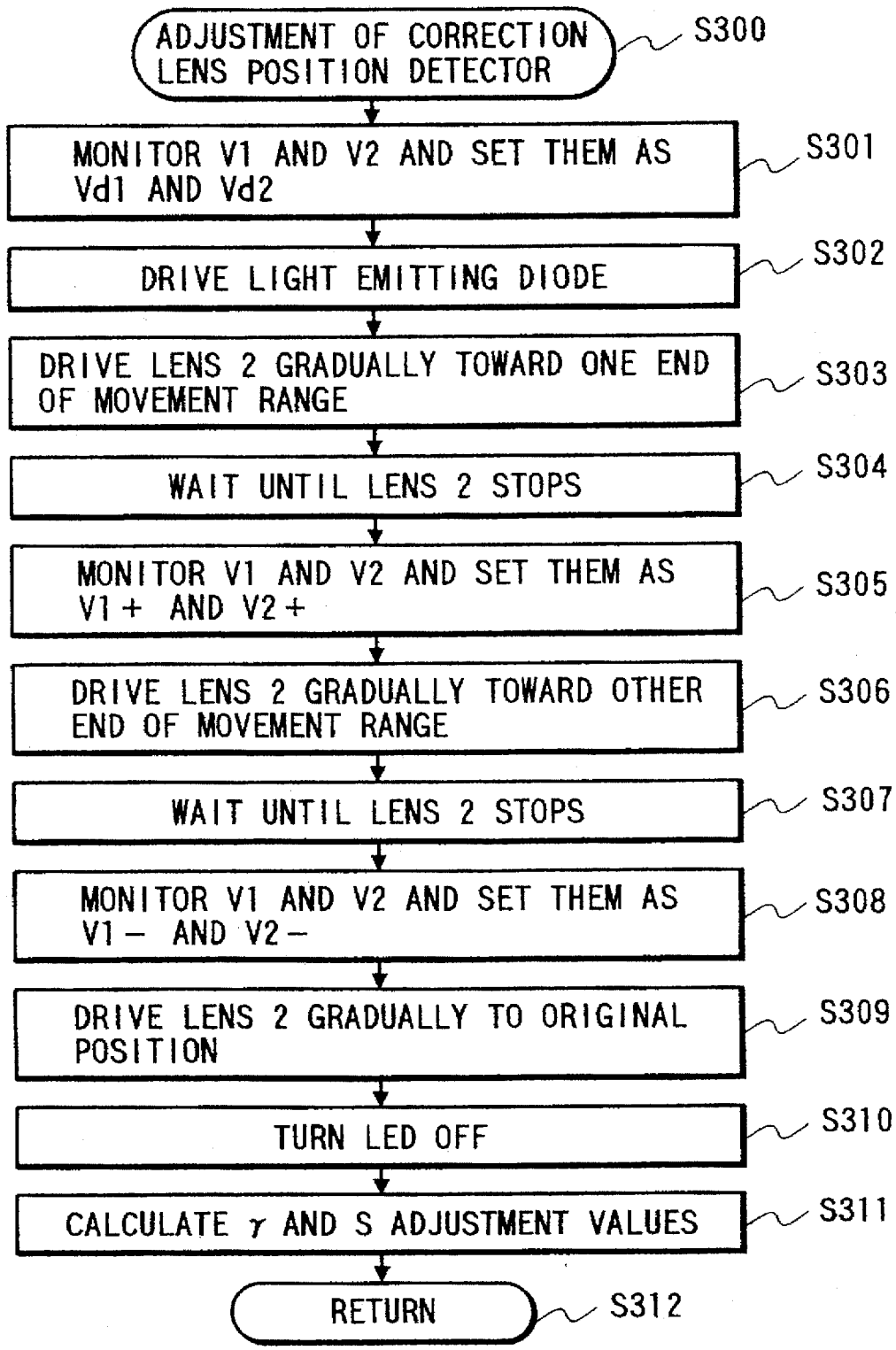
FIG. 26 is a flow chart showing the adjustment operation of the detection unit in the vibration reduction lens position detection circuit according to the embodiment shown in FIG. 1.

In step S302, the light-emitting diode LED1 is driven with the drive current calculated in the above-mentioned adjustment of the light-emission amount (corresponding to time t22 in FIG. 25). In step S303, the vibration reduction lens 2 is driven gradually toward the end on the + side of the movement range in the yawing direction by the same method as in the adjustment of the light-emission amount. The input VoutY of the vibration reduction lens drive mechanism 7Y in the yawing direction shown in FIG. 5 is gradually increased from 0.0 [V] to +4.0 [V] during the period from time t23 to time t25 in FIG. 25. With this operation, the voltage to be applied to the coil 11Y in the yawing direction gradually changes from 0.0 [V] to +4.0 [V], and the vibration reduction lens 2 is driven gradually toward the + side in the yawing direction. At time t24, the vibration reduction lens 2 collides against the end on the + side of the movement range (the position +1.0 [mm] of the vibration reduction lens). When the vibration reduction lens 2 has reached the end on the + side of the movement range, the time required until the bounce settles down upon collision of the vibration reduction lens 2 against the end of the movement range is assured in step S304, and the outputs V1 and V2 from the detection unit in the vibration reduction lens position detection mechanism 5Y in the yawing direction are monitored in step S305 (corresponding to time t26 in FIG. 25). The monitored voltage values are respectively set to be V1+ and V2+.

In step S306, the vibration reduction lens 2 is driven gradually toward the end on the−side of the movement range in the yawing direction by the same method as in the adjustment of the light-emission amount. The input VoutY of the vibration reduction lens drive mechanism 7Y in the yawing direction shown in FIG. 5 is gradually decreased from +4.0 [V] to −4.0 [V] during the period from time t27 to time t29 in FIG. 25. With this operation, the voltage to be applied to the coil 11Y in the yawing direction gradually changes from +4.0 [V] to −4.0 [V], and the vibration reduction lens 2 is driven gradually toward the−side in the yawing direction. At time t28, the vibration reduction lens 2 collides against the end on the−side of the movement range (the position −1.0 [mm] of the vibration reduction lens). When the vibration reduction lens 2 has reached the end on the−side of the movement range, the time required until the bounce settles down upon collision of the vibration reduction lens 2 against the end of the movement range is assured in step S307, and the outputs V1 and V2 from the detection unit in the vibration reduction lens position detection mechanism 5Y in the yawing direction are monitored in step S308 (corresponding to time t30 in FIG. 25). The monitored voltage values are respectively set to be V1− and V2−.

In step S309, the vibration reduction lens 2 is driven gradually toward the vicinity of an original position in the yawing direction. The input VoutY of the vibration reduction lens drive mechanism 7Y in the yawing direction shown in FIG. 5 is gradually decreased from −4.0 [V] to 0.0 [V] during the period from time t31 to time t33 in FIG. 25. With this operation, the voltage to be applied to the coil 11Y in the yawing direction gradually changes from −4.0 [V] to 0.0 [V], and the vibration reduction lens 2 is driven gradually toward the vicinity of the original position in the yawing direction. In step S310, the light-emitting diode LED1 is turned off. In step S311, the gamma adjustment value γ and the shift adjustment value s are calculated by the method to be described below. In step S312, the adjustment control of the vibration reduction lens position detection mechanism in the yawing direction ends.

Figure 24:
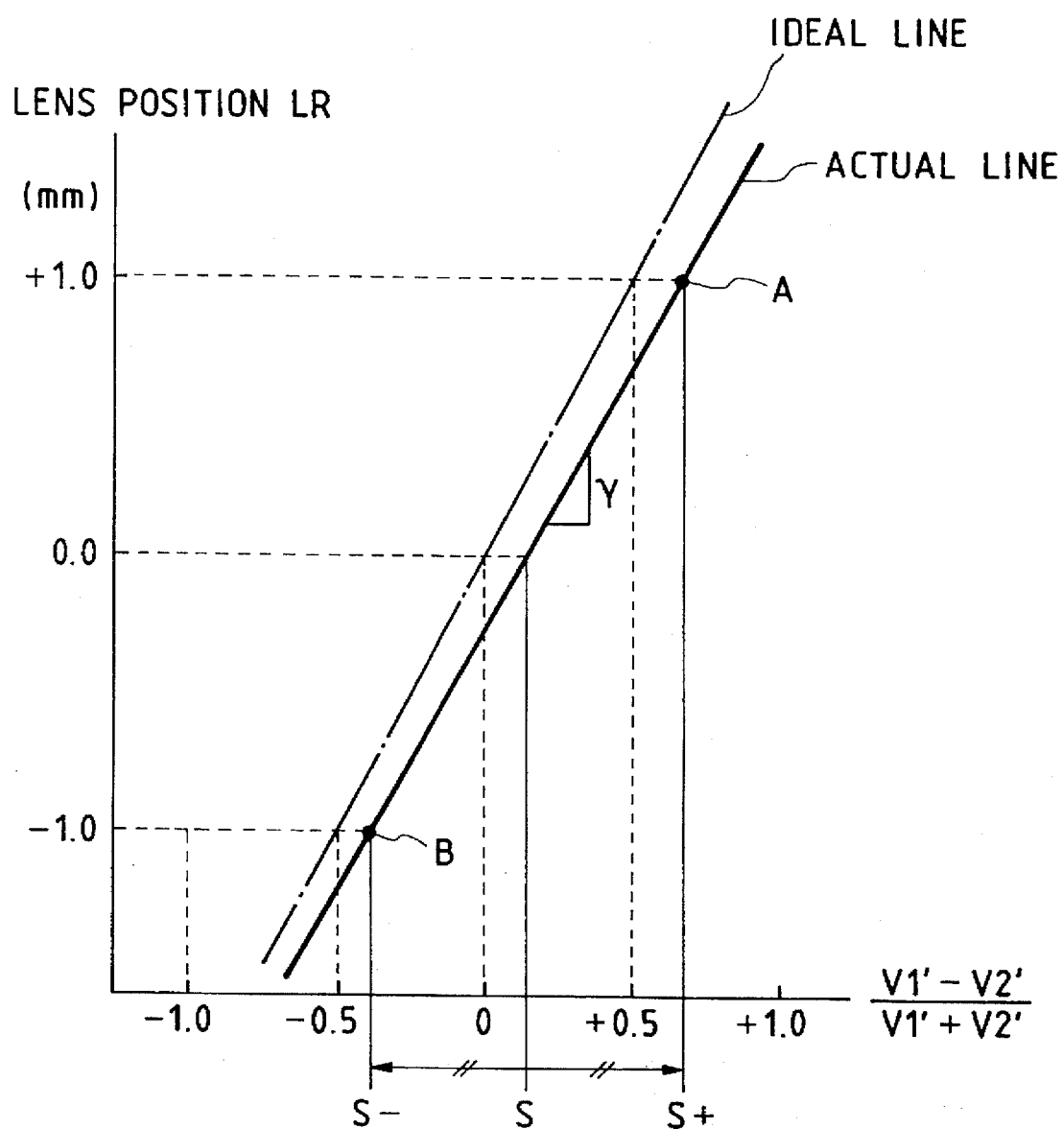
FIG. 24 is a graph for explaining the adjustment operation of the detection unit in the vibration reduction lens position detection circuit according to the embodiment shown in FIG. 1.

The method of calculating the gamma adjustment value γ and the shift adjustment value s in step S311 in FIG. 26 will be described below. Based on the output voltages V1+ and V2+ from the detection unit upon collision of the vibration reduction lens 2 against the end on the + side of the movement range in the yawing direction, obtained in step S305 in FIG. 26, s+ (corresponding to the x-coordinate of a point A in FIG. 24) is calculated using formula 11 below. Based on the output voltages V1− and V2− from the detection unit upon collision of the vibration reduction lens 2 against the end on the−side of the movement range in the yawing direction, obtained in step S308, s− (corresponding to the x-coordinate of a point B in FIG. 24) is calculated using formula 12 below. From the calculated values s+ and s−, the shift adjustment value s corresponding to (V1'−V2')/(V1'+V2') at the central position of the movement range, in the yawing direction, of the vibration reduction lens 2 is calculated using formula 14 below, and the gamma adjustment value γ corresponding to the slope of the straight line in FIG. 24 is calculated using formula 13 below.

$$s+ = \{(V1+)-Vd1\}-\{(V2+)-Vd2\}/\{(V1+)-Vd1\}+\{(V2+)-Vd2\} \quad \text{formula 11}$$

$$s- = \{(V1-)-Vd1\}-\{(V2-)-Vd2\}/\{(V1-)-Vd1\}+\{(V2-)-Vd2\} \quad \text{formula 12}$$

$$\gamma = 2.0 \text{ [mm]}/\{(s+)-(s-)\} \quad \text{formula 13}$$

$$s = \{(s+)+(s-)\}/2 \quad \text{formula 14}$$

Upon detecting the position, in the yawing direction, of the vibration reduction lens 2, which position is to be used in vibration reduction control to be performed at the subsequent timing, the position is calculated using formulas 8, 9, and 10 above using the gamma adjustment value γ and the shift adjustment value s calculated in this adjustment.

To supplement, the movement range, in the yawing direction, of the vibration reduction lens 2, i.e., the distance from one end to the other end of the movement range (2.0 [mm] in the above example) can be formed within a given dimensional tolerance upon mechanical design, and is uniquely determined upon assembling the movable mechanisms. Thereafter, variation factors of the movement range are very smaller than those of the above-mentioned influence factors on the vibration reduction lens position. Therefore, when the adjustment values γ and s are calculated based on the outputs from the detection unit upon moving from one end to the other end of the movement range by the above-mentioned method, and the position of the vibration reduction lens 2 is detected using the calculated values, detection can be attained with high precision.

An embodiment of digital control of vibration reduction will be described below. The digital control is also called sampling control, and it is a common practice to perform predetermined control at predetermined time intervals. In this embodiment as well, the vibration reduction control to be described below is performed at predetermined time intervals, e.g., at 1–ms intervals. An example of the control will be explained below with reference to the flow charts of FIGS. 27, 28, 29, and 31.

Figure 27:
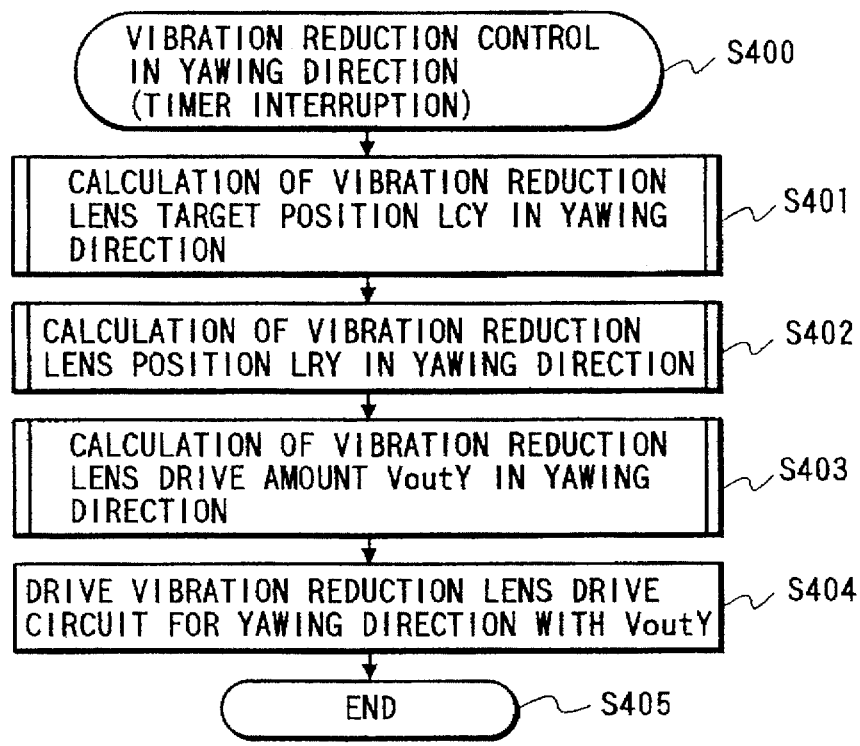
FIG. 27 is a flow chart showing vibration reduction control according to the embodiment shown in FIG. 1.
Figure 28:
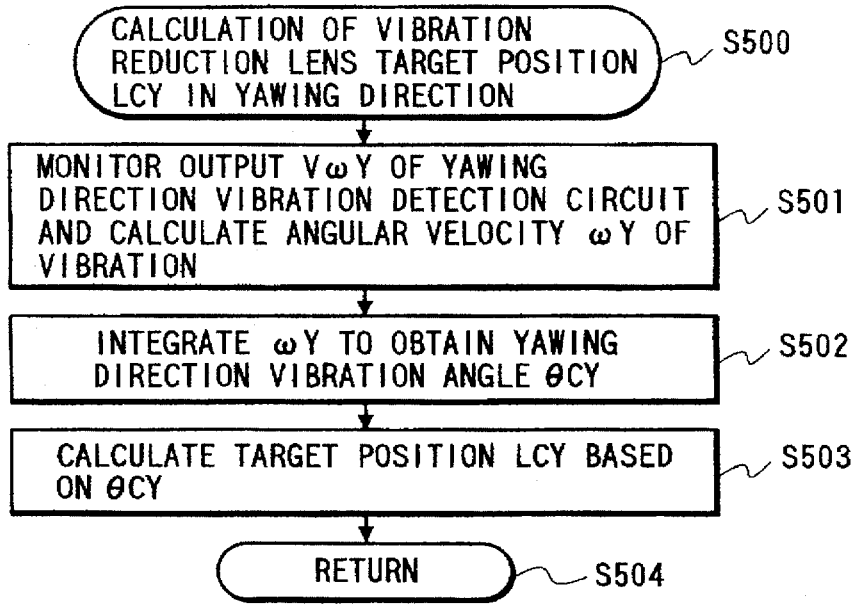
FIG. 28 is a flow chart showing the calculation of the vibration reduction lens target position according to the embodiment shown in FIG. 1.
Figure 29:
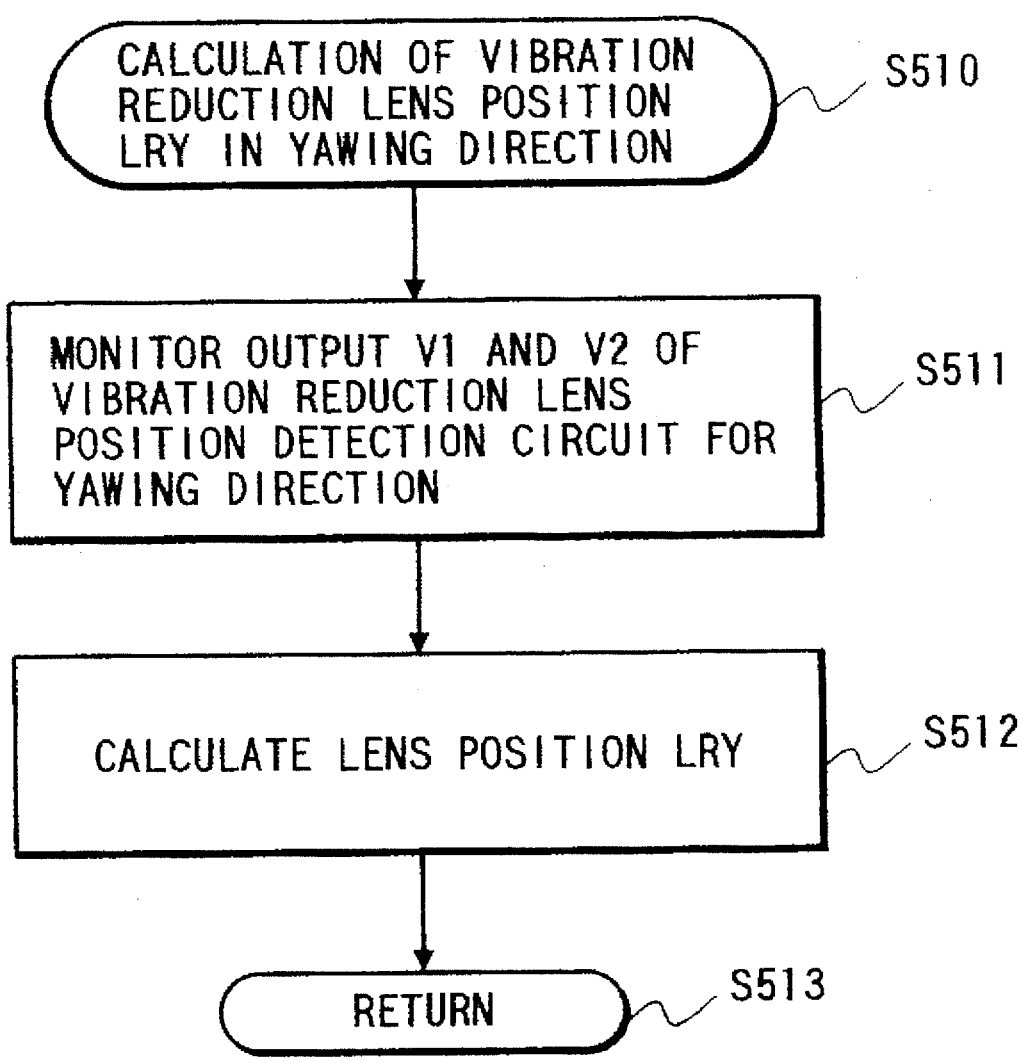
FIG. 29 is a flow chart showing the calculation of the vibration reduction lens position according to the embodiment shown in FIG. 1.
Figure 31:
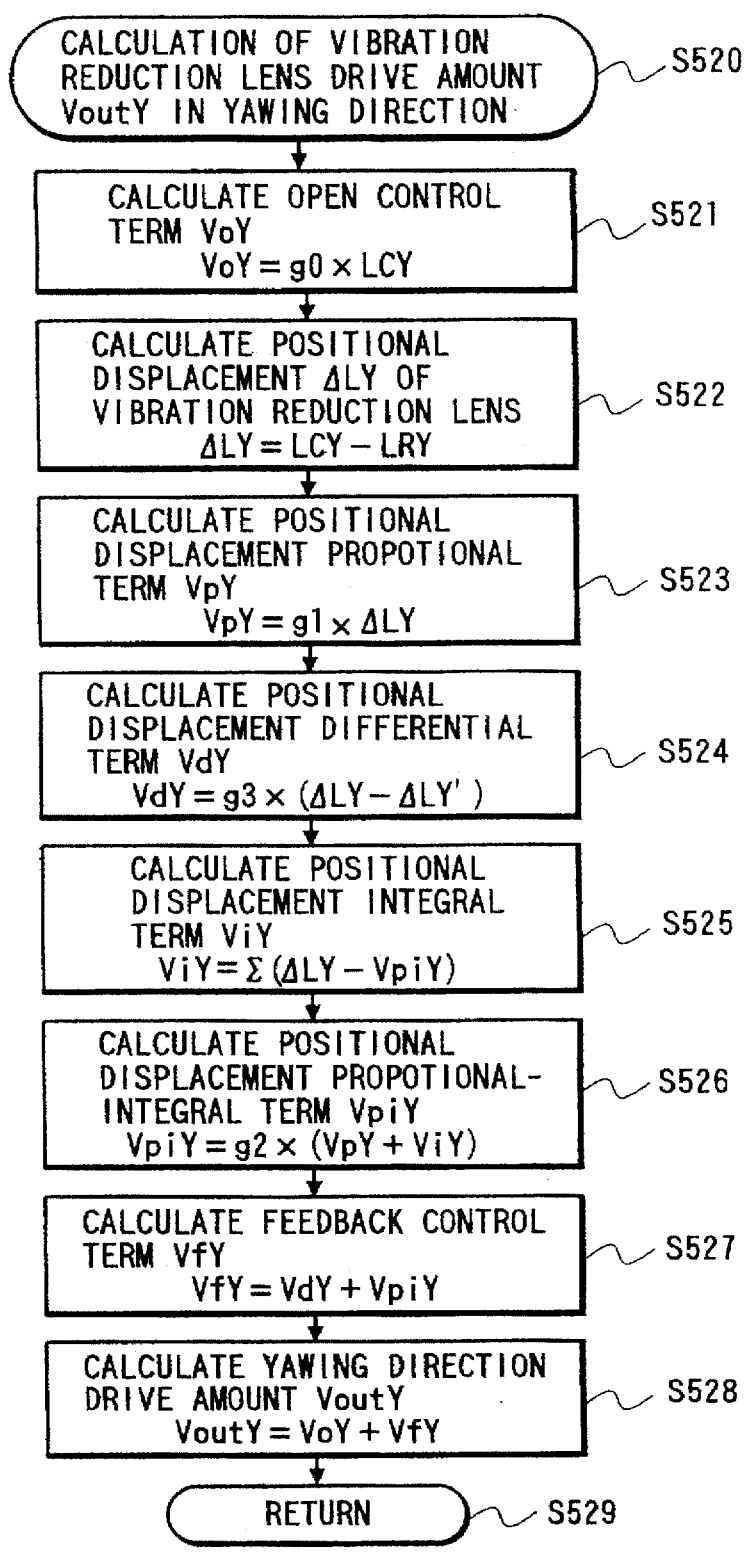
FIG. 31 is a flow chart showing the calculation of the vibration reduction lens drive amount according to the embodiment shown in FIG. 1.

FIG. 27 is a flow chart showing the vibration reduction control in the yawing direction of a program stored in the MPU 1, and this control corresponds to a timer interruption process which is repetitively executed at predetermined time intervals, e.g., 1–ms intervals, from when the operation is allowed at a predetermined timing defined in the following description until the operation is prohibited at another predetermined timing also defined in the following description. Assume that the MPU 1 has a timer interruption function of starting the processing at the predetermined timings. This process starts from step S400. In step S401, a vibration reduction lens target position LCY in the yawing direction defined by the flow chart in FIG. 28 is calculated. The calculation process will be described in detail later. In step S402, the vibration reduction lens position LRY in the yawing direction defined by the flow chart in FIG. 29 is calculated. The calculation process will be described in detail later. In step S403, a vibration reduction lens drive amount VoutY in the yawing direction defined by the flow chart in FIG. 31 is calculated. The calculation process will be described in detail later. In step S404, the vibration reduction lens drive mechanism 7Y is driven with VoutY obtained in step S403. As can be seen from the above description, a drive force proportional to VoutY is applied to the mechanism of the vibration reduction lens 2 in the yawing direction. Upon completion of the processing in step S404, the timer interruption process of the vibration reduction control in the yawing direction ends in step S405.

The calculation of the vibration reduction lens target position LCY in the yawing direction executed in step S401 in FIG. 27 will be described below with reference to FIG. 28. The process for calculating the vibration reduction lens target position LCY in the yawing direction starts from step S500. In step S501, an output VωY from the vibration detection mechanism 4Y in the yawing direction is monitored, and an angular velocity ωY in the yawing direction is calculated based on the monitored value. In step S502, a vibration angle θCY generated in the yawing direction of the camera is calculated by integrating ωY. As described above, since the output VωY from the vibration detection mechanism 4Y in the yawing direction is proportional to the angular velocity, in the yawing direction, of the camera, the angular velocity ωY in the yawing direction is calculated based on the output VωY, and the vibration angle generated in the camera can be calculated by integrating ωY. In step S503, an appropriate shift amount LCY of the vibration reduction lens in the yawing direction that can cancel the vibration amount on the film surface of the vibration reduction lens 2 is calculated from the vibration angle θCY in the yawing direction. In step S504, the process for calculating the vibration reduction lens target position LCY in the yawing direction ends, and the flow advances to step S402 in FIG. 27. Note that LCY will be referred to as a vibration reduction lens target position in the yawing direction hereinafter since it corresponds to the target position in-the vibration reduction lens control later in the yawing direction.

A supplemental explanation will be given for the process for calculating the vibration reduction lens target position LCY in the yawing direction from the output VωY from the vibration detection mechanism 4Y in the yawing direction. For example, ωY is calculated by multiplying VωY with a conversion coefficient KωY for converting the output VωY (parameter=voltage) from the vibration detection mechanism 4Y in the yawing direction into a parameter of angular velocity, and for correcting an individual gain variation in output from the vibration detection mechanism 4Y, as shown in formula 15 below. The vibration angle θCY in the yawing direction is theoretically obtained by integrating ωY, as shown in formula 16 below. In this case, the angle θCY is obtained by accumulating ωY in units of samples by approximation using formula 17 below. Note that ts in formula 17 is the sampling time interval, and corresponds to the start interval (e.g., 1 ms) by the timer interruption of the process for calculating the vibration reduction lens target position LCY in the yawing direction. The integration constant (corresponding to θCY0 in formulas 16 and 17, i.e., the initial value of the angle θCY due to vibrations) of the vibration angle θCY in the yawing direction obtained by integrating or accumulating ωY is set to be, e.g., θCY0=0, so that the optical axis direction can be set to be the initial value of the vibration angle. The vibration reduction lens target position LCY in the yawing direction is calculated using formula 18 below. kLC is a coefficient for converting the vibration angle θCY in the yawing direction into the vibration reduction lens target position LCY as an appropriate shift amount, in the yawing direction, of the vibration reduction lens 2, and is a value determined by the image taking optical system. In the simplest example, if the image taking optical system is a thin single lens whose thickness can be ignored and which has a focal length f, the target position LCY can also be calculated using formula 19 below. If the vibration angle θCY is sufficiently small, formula 19 can be rewritten as formula 20 by approximation, and the vibrations on the film surface can be reduced by shifting the vibration reduction lens 2 by an amount proportional to θCY in the yawing direction.

Note that formulas 15, 17, and 18 may be combined into a single formula, and the vibration reduction lens target position LCY may be calculated by integrating the products of VωY and an appropriate conversion coefficient kY at the sampling intervals, as shown in formula 21. An initial value LCY0 of the vibration reduction lens target position in this case is assumed to be, e.g., 0.

| | |
|---|---:|
| $\omega Y = k\omega Y \times V\omega Y$ | formula 15 |
| $\theta CY = \int \omega Y dt + \theta CY0$ | formula 16 |
| $\theta CY \cong \Sigma \omega Y \times ts + \theta CY0$ | formula 17 |
| $LCY = kLC \times \theta CY$ | formula 18 |
| $LCY = f \times \tan(\theta CY)$ | formula 19 |
| $LCY = f \times \theta CY$ | formula 20 |
| $LCY \cong \Sigma(kY \times V\omega Y) + LCY0$ | formula 21 |

The process for calculating the vibration reduction lens position LRY in the yawing direction executed in step S402 in FIG. 27 will be described in detail below with reference to FIG. 29. The process for calculating the vibration reduction lens position LRY in the yawing direction starts from step S510. In step S511, the outputs V1 and V2 from the detection unit in the vibration reduction lens position detection mechanism 5Y in the yawing direction are monitored. In step S512, the vibration reduction lens position LRY in the yawing direction is calculated using formulas 8, 9, and 10. In step S513, the process for calculating the vibration reduction lens position LRY in the yawing direction ends, and the flow then advances to step S403 in FIG. 27.

The transfer characteristics of the above-mentioned mechanism for shifting the vibration reduction lens 2 will be examined below. The elastically supported actuator used in this embodiment can be modelled by a spring, viscosity, and mass, and its equation of motion is expressed by formula 22 below:

$$m \times d^2x/dt^2 + c \times dx/dt + kx = \alpha i \qquad \text{formula 22}$$

where x: vibration reduction lens position
  m: mass of vibration reduction lens member movable portion
  c: viscosity coefficient
  k: spring constant
  α: drive force constant
  i: drive current of coil 11Y The transfer function of this actuator derived from the above-mentioned formula is given by formula 23 below:

$$x/i = \alpha/(ms^2 + cs + k) \qquad \text{formula 23}$$

Figure 30A:
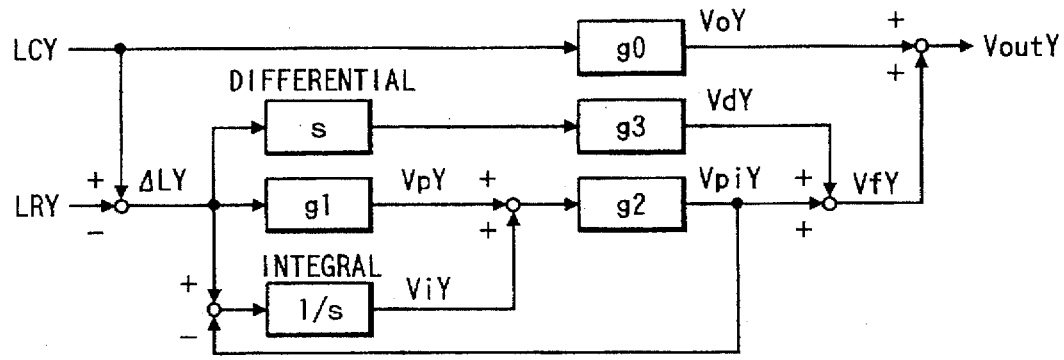
FIGS. 30A, 30B, 30C and 30D are block diagrams of the vibration reduction lens control according to the embodiment shown in FIG. 1.

FIG. 30A is a block diagram of vibration reduction lens control according to the present invention, as an optimal solution of a control system suitable for the digital control, which system is obtained based on the above-mentioned transfer function using a known predetermined technique. The vibration reduction lens control may be realized by an analog circuit according to the block diagram of FIG. 30A. However, in this case, the digital control adopted in this embodiment will be described below.

The advantage upon realizing the vibration reduction lens control as the digital control is as follows. A one-chip microcomputer such as the MPU 1 used in this embodiment to perform the above-mentioned control requires a high calculation speed, and often leads to an increase in cost of the camera. However, recent one-chip microcomputers have lower prices, and the total cost of a camera becomes equal to or lower than that of a camera constituted by an analog circuit. Also, control parameters g0, g1, g2, g3, and the like used in FIG. 30A can be very easily changed, and a change in transfer characteristics of an object to be controlled due to a change in design of a mechanical factor, a change in number of windings of the coil 11Y, and the like can be quickly coped with. In addition, such a digital circuit is free from variations, temperature drifts, aging, and the like of various control gains and frequency characteristics, which pose a serious problem when a camera is constituted by an analog circuit.

The process for calculating the vibration reduction lens drive amount VoutY executed in step S403 in FIG. 27 will be described in detail below with reference to the flow chart in FIG. 31. The process for calculating the vibration reduction lens drive amount VoutY calculates the vibration reduction lens drive amount VoutY in the yawing direction on the basis of the control block diagram shown in FIG. 30A. This process starts from step S520. In step S521, an open control term VoY is calculated. This open control term is given by formula 24 below, and means a voltage proportional (coefficient g0 of proportionality) to the vibration reduction lens target position LCY in FIG. 30A. The coefficient g0 of proportionality in formula 24 is set based on, e.g., the relationship between the voltage applied to the coil 11Y in FIG. 5 and the vibration reduction lens position LRY in the yawing direction. In this embodiment, the coefficient g0 is set so that the position of the vibration reduction lens 2 substantially matches the vibration reduction lens target position LCY under a stationary condition after an elapse of a sufficiently long period of time when the control is made using only the output VoY of this term.

$$VoY = g0 \times LCY \qquad \text{formula 24}$$

In step S522, a vibration reduction lens positional displacement ΔLY in the yawing direction is calculated using formula 25 below. Note that the vibration reduction lens target position LCY and the vibration reduction lens position LRY in the yawing direction used in formula 25 have an identical unit.

$$\Delta LY = LCY - LRY \qquad \text{formula 25}$$

Upon completion of the process in step S522, a positional displacement proportional term VpY is calculated using formula 26 below in step S523:

$$VpY = g1 \times \Delta LY \qquad \text{formula 26}$$

Subsequently, in step S524, a positional displacement differential term VdY is calculated using formula 27 below. Note that ΔLY' is ΔLY obtained by the previous sampling operation, formula 27 corresponds to a portion where the differential value of ΔLY is multiplied with a coefficient g3 of proportionality in FIG. 30A, and the differential value of ΔLY is calculated by approximation as a change amount ΔLY−ΔLY' of ΔLY from the previously sampled value. ΔLY' is obtained by holding ΔLY in the previous sampling operation, and ΔLY' upon initial sampling is set to be a predetermined value (e.g., 0) so that this value does not become unstable upon initial sampling.

$$VpY = g3 \times (\Delta LY - \Delta LY') \qquad \text{formula 27}$$

In step S525, a positional displacement integral term ViY is calculated using formula 28 below. Formula 28 calculates the integral portion in FIG. 30A as an accumulation by approximation, and the initial value of ViY upon initial sampling is set to be a predetermined value (e.g., 0). Also, VpiY is calculated in the next step S526. In this case, the previously sampled value is held and used. Since VpiY upon initial sampling is indeterminate, formula 28 is calculated using a predetermined value (e.g., 0) as VpiY upon initial sampling.

$$ViY = \Sigma(\Delta LY - VpiY) \qquad \text{formula 28}$$

In step S526, a positional displacement proportional-integral term VpiY is calculated using the following formula 29:

$$VpiY = g2 \times (VpY + ViY) \qquad \text{formula 29}$$

Subsequently, in step S527, a feedback control term VfY is calculated by formula 30 below using VdY and VpiY calculated in steps S524 and S526:

$$VfY = VdY + VpiY \qquad \text{formula 30}$$

In step S528, a final yawing direction vibration reduction lens drive amount VoutY is calculated by formula 31 below using VoY and VfY calculated in steps S521 and S527. In step S529, the process for calculating the vibration reduction lens drive amount VoutY ends, and the flow advances to step S404 in FIG. 27.

$$VoutY = VoY + VfY \qquad \text{formula 31}$$

Note that the terms VoY, VpY, ViY, VpiY, VdY, VfY, and the like used in the description of FIG. 31 are described using the same terms used in FIG. 30A.

The vibration reduction control in the yawing direction which is started at predetermined sampling intervals defined by FIG. 27 is performed, as described above. More specifically, the vibration reduction lens target position LCY is calculated by the process shown in the flow chart of FIG. 28, the vibration reduction lens position LRY in the yawing direction is calculated by the process shown in the flow chart of FIG. 29, the vibration reduction lens drive amount-VoutY in the yawing direction is calculated by the process shown in the flow chart of FIG. 31, and the vibration reduction lens 2 is controlled in the yawing direction via the above-mentioned vibration reduction lens drive mechanism 7Y in step S404 in FIG. 27.

In this manner, the vibration reduction lens is subjected to feedback control on the basis of the vibration reduction lens target position LCY and the actual vibration reduction lens position LRY, and control coefficients g0, g1, g2, g3, and the like are derived from the transfer function of the vibration reduction lens mechanism system or the concrete control characteristics of an actual mechanism, and are optimized in consideration of the drive characteristics of the vibration reduction lens drive mechanism 7Y and the like, thus allowing high-precision vibration reduction. The vibration reduction lens 2 is subjected to vibration reduction control in the pitching direction under the same control, although a detailed description thereof will be omitted.

The operations of the shutter circuit and the shutter will be explained below.

FIG. 32 shows an example of the operation timing of an electromagnetic type vertically-travel focal-plane shutter popularly used in a single-lens reflex camera or the like. A shutter of this type is constituted by leading and trailing curtains (neither are shown). Normally, both the leading and trailing curtains are located to cover an aperture facing the film. In an exposure operation, power supply to a shutter leading curtain magnet Mg1 is started to unlock the leading curtain, and the leading curtain begins to travel on the film aperture surface by elastic energy of, e.g., a spring, thus starting exposure on the film surface. At a given timing depending on the exposure time, power supply to a shutter trailing curtain magnet Mg2 is started to unlock the trailing curtain, and the trailing curtain travels on the film aperture surface by elastic energy of, e.g., a spring, thus ending the exposure operation. Normally, a flash emission signal output from a camera main body is output at a predetermined timing in the shutter full open state, and after this signal is output, a flash device emits a flash. Note that both the leading and trailing curtains are moved at a predetermined timing to original positions where they cover the film aperture surface using a known method.

Figure 33A:
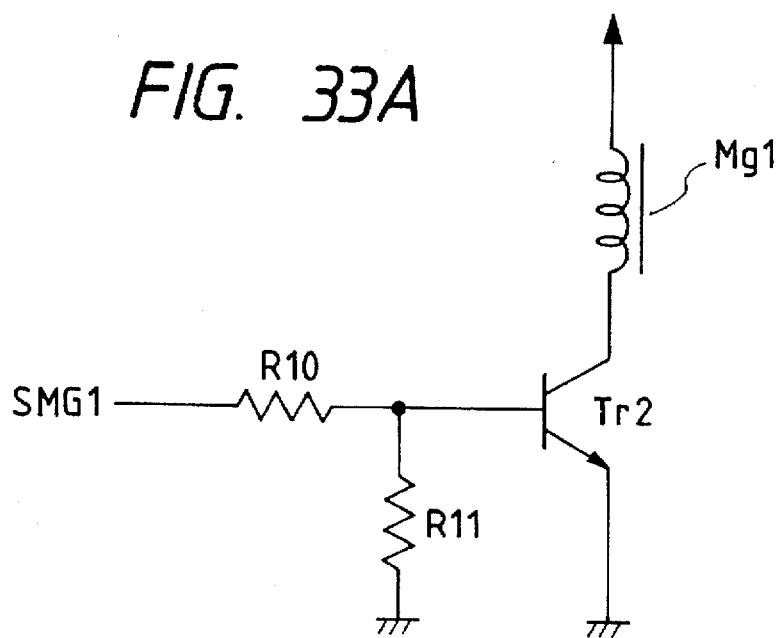
FIGS. 33A and 33B are circuit diagrams of a shutter drive circuit according to the embodiment shown in FIG. 1.
Figure 33B:
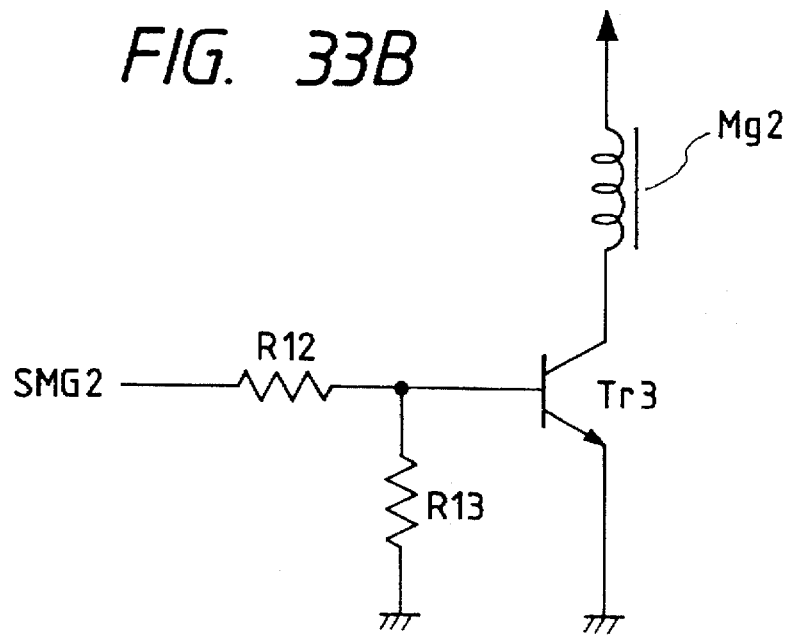

The shutter drive mechanism 6 will be explained below. FIGS. 33A and 33B are circuit diagrams respectively showing the circuit portions of the drive mechanisms of the shutter leading curtain magnet and the shutter trailing curtain magnet Mg2. In this mechanism, when a shutter leading curtain magnet signal SMG1 is set at High level, a transistor Tr2 is turned on, and electric power is supplied to the shutter leading curtain magnet Mg1. Conversely, when the shutter leading curtain magnet signal SMG1 is set at Low level, the transistor Tr2 is turned off, and power supply to the shutter leading curtain magnet Mg1 is stopped. Similarly, when a shutter trailing curtain magnet signal SMG2 is set at High level, a transistor Tr3 is turned on, and electric power is supplied to the shutter trailing curtain magnet Mg2. Conversely, when the shutter trailing curtain magnet signal SMG2 is set at Low level, the transistor Tr3 is turned off, and power supply to the shutter trailing curtain magnet Mg2 is stopped. The shutter leading curtain magnet signal SMG1 and the shutter trailing curtain magnet signal SMG2 are connected to the MPU 1, which can control power supply and non-power supply states of the shutter leading curtain magnet Mg1 end the shutter trailing curtain magnet Mg2 at an arbitrary timing.

The vibration reduction control under exposure will be explained below with reference to FIG. 32. More specifically, the vibration reduction control under exposure when the above-mentioned electromagnetic type vertically-travel focal-plane shutter is used will be explained.

The vibration reduction control under exposure must be started at least before the shutter begins to be opened, and must be continued until the exposure operation ends. As described above, at the time when electric power begins to be supplied to the shutter leading curtain magnet Mg1 and the shutter trailing curtain magnet Mg2 and at the time when the flash device emits light, a large current flows instantaneously, and induces electrical noise. Such electrical noise influences the vibration reduction lens position detection mechanisms 5Y and 5P that process very weak currents, and a large number of noise components are mixed in the outputs from these mechanisms. In view of this problem, according to this embodiment, the vibration reduction control for a predetermined period of time from the above-mentioned time is attained by open control. The vibration reduction control during other periods is closed control using vibration reduction lens position information. The open control in the vibration reduction control consequently controls the vibration reduction lens 2 based on only the vibration reduction lens target position LCY shown in FIG. 30A. As the detailed method of this open control, the following method may be used.

Figure 30B:
Figure 30C:
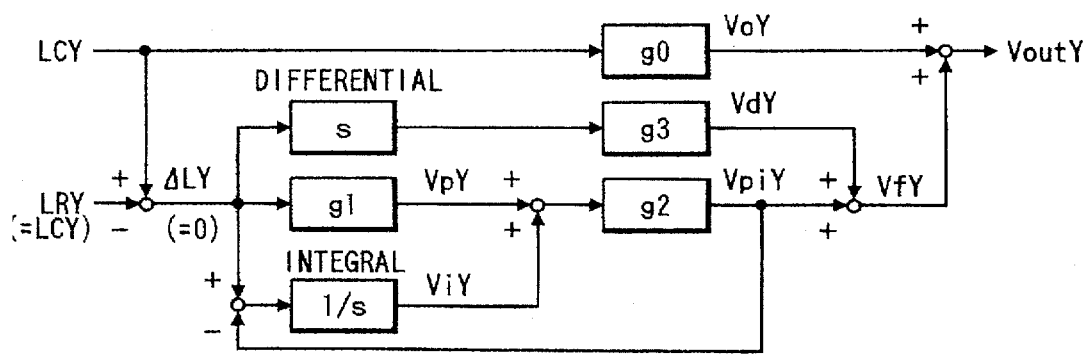
Figure 30D:
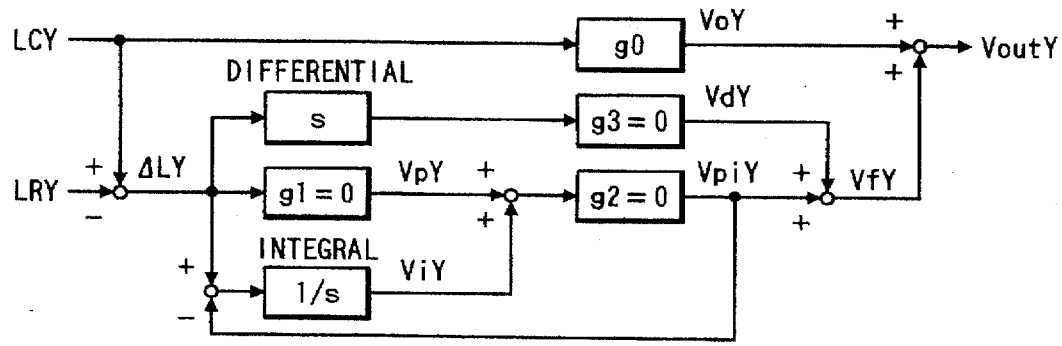

More specifically, control methods shown in FIGS. 30B, 30C, and 30D may be used with respect to the closed control using the vibration reduction lens position LRY shown in FIG. 30A.

FIG. 30B is a block diagram showing the control when the vibration reduction lens 2 is controlled by only a voltage proportional to the vibration reduction lens target position LCY, i.e., by only the open control term. FIG. 30C is a block diagram showing the control in which the vibration reduction lens position LRY is always set to have the same value as that of the vibration reduction lens target position LCY, and the vibration reduction lens drive mechanism is driven based on the control amount obtained by the same control blocks as those shown in FIG. 30A, thus consequently attaining the open control based on the vibration reduction lens target position LCY.

Finally, FIG. 30D is a block diagram showing the control in which the gain coefficients g1, g2, and g3 in the same control blocks as those in FIG. 30A are set to be "0", and the open control based on the vibration reduction lens target position LCY is consequently attained.

The vibration reduction control operation will be described below with reference to the timing chart shown in FIG. 32. The vibration reduction control is started at time t41 slightly before the shutter leading curtain begins to travel, and ends at time t45 after the shutter trailing curtain completes its travel and the exposure operation ends. During this interval, open control is performed for a predetermined period of time from time t42 (to be described later), for a predetermined period of time from time t43, and for a predetermined period of time from time t44, and closed control is performed during other periods.

The predetermined period of time from time t42 is one required from the power supply start time t42 to the shutter leading curtain magnet Mg1 until the influence of electrical noise on the vibration reduction lens position detection mechanisms 5Y and 5P due to power supply to the shutter leading curtain magnet Mg1 disappears, and the vibration reduction control during this interval is attained by open control.

The predetermined period of time from time t43 is one required from time t43 at which the flash unit 23 operates to perform flash emission by setting the flash emission signal at High level until the influence of electrical noise on the vibration reduction lens position detection mechanisms 5Y and 5P due to the flash emission disappears, and the vibration reduction control during this interval is attained by open control. In this case, the flash unit 23 has already been charged at that time by a mechanism constituted by a known technique, and emits light in response to a High-level flash emission signal supplied from the MPU 1 in FIG. 32. The flash unit 23 may be either of a built-in type flash device which is built in the camera main body or an external flash device to be attached to an accessory shoe. Even when the external flash device is used, a huge current (that may reach 200 [A] to 300 [A] in case of a large-light amount type) instantaneously flows into a light-emission tube upon flash emission, and the influence of electrical noise induced by the current on the vibration reduction lens position detection mechanisms 5Y and 5P is considerable.

The predetermined period of time from time t44 is one required from the power supply start time t44 to the shutter trailing curtain magnet Mg2 until the influence of electrical noise on the vibration reduction lens position detection mechanisms 5Y and 5P due to power supply to the shutter trailing curtain magnet Mg2 disappears, and the vibration reduction control during this interval is attained by open control.

Figure 34:
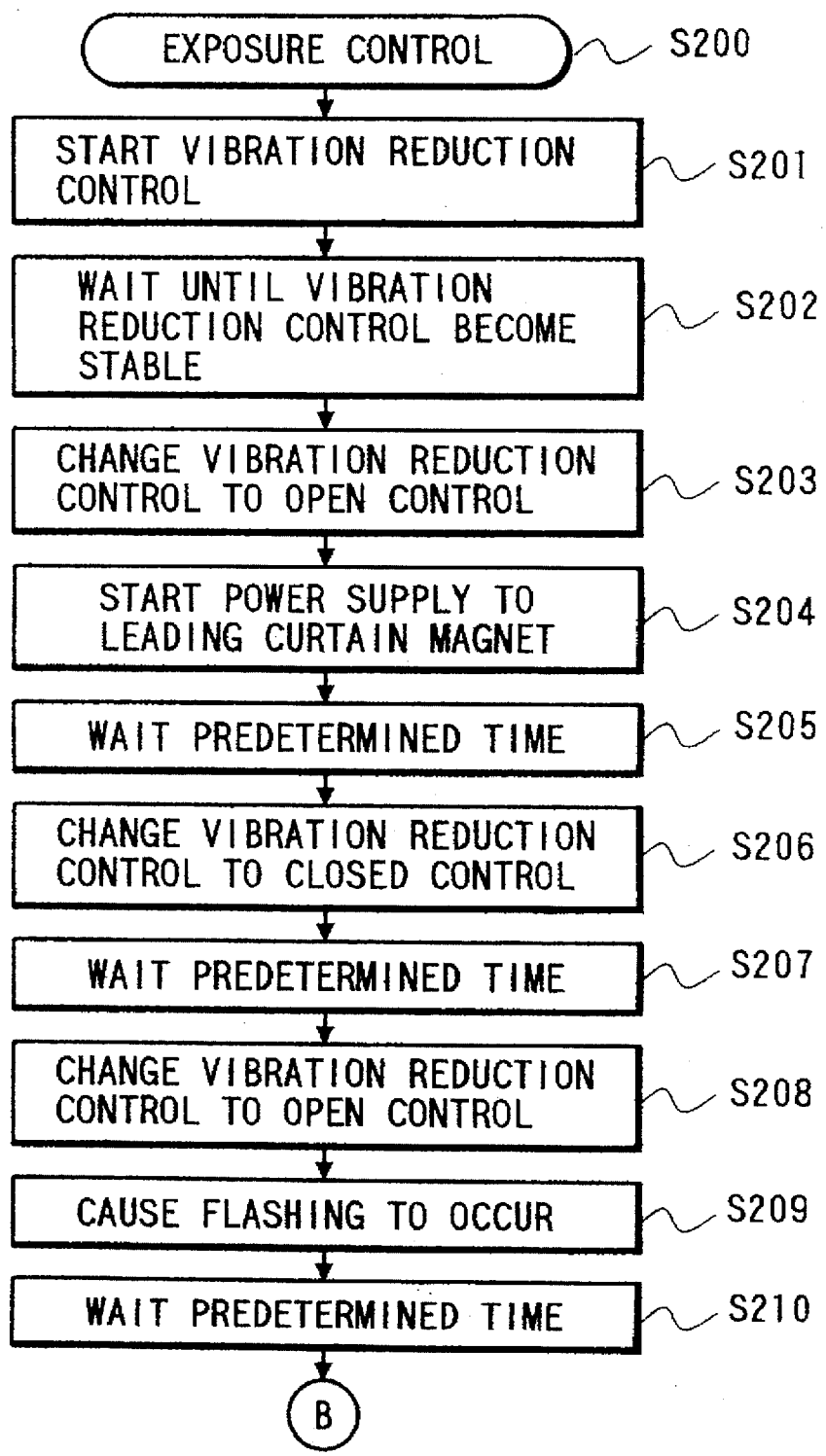
FIG. 34 is a flow chart of the vibration reduction control under exposure according to the embodiment shown in FIG. 1.
Figure 35:
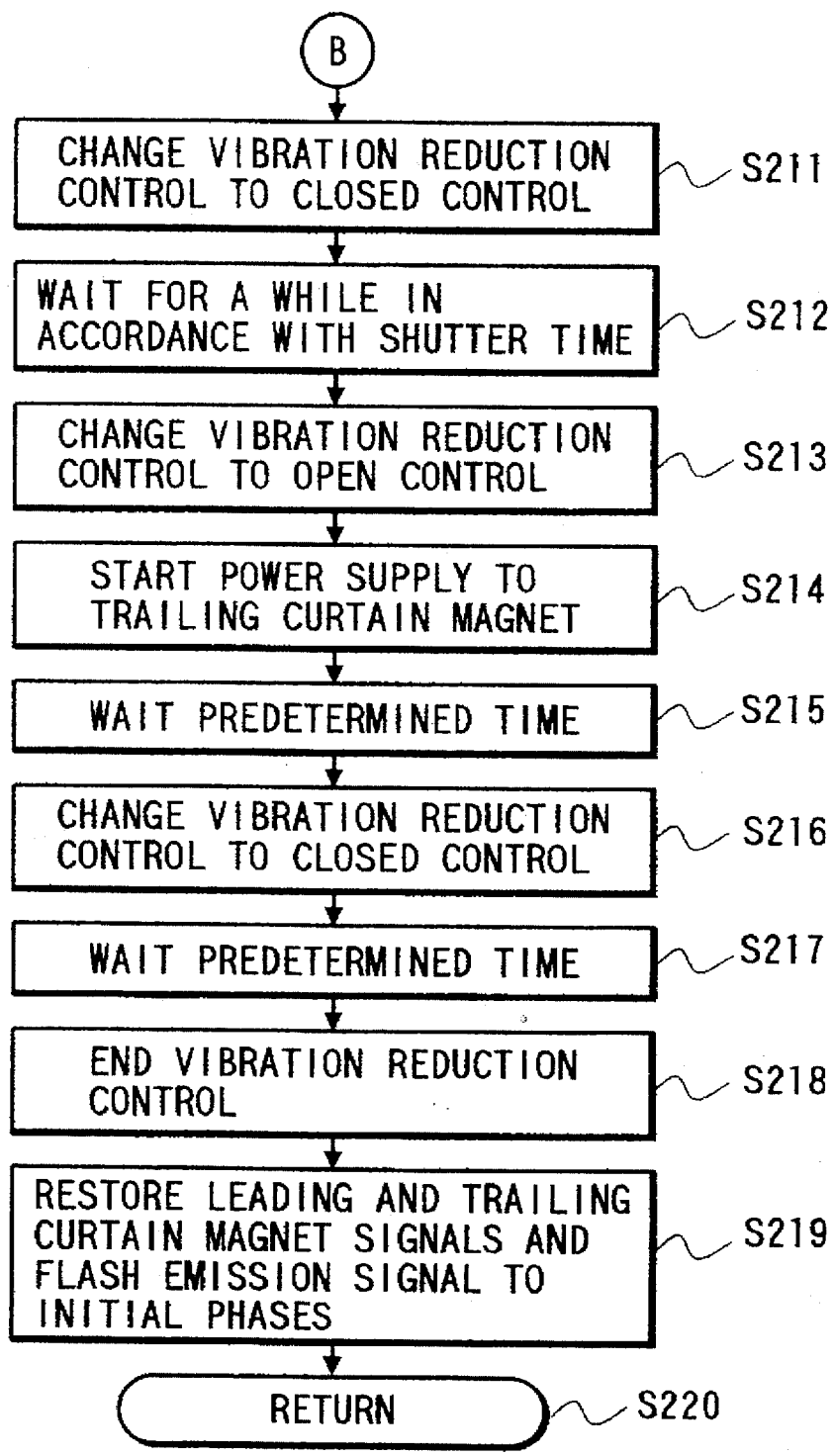
FIG. 35 is a flow chart of the vibration reduction control under exposure according to the embodiment shown in FIG. 1.

The control of the electromagnetic type vertically-travel focal-plane shutter under exposure will be explained below with reference to the flow charts in FIGS. 34 and 35. FIG. 34 is a flow chart showing the exposure control of a program stored in the MPU 1, and the control operation is started at a predetermined timing defined in the following description. Note that the open control in the vibration reduction control uses the control method shown in FIG. 30D, i.e., the method of setting the gain coefficients g1, g2, and g3 to be "0", and performing the open control based on the vibration reduction lens target position without consequently using any vibration reduction lens position information. Also, the control method other than that shown in FIG. 30D, e.g., the method shown in FIG. 30B or 30C, or another method may be used to perform the vibration reduction control without consequently using any vibration reduction lens position information.

The process of this exposure control starts from step S200, and vibration reduction control is started in step S201 (corresponding to time t41 in FIG. 32). In step S202, the control waits until the vibration reduction control becomes stable. In step S203, the vibration reduction control mode is changed to the open control mode (i.e., the vibration reduction control coefficients g1, g2, and g3 are set to be "0"). In step S204, the shutter leading curtain magnet signal is set at High level (corresponding to time t42 in FIG. 32) to supply electric power to the shutter leading curtain magnet Mg1, thus starting travel of the shutter leading curtain. The control waits in step S205 for an elapse of a predetermined period of time, and changes the vibration reduction control mode to the closed control mode in step S206.

Starting the vibration reduction in step S201 is to allow the operations of the respective processes of the vibration reduction control (timer interruption) in the yawing direction shown in FIG. 27 and the vibration reduction control (timer interruption) in the pitching direction (not shown). In this manner, the vibration reduction operations in the yawing and pitching directions are started. Note that the vibration reduction control at this time is attained by the control blocks shown in FIG. 30A, and high-precision vibration reduction control is realized by closed control. Waiting until the vibration reduction control becomes stable in step S202 is a process for waiting the time period required from when the vibration reduction control is started in step S201 until the vibration reduction control stabilizes. This stabilization time is about several ms to several ten ms. Changing the vibration reduction control mode to the open control mode in step S203 is to set the control coefficients g1, g2, and g3 in FIG. 30A to be "0", i.e., to change the control mode to that attained by the control blocks shown in FIG. 30D, thereby changing the control mode to the open control mode in which the control is made based only on the vibration reduction lens target position information without substantially using any vibration reduction lens position information. Waiting for an elapse of the predetermined period of time in step S205 is a process for waiting for the time period required until the influence of noise generated in the outputs from the vibration reduction lens position detection mechanisms 5Y and 5P due to power supply to the shutter leading curtain magnet Mg1 in step S204 becomes negligibly small. Changing the vibration reduction control mode to the closed control mode in step S206 is to change the current values ("0") of the control coefficients g1, g2, and g3 to their regular values, thereby changing the vibration reduction control mode from the open control mode to the closed control mode shown in FIG. 30A. From this time, high-precision vibration reduction control is performed.

Upon completion of the process in step S206, the control waits for an elapse of a predetermined period of time in step S207. In step S208, the vibration reduction control mode is changed to the open control mode by the same method as in the process in step S203. In step S209, the flash emission signal is set at High level (corresponding to time t43 in FIG. 32) to cause the flash unit 23 to emit light. In step S210, the control waits for an elapse of a time period required until the influence of noise generated in the outputs from the vibration reduction lens position detection mechanisms 5Y and 5P due to flash emission disappears. In step S211, the vibration reduction control mode is changed to the closed control mode by the same method as in the process in step S206. The process for waiting for the predetermined period of time in step S207 is to perform flash emission in step S209 after the shutter leading curtain which had begun to travel in step S204 has completed its travel and the shutter is set in the full open state.

Upon completion of the process in step S211, the control waits for an elapse of a time period that depends on the shutter time in step S212. In step S213, the vibration reduction control mode is changed to the open control mode by the same method as in the process in step S203. In step S214, the shutter trailing curtain magnet signal is set at High level (corresponding to time t44 in FIG. 32) to supply electric power to the shutter trailing curtain magnet Mg2, thus starting travel of the shutter trailing curtain. In step S215, the control waits for an elapse of a time period until the influence of noise generated in the outputs from the vibration reduction lens position detection mechanisms 5Y and 5P due to power supply to the shutter trailing curtain magnet disappears. In step S216, the vibration reduction control mode is changed to the closed control mode by the same method as in the process in step S206. In step S217, the control waits until the shutter trailing curtain completes its travel and the shutter is closed, i.e., the exposure operation ends. In step S218, the vibration reduction control ends (corresponding to time t45 in FIG. 32). In step S219, the shutter leading curtain magnet signal SMG1 and the shutter trailing curtain magnet signal SMG2 are restored to initial phases, i.e., to Low levels (corresponding to time t46 in FIG. 32). The process of this exposure control ends in step S220.

Waiting for an elapse of the time period depending on the shutter time in step S212 is to adjust the time so that the exposure time on the film surface can finally become a proper, intended shutter time including time periods other than this time (for example, the processing times in steps S204 to S211, in steps S213 to S215, and the like). Ending the vibration reduction control in step S218 is to prohibit the process operation of the vibration reduction control (timer interruption) shown in FIG. 27. Thus, the vibration reduction control operations in the yawing and pitching directions performed so far end In this manner, the vibration reduction shown in FIG. 30A can be performed during exposure using the digital control. As shown in FIG. 32, for a predetermined period of time from the power supply start time to the shutter leading curtain magnet or the shutter trailing curtain magnet or from the flash emission start time, the vibration reduction control is performed in the open control mode without using any vibration reduction lens position information so as to be free from the influence of electrical noise generated in the outputs from the vibration reduction lens position detection mechanisms 5Y and 5P. The predetermined period of time (corresponding to one in step S205) required for open-controlling the vibration reduction control from the power supply start time to the shutter leading curtain magnet, the predetermined period of time (corresponding to one in step S215) required for open-controlling the vibration reduction control from the power supply start time to the shutter trailing curtain magnet, and the predetermined period of time (corresponding to one in step S210) required for open-controlling the vibration reduction control from the flash emission start time are respectively determined by the levels and durations of noise components generated in the outputs from the vibration reduction lens position detection mechanisms 5Y and 5P, and the like at these times, and are independently set.

Figure 36:
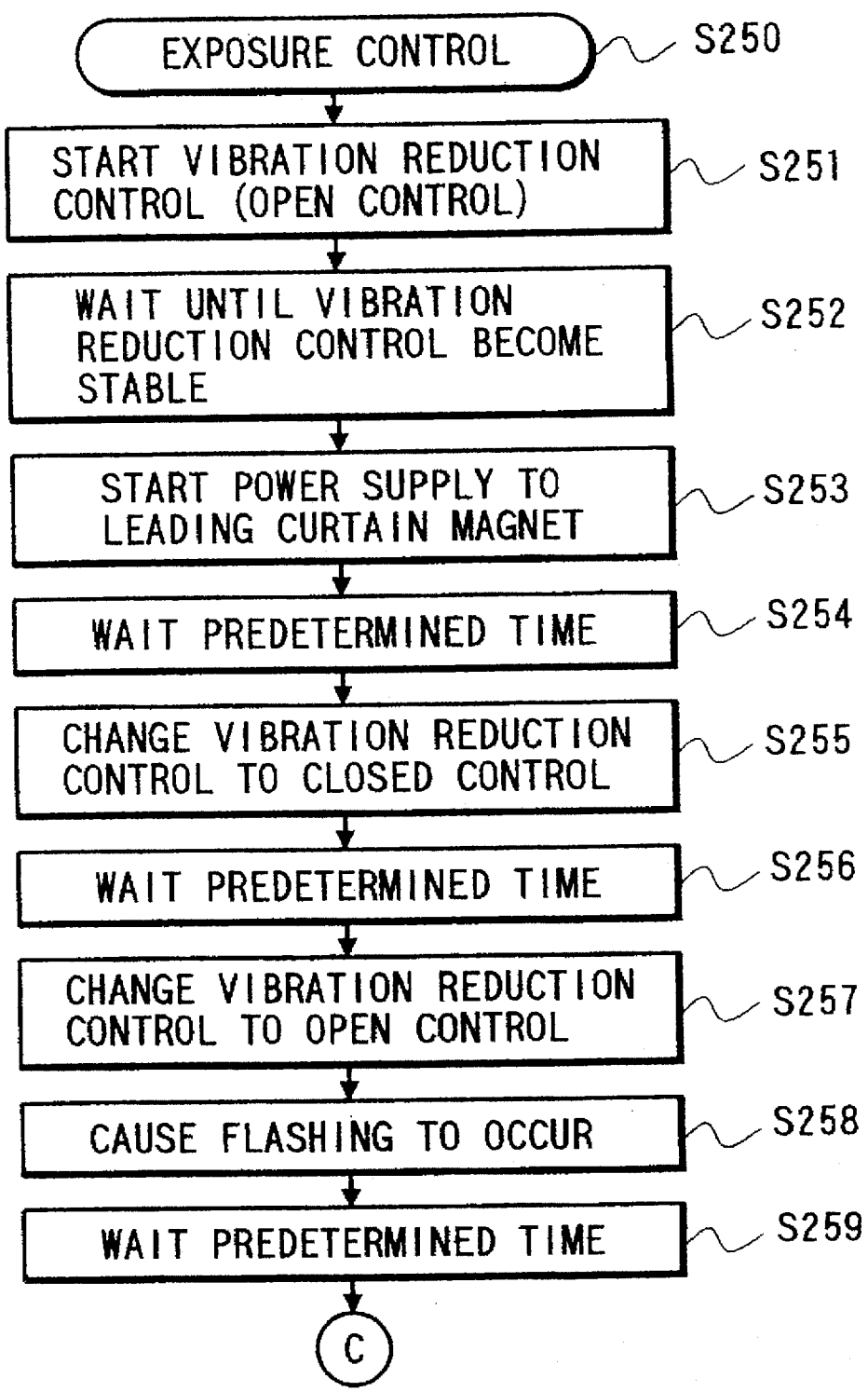
FIG. 36 is a flow chart of the vibration reduction control under exposure according to the embodiment shown in FIG. 1.
Figure 37:
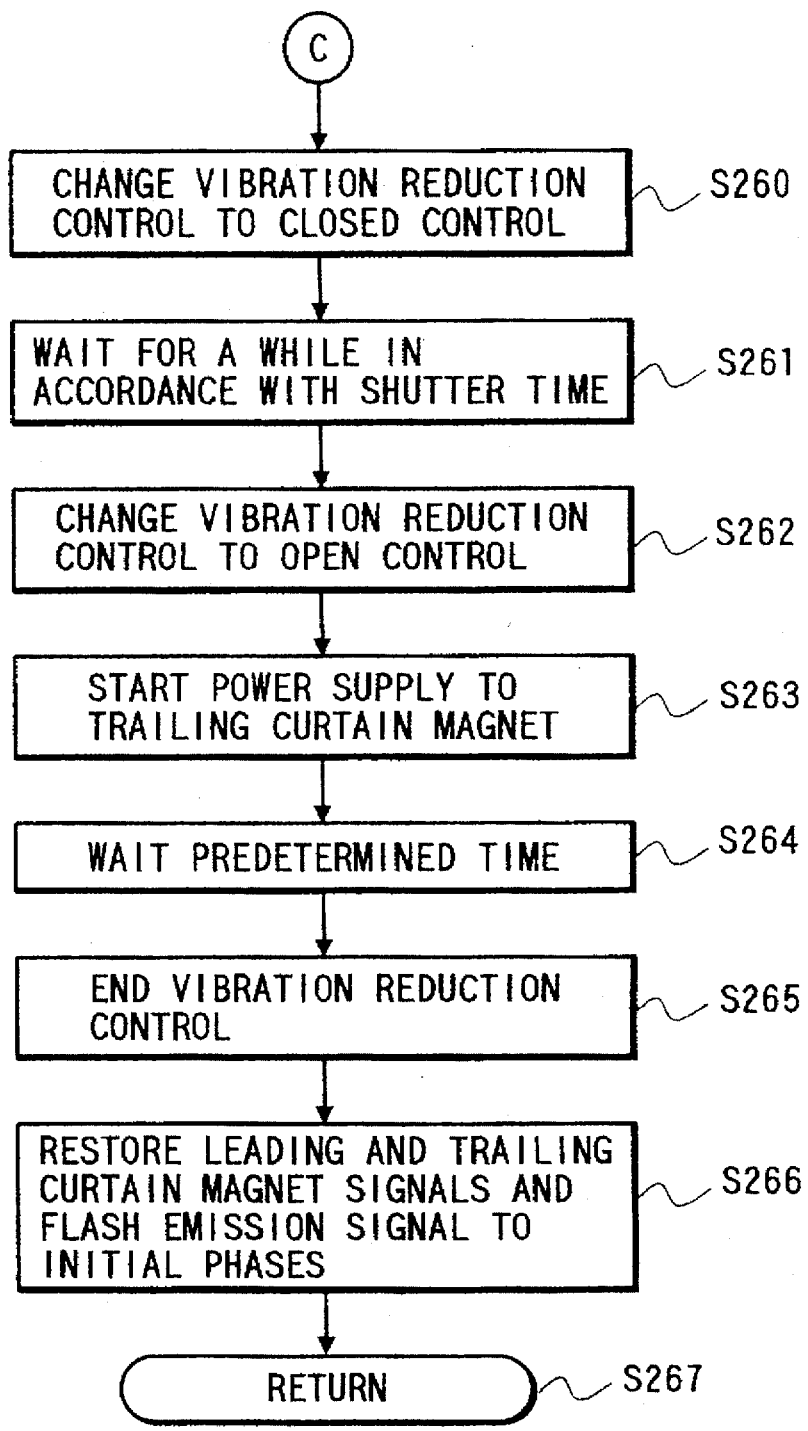
FIG. 37 is a flow chart of the vibration reduction control under exposure according to the embodiment shown in FIG. 1.

Another embodiment of the control of the electromagnetic type vertically-travel focal-plane shutter will be explained below with reference to the flow charts in FIGS. 36 and 37. FIGS. 36 and 37 are flow charts showing the exposure control of a program stored in the MPU 1, and the control operation is started in accordance with a predetermined time defined in the following description. The process shown in FIGS. 36 and 37 simplifies the open control times of the process shown in FIGS. 32, 34, and 35 as follows. In this embodiment, open control is performed during the period between times t41 and t42, for a predetermined period time from time t42, for a predetermined period of time from time t43, and during the period between times t44 and t45. Other control operations are the same as those in FIGS. 34 and 35.

The process of this exposure control starts from step S250. In step S251, the control coefficients g2, and g3 are set to be "0" to allow the respective process operations of the vibration reduction control (timer interruption) shown in FIG. 27, thereby starting the vibration reduction control operations in the yawing and pitching directions (corresponding to time t41 in FIG. 32). Therefore, this vibration reduction control is open control with the control coefficients g1, g2, and g3=0. In step S252, the control waits until the vibration reduction control becomes stable. In step S253, the shutter leading curtain magnet signal is set at High level (corresponding to time t42 in FIG. 32) to supply electric power to the shutter leading curtain magnet Mg1, thus starting travel of the shutter leading curtain. In step S254, the control waits for an elapse of a predetermined period of time until the influence of noise generated in the outputs from the vibration reduction lens position mechanisms 5Y and 5P due to power supply to the shutter leading curtain magnet Mg1 on the vibration reduction control becomes negligibly small. Thereafter, the control coefficients g1, g2, and g3 are restored to regular values in step S255, thus changing the vibration reduction control mode to the closed control mode.

Upon completion of the process in step S255, the control waits in step S256 for an elapse of time required until the shutter leading curtain which had begun to travel in step S253 has completed its traveling, and the shutter is set in the full open state. In step S257, the vibration reduction control mode is changed to the open control mode by setting the control coefficients g1, g2, and g3 to be "0" In step S258, the flash emission signal is set at High level (corresponding to time t43 in FIG. 32) to cause the flash unit 23 to emit light. In step S259, the control waits for an elapse of time required until the influence of noise generated in outputs from the vibration reduction lens position detection mechanisms 5Y and 5P due to flash emission disappears. In step S260, the vibration reduction control mode is changed to the closed control mode by the same method as in the process in step S255.

Upon completion of the processing in step S260, the control waits for an elapse of time depending on the shutter time in step S261. In step S262, the vibration reduction control mode is changed to the open control mode by the same method as in the process in step S257. In step S263, the shutter trailing curtain magnet signal is set at High level (corresponding to time t44 in FIG. 32) to supply electric power to the shutter trailing curtain magnet Mg2, thus starting travel of the shutter trailing curtain. In step S264, the control waits for an elapse of time required until the influence of noise generated in the outputs from the vibration reduction lens position detection mechanisms 5Y and 5P due to power supply to the shutter trailing curtain magnet disappears, and the shutter trailing curtain completes its travel and the shutter 10 is closed, i.e., the exposure operation ends. In step S265, the vibration reduction control operations in the yawing and pitching directions end (corresponding to time t45 in FIG. 32) by prohibiting the process operations of the vibration reduction control (timer interruption) in the yawing direction shown in FIG. 27 and the vibration reduction control (timer interruption) in the pitching direction that performs the same process as that in the yawing direction). In step S266, the shutter leading curtain magnet signal SMG1 and the shutter trailing curtain magnet signal SMG2 are restored to initial phases, i.e., to Low levels (corresponding to time t46 in FIG. 32). The process of this exposure control ends in step S267.

The process shown in FIGS. 36 and 37 may be further simplified, and the vibration reduction may be open-controlled during an interval from time t41 in FIG. 32 until an elapse of a predetermined period of time from power supply of the shutter leading curtain magnet.

With the above-mentioned method, during at least the period in which the outputs from the vibration reduction lens position detection mechanisms 5Y and 5P are influenced by electric noise, the vibration. reduction control is performed without using any vibration reduction lens position information so as to prevent the vibration reduction control from being influenced by the electric noise. During other periods, high-precision vibration reduction control is realized using the vibration reduction lens position information.

The vibration reduction operation under exposure of a lens shutter, which is popularly used in compact cameras for silver halide films in recent years, will be described below. This embodiment uses a two-phase magnetization type stepping motor as one of actuators popularly used for attaining the opening/closing operation of the lens shutter. In such lens shutter, for example, when the magnetization phases of the two coils constituting the stepping motor, i.e, the first-and second-phase magnetization coils are expressed by ("magnetization sign of first-phase coil", "magnetization sign of second-phase coil"), the shutter is opened by changing the magnetization phases in the order of (+, +)→(-, +)→(-, -)→(+, -)→(+, +) . . . , and conversely, the shutter is closed by changing the magnetization phases of the coils in the order of (+, +)→(+, -)→(-, -)→(-, +)→(+, +). It is a common practice to start the vibration reduction control at least before the beginning of the opening operation of the shutter, and to end it at the end of the closing operation of the shutter. Note that flash emission in the lens shutter is normally subjected to so-called flashmatic control in which the shutter aperture F-number that can obtain an optimal exposure amount by flash light is uniquely determined by the object distance, and the flash unit emits light at the time when the shutter reaches this aperture F-number. Therefore, in this case, the flash unit emits light during the period from time t54 in FIG. 38 at which the shutter begins to open until time t56 at which the shutter reaches the full open state.

As in the above-mentioned example of the electromagnetic type vertically-travel focal-plane shutter, when power supply to the stepping motor for opening/closing the shutter is controlled and when the flash unit emits light, a large current flows instantaneously and induces electric noise, which influences the vibration reduction lens position detection mechanisms 5Y and 5P that process very weak currents. As a result, a large number of noise components are mixed in the outputs from these mechanisms. In view of this problem, according to this embodiment, during the period in which the outputs from the vibration reduction lens position detection mechanisms 5Y and 5P are influenced by noise, the vibration reduction control is performed in the open control mode. More specifically, open control is performed during the opening and closing operations of the shutter 3, and closed control is performed while the shutter is in the open state. Also, flash emission is made during the opening operation of the shutter 3, and open control is made in this period, as a matter of course. The open control in the vibration reduction control uses the same control method as that for the above-mentioned vertically-travel focal-plane shutter. When this control method is executed in the lens shutter camera, the shutter drive mechanism 6 in this case can comprise a versatile H-bridge type motor driver using a known technique, and the magnetization phases in arbitrary directions can be realized in the first- and second-phase magnetization coils of the stepping motor by a known technique.

Figure 38:
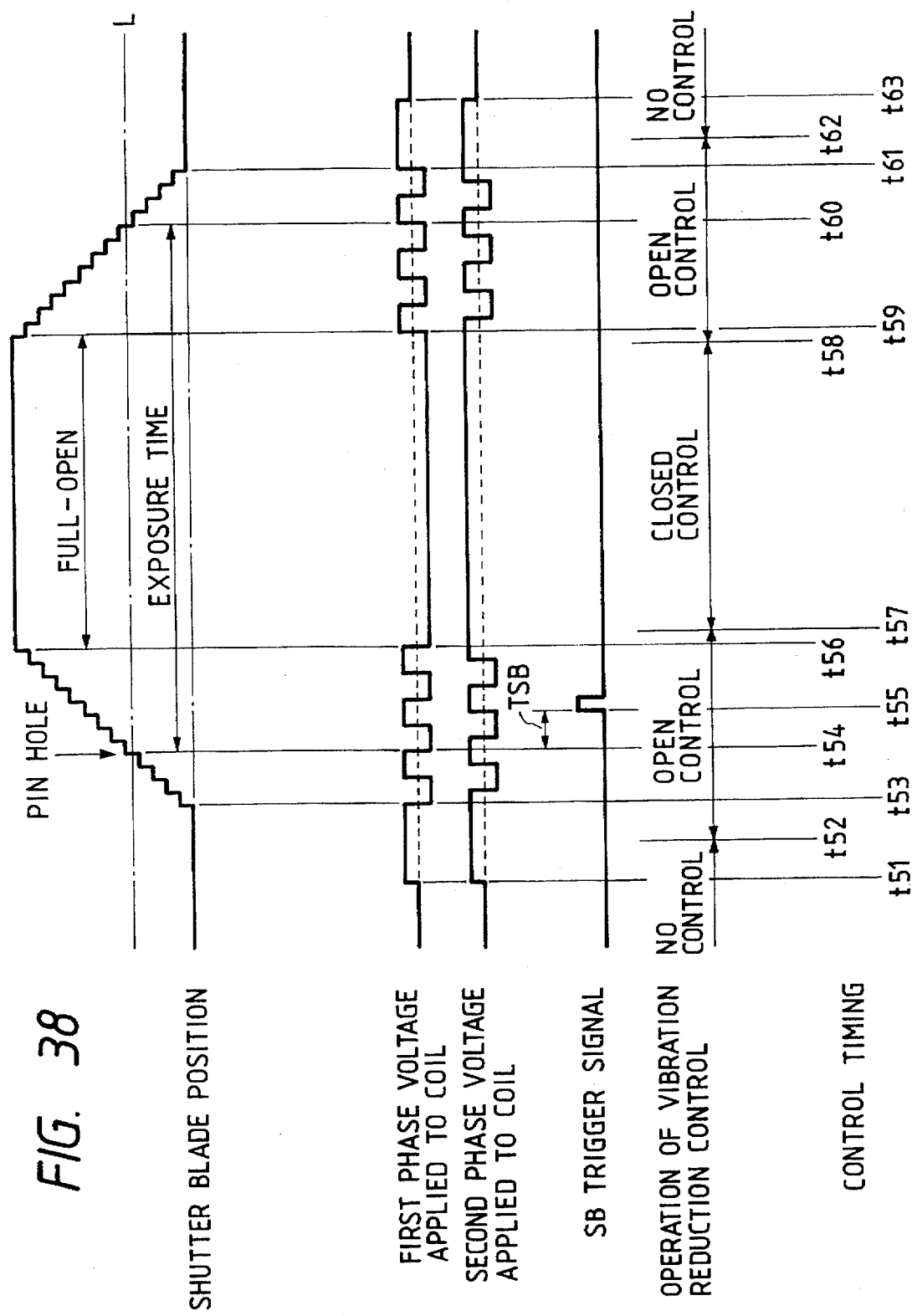
FIG. 38 is a timing chart of the vibration reduction control under exposure according to the embodiment shown in FIG. 1.

FIG. 38 is a timing chart showing the opening/closing operation of the shutter 3 under exposure, the light-emission operation of the flash unit 23, and the vibration reduction control operation. The vibration reduction control under exposure of the lens shutter camera will be briefly described below with reference to the timing chart shown in FIG. 38. The uppermost graph or chart in FIG. 38 shows the position of one of the shutter blades of the lens shutter. In this graph, the upper direction indicates the blade position in a direction to open the shutter, and an aperture is formed at the position above a one-dot line L, thus setting an exposure state. The blades begin to move at time t54, and a pinhole-shaped. aperture is formed at time t54. Thereafter, the aperture gradually opens, and the aperture size maximizes at time t56 (full-open state). The shutter blades stay in that state for a while, and thereafter, they begin to move in a direction to close the shutter from time t59. The aperture is closed at time t60, and the blades stop their movement at time t61.

In this example, the vibration reduction control is started in the open control mode from time t52 before the beginning of the opening operation of the shutter upon exposure. Thereafter, the vibration reduction control is changed to the closed control mode from time t57 at which the shutter is opened to attain the full-open F-number, i.e., is set in the full-open state. Then, the vibration reduction control is changed to the open control mode from time t58 immediately before time t59 at which the shutter begins to close, and ends at time t61 after the end of the closing operation of the shutter. In FIG. 38, the flash unit emits light at time t55 a time TSB after time t54 at which the shutter forms a pinhole-shaped aperture.

Figure 39:
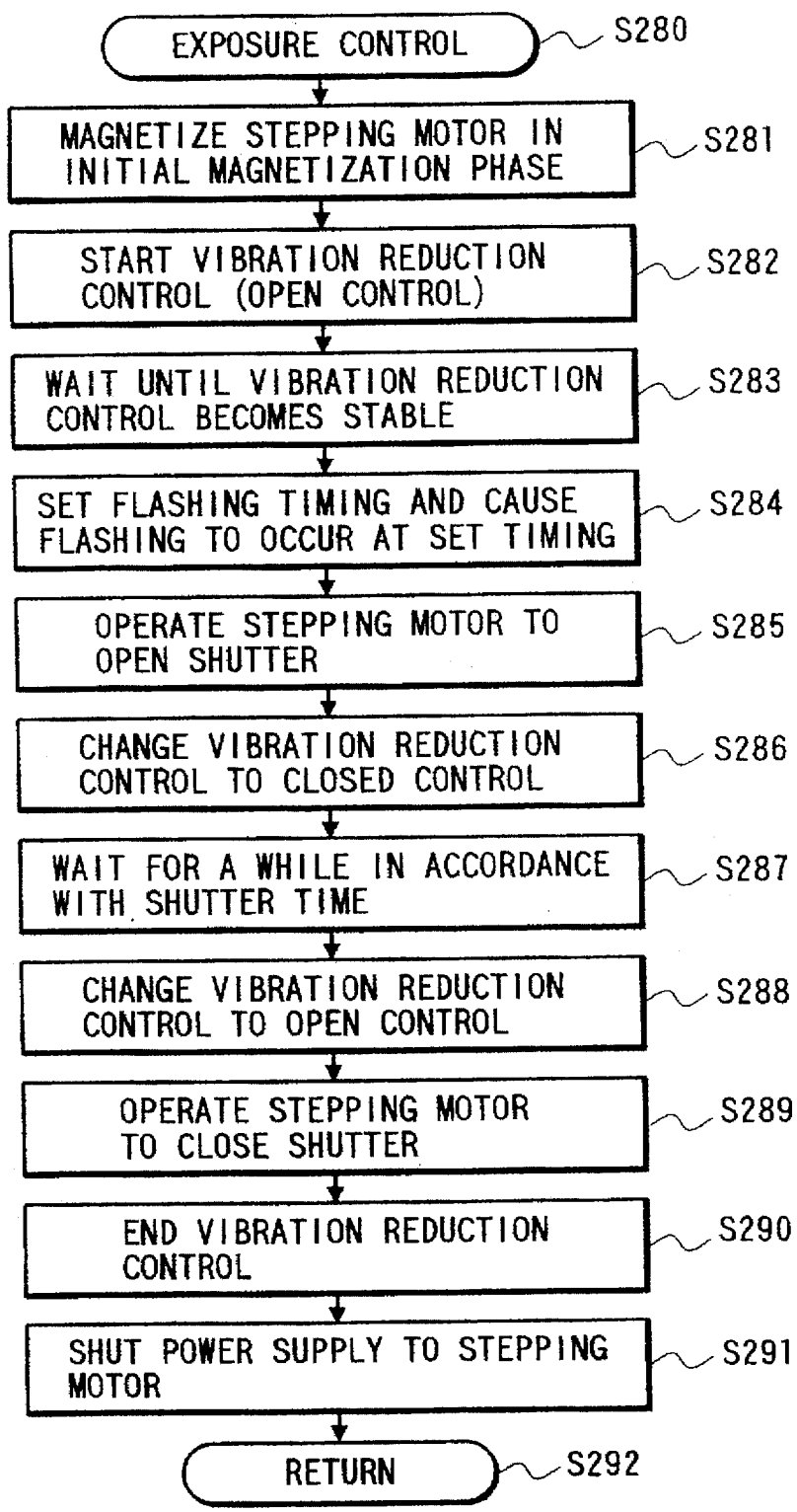
FIG. 39 is a flow chart of the vibration reduction control under exposure according to the embodiment shown in FIG. 1.

The exposure control of the lens shutter camera will be described below with reference to FIG. 39. FIG. 39 is a flow chart showing an embodiment of the exposure control associated with the lens shutter camera of a program stored in the MPU 1, and the control operation is started at a predetermined timing defined in the following description. Note that the open control in the vibration reduction control is attained by the control method shown in FIG. 30D, i.e., the method of setting the gain coefficients g1, g2, and g3 to be "0" and performing the open control based on the vibration reduction lens target position without consequently using any vibration reduction lens information. Also, the control method other than that shown in FIG. 30D, e.g., the method shown in FIG. 30B or 30C, or another method may be used to perform the vibration reduction control without consequently using any vibration reduction lens position information.

The process of this exposure control starts from step S280. In step S281, the stepping motor is magnetized in initial magnetization phases (+, +) (corresponding to time t51 in FIG. 38). In step S282, the vibration reduction control operations in the yawing and pitching directions are started (corresponding to time t52 in FIG. 38) by setting the control coefficients g1, g2, and g3 to be "0" to allow the process operations of the vibration reduction control (timer interruption) in the yawing direction shown in FIG. 27 and the vibration reduction control (timer interruption) in the pitching direction that performs the same process as that in the yawing direction). Therefore, this vibration reduction control is open control with the control coefficients g1, g2, and g3=0. In step S283, the control waits until the vibration reduction control becomes stable. In step S284, the flashing timing of the flash unit is determined by a known technique, and the flash unit is set to emit light at the determined timing. In step S285, the stepping motor is operated by changing the magnetization phases in the order of (+, +)→(−, +)→(−, −)→(+, −)→(+, +) . . . , thereby opening the shutter (corresponding to the period t53–t56 in FIG. 38). The flash unit emits light (corresponding to time t55 in FIG. 38) at the predetermined timing during the period t53–t56. The flashing timing of the flash unit 23 may be determined as follows. For example, if the MPU 1 has a timer interruption function, the function is used. In this case, an interruption signal is generated at time t55 the time TSB after time t54 at which the shutter begins to open in FIG. 38 so as to instantaneously set the flash emission signal at High level, thereby operating the flash unit 23 to emit light. If the time period between times t53 and t54 is always constant, the time TSB may be measured based not on time t54 but on time t53. That is, step S284 in FIG. 39 may be executed with reference to the flashing timing of the flash unit.

Upon completion of the process in step S285, the vibration reduction control mode is changed to the closed control mode (corresponding to time t57 in FIG. 38) by changing the control coefficients g1, g2, and g3 associated with the vibration reduction control to regular values in step S286. Upon completion of the process in step S286, the control waits for an elapse of time that depends on the shutter time in step S287. In step S288, the vibration reduction control mode is changed to the open control mode (corresponding to time t58 in FIG. 38) by changing the control coefficients g1, g2, and g3 associated with the vibration reduction control to be "0". In step S289, the shutter is closed by changing the magnetization phases of the stepping motor in the order of (+, +)→(+, −)→(−, −)→(−, +) →(+, +) (corresponding to the period t59–t61 in FIG. 38). Upon completion of the process in step S289, the vibration reduction control operations in the yawing and pitching directions end (corresponding to time t62 in FIG. 38) by prohibiting the process operations of the vibration reduction control (timer interruption) shown in FIG. 27 in step S290. In step S291, power supply to the stepping motor is shut off (corresponding to time t63 in FIG. 38). In step S292, the process of this exposure control ends.

With the above-mentioned method, during at least the period in which the outputs from the vibration reduction lens position detection mechanisms 5Y and 5P are influenced by electric noise, the vibration reduction control is performed without using any vibration reduction lens position information so as to prevent the vibration reduction control from being influenced by the electric noise. During other periods, high-precision vibration reduction control is realized using the vibration reduction lens position information.

An embodiment of a method of detecting the direction of gravity with respect to the camera main body and detecting the orientation of the camera as it is held by utilizing the outputs from the vibration reduction lens position detection mechanisms 5Y and 5P will be explained below. The detection method will be briefly described below. The average values of vibration reduction lens positions in the yawing and pitching directions from when the half-stroke switch SW1 is pressed until at least the full-stroke switch SW2 is turned on are calculated. As the method of calculating the average value of the vibration reduction lens positions, the outputs V1 and V2 from each of the vibration reduction lens position detection mechanisms 5Y and 5P are sampled at predetermined time intervals, and the vibration reduction lens positions are calculated based on the sampled values using formulas 8, 9, and 10, as described above. Assume that LRY(i) represents the vibration reduction lens position in the yawing direction obtained by the i-th sampling operation, and n represents the number of times of sampling operations. In this case, a vibration reduction lens average position LRY0 in the yawing direction is calculated using formula 32 below. Likewise, assume that LRP(i) represents the vibration reduction lens position in the pitching direction obtained by the i-th sampling operation, and m represents the number of times of sampling operations. In this case, a vibration reduction lens average position LRP0 in the pitching direction is calculated using formula 33 below.

$$LRY0 = \left\{ \sum_{i=1}^{n} LRY(i) \right\} / n \qquad \text{formula 32}$$

$$LRP0 = \left\{ \sum_{i=1}^{m} LRP(i) \right\} / m \qquad \text{formula 33}$$

Figure 41:
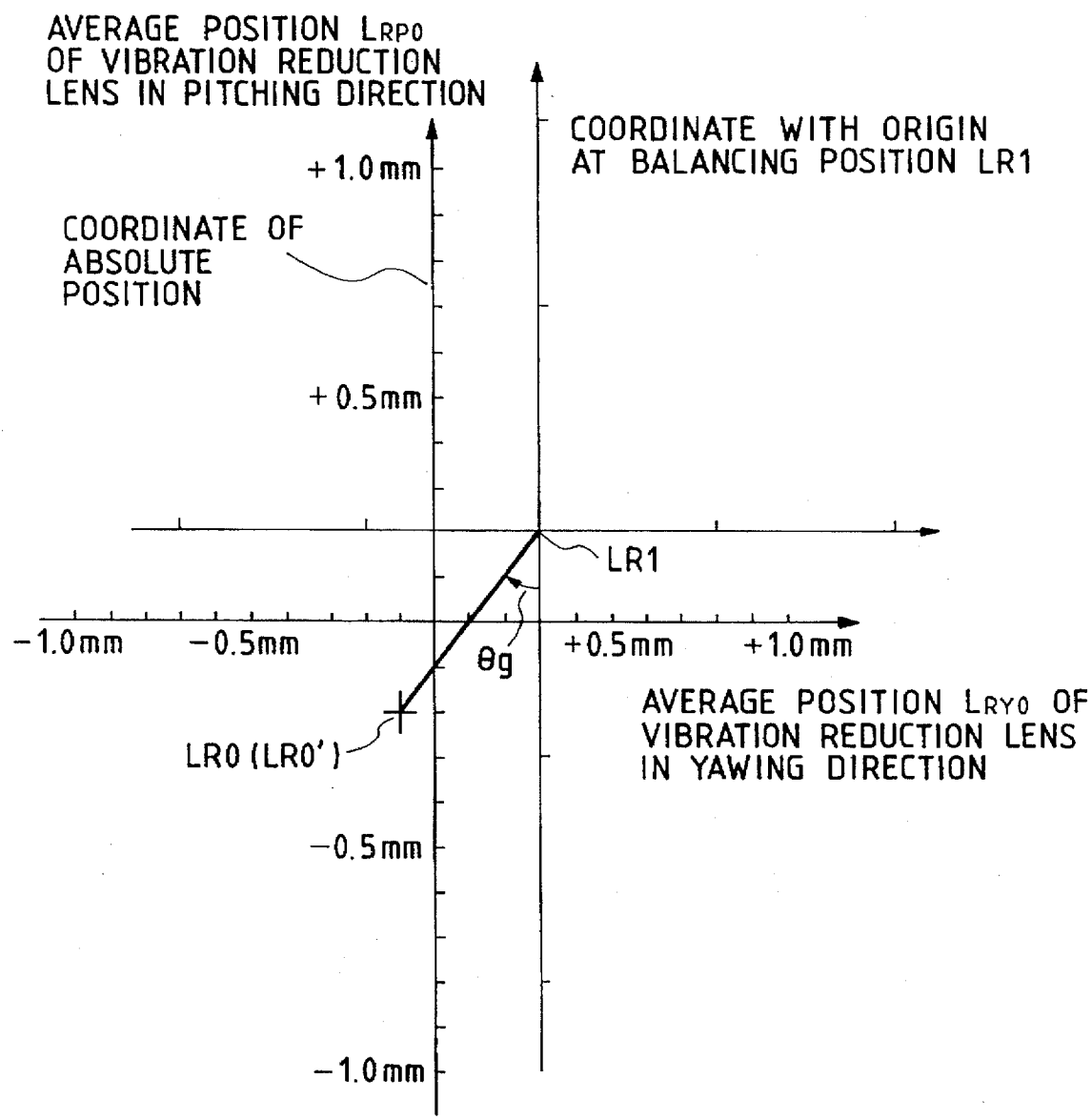
FIG. 41 is a graph for explaining the relationship between the vibration reduction lens average position and the tilt of the camera according to the embodiment shown in FIG. 1.
Figure 42A:
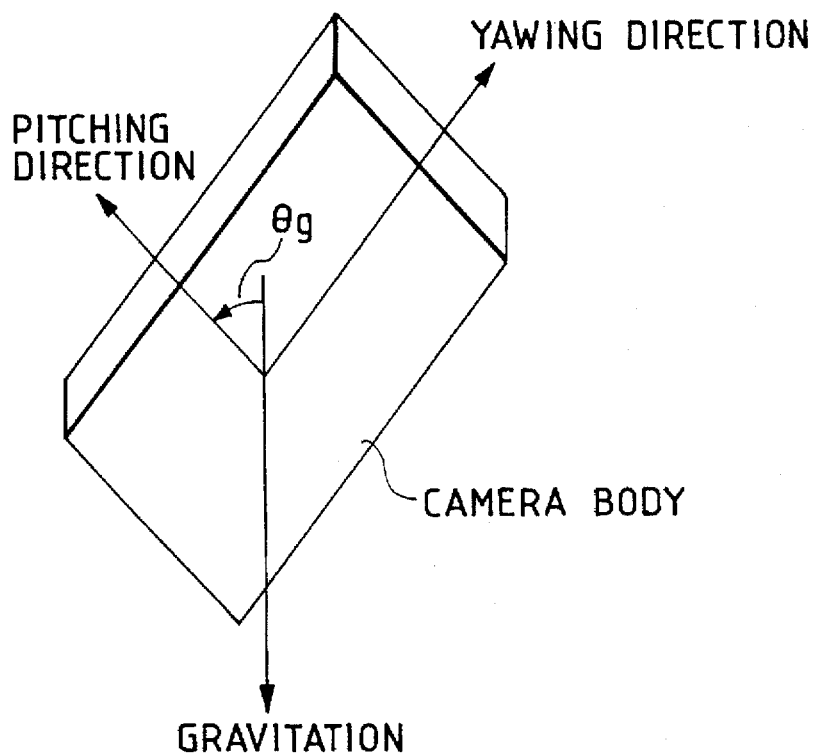
FIGS. 42A and 42B are views for explaining the relationship between the vibration reduction lens average position and the tilt of the camera according to the embodiment shown in FIG. 1.
Figure 42B:
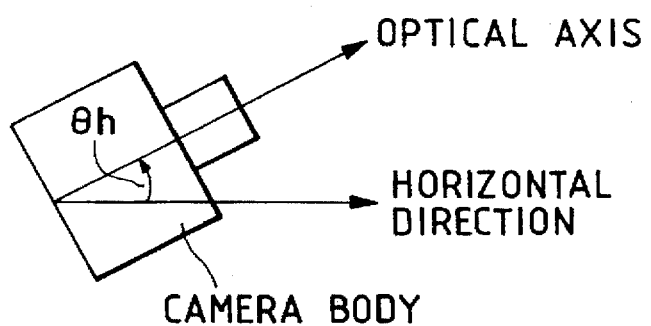

Note that the coordinate position of the vibration reduction lens 2 to be used in the following description is expressed by ("vibration reduction lens position in yawing direction", "vibration reduction lens position in pitching direction"), the right horizontal direction when the camera is viewed from the film surface side when the user holds the camera at the horizontal format position is defined as a + yawing direction, and the upper direction at that time is defined as a + pitching direction, as shown in FIGS. 42A and 42B, for the sake of simplicity. FIG. 41 shows an example of a vibration reduction lens average position LR0(LRY0, LRP0) obtained in this manner. FIG. 41 exemplifies a case wherein the vibration reduction lens average position LR0 has a coordinate position (−0.1 [mm], −0.2 [mm]). Assume a case wherein the camera stands still so that the image taking optical axis is parallel to the direction of gravity. In this case, the vibration reduction lens 2 is not influenced by gravity, and stands still at the balancing position of the elastic forces that support the vibration reduction lens 2. This position is defined as LR1(LRY1, LRP1). When the vibration reduction lens average position LR0 upon pressing the half-stroke switch is expressed by a coordinate position LR0' with reference to LR1, it is given by formula 34 below. In FIG. 41, the coordinate position LR0'=(−0.4 [mm], −0.4 [mm]).

$$\begin{aligned} LR0' &= (LRY0', LRP0') \\ &= (LRY0 - LRY1, LRP0 - LRP1) \end{aligned} \qquad \text{formula 34}$$

When the vibration reduction lens average coordinate position LR0' from the elastic force balancing coordinate position given by formula 34 above is assumed to be one vector, the direction of this vector agrees with the direction of gravity with respect to the camera, i.e., means rotation of the direction of optical axis of the camera with reference to the direction of gravity, and the magnitude of the vector means the power of influence.

A case will be examined below wherein the user holds the camera as follows, i.e., as shown in FIGS. 42A and 42B. That is, assume that the camera is tilted through θg counterclockwise (+ direction) to have the image taking optical axis as the center when viewed from the film surface side, and is tilted through θh in the horizontal direction. The following relations are established among θg, θh, and the coordinate position LR0'. First, the relation given by formula 35 below is established between the vector LR0' and θg:

$$\theta g = \tan^{-1}(LRY0'/LRP0') + kg \times \pi \qquad \text{formula 35}$$

In this case, if LRY0'≦0 and LRP0'≦0, kg=0; if LRY0'>0, kg=1; or if LRY0'>0 and LRP0'>0, kg=2, and θg falls within the range from −π to +π. Note that when LRP0'/LRP'=∞, if LRY0'>0, θg=−π/2; if LRY0'<0, θg=+π/2. For example, in the example in FIG. 41, the coordinates of the elastic force balancing position LR1 are (+0.3 [mm], +0.2 [mm]), and the coordinates of the vibration reduction lens average position LR0' from the elastic force balancing position LR1 are (−0.4 [mm], −0.4 [mm]). In this case, it can be calculated that the user held the camera while tilting it through θg=+π/4 counterclockwise when viewed from the film surface side. Note that the coordinates of the elastic force balancing position LR1 are measured and stored as an adjustment value in the EEPROM 24 upon delivery of the camera.

On the other hand, the magnitude, fg, of the vector LR0' is given by formula 36 below, and fg and θh satisfy the relation given by formula 37 below:

$$fg=\sqrt{(LRP0'^2+LRY0'^2)} \quad \text{formula 36}$$

$$|\theta h|=\cos^{-1}(fg/fg0) \quad \text{formula 37}$$

where |θh| falls within the range from 0 to +π/2, and fg0 is the value of fg obtained when the camera is set at the position of θh=0, i.e., in the horizontal direction. This value is measured and is written as an adjustment value in the EEPROM 24 upon delivery of the camera. Note that the absolute value of θh can be detected but theoretically its sign cannot be derived upon detection of the vibration reduction lens offset position due to gravity like in this embodiment.

As described above, the tilt information of the camera is obtained from the offset position of the vibration reduction lens 2 under the influence of gravity.

Figure 40:
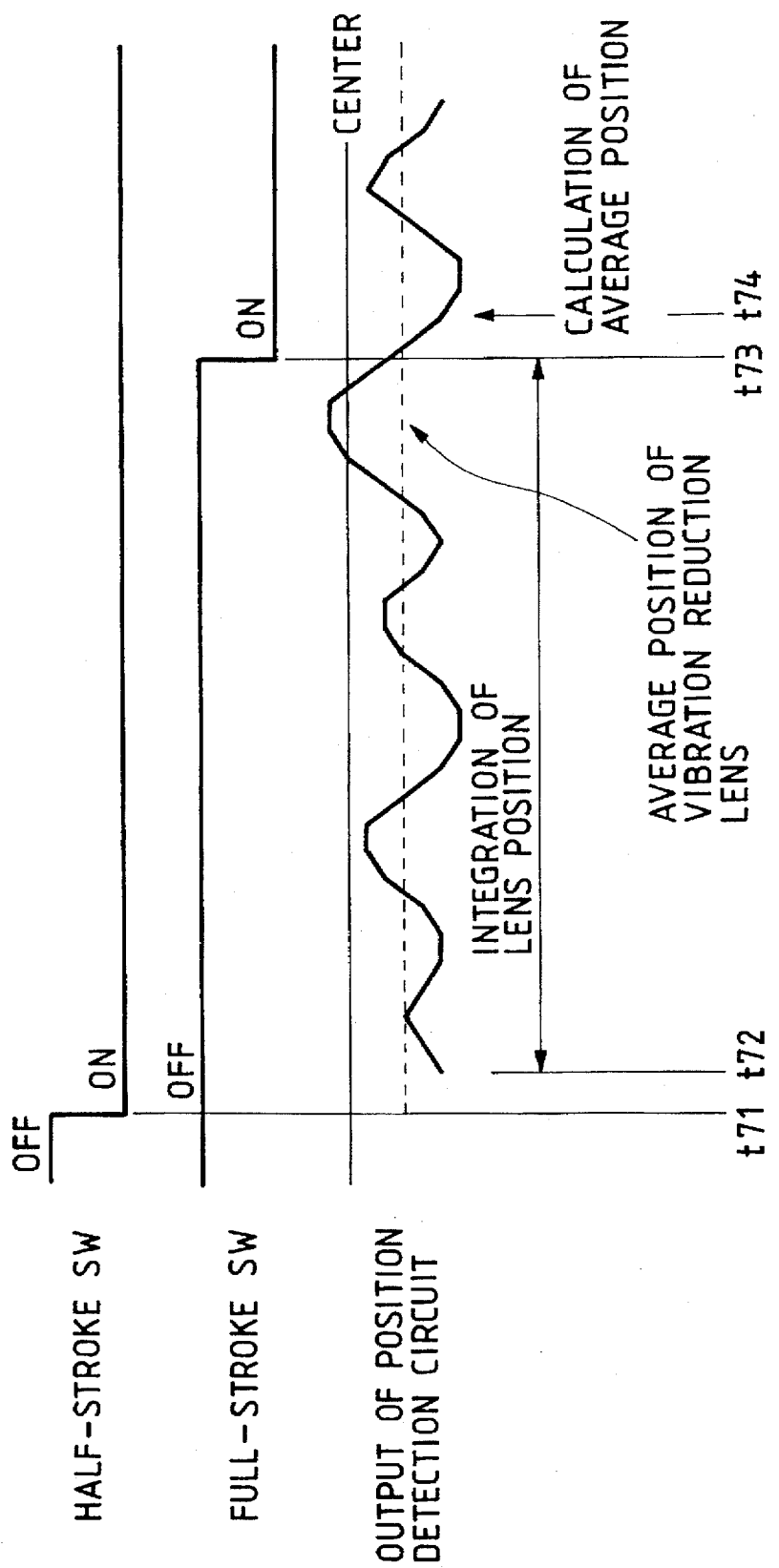
FIG. 40 is a timing chart of the calculation of the vibration reduction lens average position according to the embodiment shown in FIG. 1.
Figure 43:
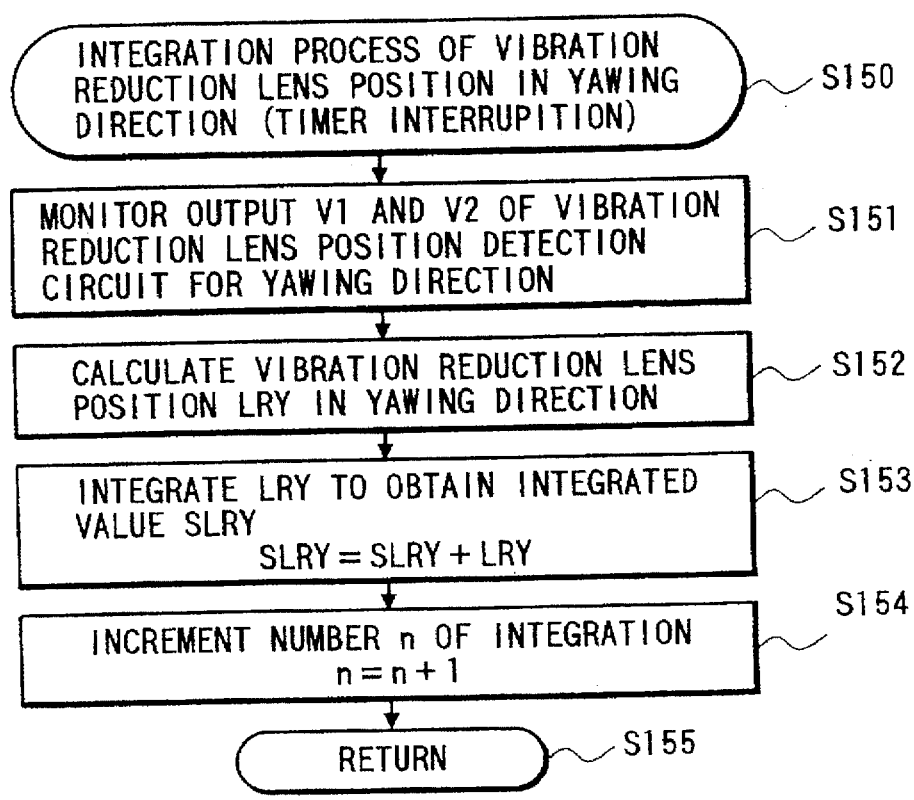
FIG. 43 is a flow chart showing the integration process of the vibration reduction lens position according to the embodiment shown in FIG. 1.

An example of the method of obtaining the average position LR0 of the vibration reduction lens 2, and LR0' on the converted coordinate system will be described below with reference to the flow chart in FIG. 43 and the like. The flow chart of FIG. 43 shows an example wherein the MPU 1 performs sampling control so as to attain easy control using a one-chip microcomputer or the like. The flow chart shown in FIG. 43 describes an embodiment associated with the vibration reduction lens integration process in the yawing direction of a program stored in the MPU 1, which process corresponds to a timer interruption process which repeats its operation at predetermined time intervals (e.g., 1−ms intervals) from when the operation is started at a predetermined timing defined in the following description until the operation is prohibited at another predetermined timing defined in the following description. The MPU 1 has a timer interruption function that starts a process at predetermined time intervals. Note that the interval in which the vibration reduction lens position integration process in the yawing direction is allowed is defined as follows. That is, the operation of this process is started (corresponding to time t72 in FIG. 40) upon turning on the half-stroke switch SW1 (corresponding to time t71 in FIG. 40) when the user presses the release button of the camera to its half-stroke position, and is prohibited (corresponding to time t74 in FIG. 40) upon turning on the release switch SW2 (corresponding to time t73 in FIG. 40) when the user depresses the release button of the camera to its full-stroke position.

The process shown in FIG. 43 starts from step S150. In step S151, the outputs V1 and V2 from the vibration reduction lens position detection mechanism 5Y in the yawing direction are monitored. In step S152, the vibration reduction lens position LRY in the yawing direction is calculated using formulas 8, 9, and 10 above. In step S153, the calculated vibration reduction lens position LRY in the yawing direction is integrated to obtain an integrated value SLRY. In step S154, the number n of integrations of the vibration reduction lens position in the yawing direction is incremented by "1". In step S155, the vibration reduction lens position integration process in the yawing direction ends. Note that the initial values of the integrated value SLRY in the yawing direction and the number n of integrations in the yawing directions are "0", and SLRY and n are set to be "0" in the initial sampling operation after the vibration reduction lens position integration process in the yawing direction is allowed. In this manner, the vibration reduction lens positions in the yawing directions are integrated in units of samples.

Subsequently, the operation of the vibration reduction lens position integration process in the yawing direction is prohibited at a timing defined in the following description, and the vibration reduction lens average position LRY0 is calculated based on formula 32 above using the integrated value SLRY and the number n of integrations at that time. More specifically, the portion ΣLRY(i) in formula 32 above corresponds to SLRY, and the vibration reduction lens average position LRY0 is calculated by dividing SLRY with the number n of integrations. Note that the vibration reduction lens average position LRP0 in the pitching direction is calculated by the same method as that described above. Using LRY0 and LRP0, the tilt angles θg and |θh| of the camera are calculated by formulas 34, 35, 36, and 37, as described above.

An embodiment of the method of using the vibration reduction lens average positions LRY0 and LRP0 in the yawing and pitching directions, and the tilt angles θg and |θh| of the camera, which are calculated by the above-mentioned method, will be explained below.

First, one object distance information or the defocus amount of the image taking lens is calculated based on a plurality of ranging values in a multiple ranging type camera using information of the tilt angles θg and |θh| of the camera. Alternatively, a final one photometry value is calculated based on multiple photometry values in a multiple photometry type camera using information of the tilt angles θg and |θh| of the camera. This will be described in detail below.

Assume that the ranging mechanism 21 outputs object distance information values on p different regions in the image taking frame or the defocus amount of the image taking optical system. When AF(1), AF(2), . . . , AF(i), . . . , AF(p) represent ranging values on the p regions output from the ranging mechanism 21, a final ranging value AF is calculated using formula 38 below:

$$AF = \sum_{i=1}^{p} \{kf(i) \times AF(i)\} / \sum_{i=1}^{p} \{kf(i)\} \quad \text{formula 38}$$

where kf(i) is the weighting value of the ranging value AF(i) of the i-th region, and formula 38 means to calculate a weighted mean of the ranging values of the respective regions and their weighting values. The weighting value kf(i) (i=1, 2, 3, . . . , p) of each region is determined depending on the above-mentioned tilt angles θg and |θh| of the camera as in formula 39 below:

$$kf(i)=f(\theta g, |\theta h|) \quad \text{formula 39}$$

for i=1, 2, 3, 4, . . . , p. On the other hand, kf(i) for a region from which no ranging value is obtained is set to be "0". Depending on the type of ranging mechanism 21, e.g., when the ranging mechanism 21 is of passive type, ranging values are not always obtained from all regions. In this case, in order to remove the ranging value of the region from which no ranging value is obtained from the weighted mean calculated by formula 38, the weighting value kf(i) of the region from which no ranging value is obtained is set to be "0".

Assume that the photometry mechanism 22 outputs object luminance information values on q different regions in the image taking field angle. Note that the unit of an object luminance is BV (brightness value) that complies with, e.g., the APEX method. When AE(1), AE(2), ..., AE(i), ..., AE(q) represent photometry values on the q regions output from the photometry mechanism 22, a final photometry value AE is calculated using formula 40 below:

$$AE = \sum_{i=1}^{q} \{ke(i) \times AE(i)\} / \sum_{i=1}^{q} \{ke(i)\} \quad \text{formula 40}$$

where ke(i) is the weighting value of the photometry value AE(i) of the i-th region, and formula 40 means to calculate a weighted mean of the photometry values of the respective regions and their weighting values. The weighting value ke(i) (i=1, 2, 3, ..., q) of each region is determined depending on the above-mentioned tilt angles $\theta g$ and $|\theta h|$ of the camera as in formula 41 below:

$$ke(i) = f(\theta g, |\theta h|) \quad \text{formula 41}$$

for i=1, 2, 3, 4, ..., q.

Figure 44:
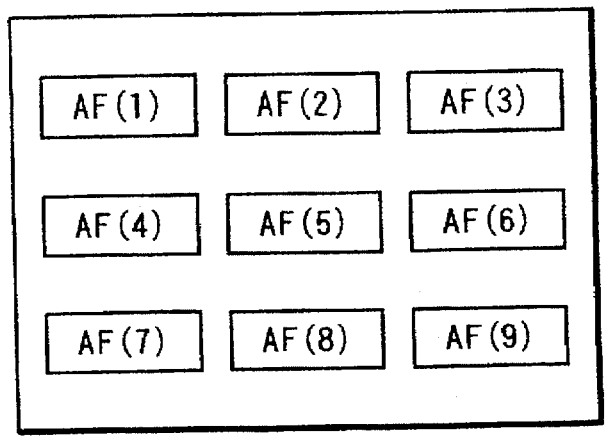
FIG. 44 is a view showing the image taking field angles and ranging regions of a ranging circuit according to the embodiment shown in FIG. 1.

An example of actually set weighting values kf(i) and ke(i) of the ranging and photometry values of the respective regions will be explained below. Assume that the ranging regions of the ranging mechanism 21 are disposed with respect to the image taking field angle, as shown in FIG. 44, and the number p of regions is 9. Similarly, the photometry regions of the photometry mechanism 22 are disposed with respect to the image taking frame, as shown in FIG. 45, and the number q of regions is 9. FIGS. 46A and 46B, FIGS. 47A and 47B, and FIGS. 48A and 48B show examples of the tilt states of the camera and the weighting values kf(i) (i=1, 2, 3, ..., 9) of the ranging values and the weighting values ke(i) (i=1, 2, 3, ..., 9) of the photometry values of the respective regions. In each of these figures, the left drawing shows the tilt state of the camera when the camera is viewed from the rear film surface side, the central drawing shows the tilt state of the camera when the camera is viewed from the right side, and the right drawing shows the weighting values of the ranging and photometry values of the respective regions at that time. In the right drawings, numerical values at the same positions as in the layout of the ranging and photometry regions shown in FIGS. 44 and 45 indicate the weighting values of the ranging and photometry values of the corresponding regions. Note that the weighting values of the ranging and photometry values of each region have a common value in this embodiment. FIG. 46A shows an example of the weighting values of the ranging and photometry values of the respective regions used when the camera is held at the horizontal (corresponding to $\theta g=0$), level (corresponding to $\theta h=0$) position. The position shown in FIG. 46A is the most popular holding position of the camera. At this time, the weighting values at the center of the field angle where a main object exists with highest probability are set preferentially, and the weighting values of the surrounding regions are set to be small. FIGS. 46B and 47A show examples of the weighting values of the ranging and photometry values of the respective regions used when the camera is held at horizontal (corresponding to $\theta g=0$), upward (corresponding to $\theta h$=about +30°) and downward (corresponding to $\theta h$=about −30°). As described above, in the method of calculating the tilt information of the camera using the average position of the vibration reduction lens as in this embodiment, such difference between upward and downward positions cannot be detected. This is because the absolute value of $\theta h$ can be detected but its sign cannot be detected. Therefore, common weighting values are used on the respective regions in FIGS. 46B and 47A, so that the weighting values on the central regions are set to be large, and the weighting values on the upper and lower regions are set to be small. When the camera is held upward, strong backlight such as sunlight may be incident on the upper portion of the frame, and may influence the ranging and photometry values. For this reason, the weighting values on the upper regions are set to be small. On the other hand, when the camera is held downward, light from a dark object such as the ground may be incident on the lower portion of the frame, and may influence the ranging value AF and the photometry value AE finally calculated using formulas 38 and 40 above. As described above, since the upward or downward position of the camera cannot be discriminated, the weighting values on the upper and lower portions of the frame are set to be small in consideration of the above-mentioned facts. FIGS. 47B, 48A, and 48B show examples of the weighting values of the ranging and photometry values of the respective regions used when the camera is rotated obliquely counterclockwise (corresponding to $\theta g$=about +30° ; FIG. 47B), obliquely clockwise (corresponding to $\theta g$=about −30° ; FIG. 48A), and through 90° counterclockwise (corresponding to $\theta g$=+90° ; FIG. 48B) after the camera is held in the horizontal direction (corresponding to $\theta h=0$). In this case, the weighting values of regions on the central line along the direction of gravity are set to be large, and the weighting values of other regions are set to be small.

In the above description, the weighting values of the respective regions of the ranging and photometry values use common values, but may use independent values. Also, in the above description, each weighting value ranges from 1 to 3. Alternatively, weighting values may be set more finely using the tilt angles $\theta g$ and $|\theta h|$ of the camera. Conversely, each weighting value may assume only 0 and 1 to determine whether or not the ranging or photometry value of the corresponding region is selected.

As described above, in the conventional camera, the tilt state of the camera depending on the user's holding position has a large influence on the ranging and photometry performances. However, according to this embodiment, such influence can be remarkably eliminated, and the ranging and photometry performances can be greatly improved.

Since the vibration reduction lens 2 is supported by elastic forces, the position of the vibration reduction lens 2 under the stationary condition is offset from the center of the movement range of the vibration reduction lens due to offset elastic forces or the weight of the movable member of the vibration reduction lens 2. The influence of the offset elastic force may often become conspicuous due to aging, deterioration, and the like of the mechanism of the vibration reduction lens 2. The direction and amount of the influence of the weight may often vary depending on the user's camera holding position, i.e., the tilt state of the camera. When the above-mentioned vibration reduction control is performed while the position of the vibration reduction lens is largely offset, the vibration reduction control precision is impaired. In view of this problem, the control block diagram of the vibration reduction lens control shown in FIG. 30A is modified, so that the control coefficients are changed depending on the vibration reduction lens average positions LRY0 and LRP0 in the yawing and pitching directions calculated by the above-mentioned method, thus attaining high-precision vibration reduction control free from the above-mentioned influences.

Figure 49:
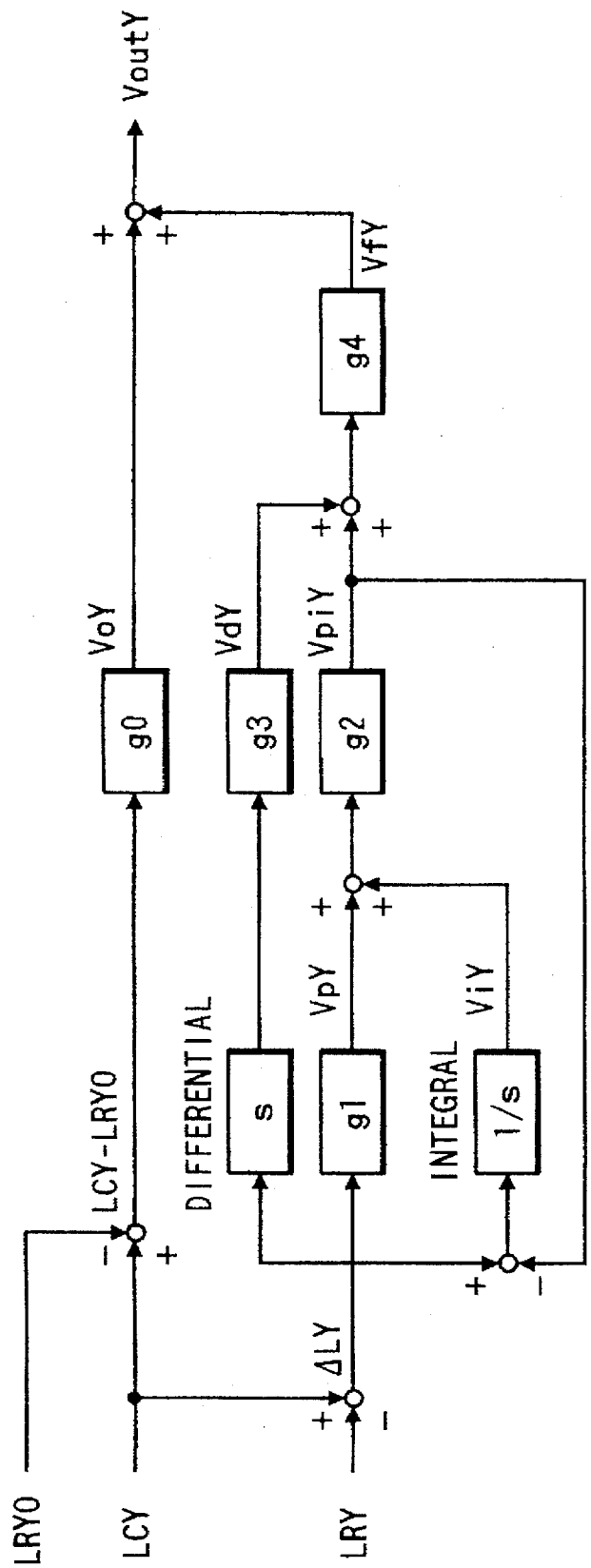
FIG. 49 is a block diagram of the vibration reduction lens control according to the embodiment shown in FIG. 1.

An embodiment associated with this control will be explained below. The vibration reduction lens average position LRO=(LRY0, LRP0) is calculated by the above-mentioned method. The vibration reduction control is performed using control blocks shown in FIG. 49 on the basis of the obtained vibration reduction lens average position LR0=(LRY0, LRP0). In FIG. 49, the method of calculating the open control term VoY in the control block diagram shown in FIG. 30A is modified to one depending on the vibration reduction lens average position LRY0 in the yawing direction, and a new control coefficient (gain coefficient g4) that depends on the vibration reduction lens average position LRY0 in the yawing direction is added to the feedback control term.

The open control term VoY in the yawing direction is calculated by formula 42 below, which is obtained by modifying formula 24 above and to which a parameter of the vibration reduction lens average position LRY0 in the yawing direction is added:

$$VoY=g0\times(LCY-LRY0) \qquad \text{formula 42}$$

In order to explain formula 42 using an example, a case will be examined below wherein the vibration reduction lens average position LRY0 in the yawing direction is offset by −0.2 [mm] from the center of the movement range, in the yawing direction, of the vibration reduction lens 2, as indicated by the dotted line in FIG. 7, due to the weight of the movable member of the vibration reduction lens 2 and the offset elastic forces, and the vibration reduction lens position LRY0 in the yawing direction is calculated to be −0.2 [mm]. At this time, when an attempt is made to control to move the vibration reduction lens to the central position (corresponding to the vibration reduction lens target position LCY=0) of the movement range, the open control term VoY calculated by formula 24 is zero, and if the control is made using only this term, the vibration reduction lens position does not move from the position of −0.2 [mm], as a matter of course. If feedback control is made in such state, the feedback amount increases, and hence, the control errors become large. In contrast to this, the open control term VoY calculated by formula 42 is +0.2 [V]. Therefore, under the stationary condition after an elapse of a sufficiently long period of time, the vibration reduction lens 2 is located near the target position, the feedback amount can be reduced, and hence, the control errors can become small. As described above, when formula 42 is used, the influence of the offset vibration reduction lens position due to the weight or offset elastic forces can be minimized.

The significance of adding the new control coefficient (gain coefficient g4) to the feedback control term will be explained below. The feedback control term VfY is calculated by formula 43 below which is obtained by adding the control coefficient g4 that depends on the vibration reduction lens average position LRY0 in the yawing direction to formula 30:

$$VfY=g4\times(VdY+VpiY) \qquad \text{formula 43}$$

Note that the coefficient g4 is calculated using a function that depends on the vibration reduction lens average position LRY0 in the yawing direction in formula 44 below, and is calculated, for example, as a function that depends on the absolute value of the ratio between the movement range (2 mm) in the yawing direction and the offset of the position LRY0 as in formula 45 below:

$$g4=f(LRY0) \qquad \text{formula 44}$$

$$g4=kg4\times(1+|LRY0/2.0\text{ mm}|) \qquad \text{formula 45}$$

where kg4 is a positive value, and is set to, e.g., kg4 =1.0. These formulas 43, 44, and 45 are used for increasing the feedback amount and improving control followability when the offset of the vibration reduction lens 2 is large. In order to obtain a similar effect, the control coefficients g1, g2, and g3 in the control blocks in FIG. 30A may be changed depending on LRY0 without using formulas 43, 44, and 45 above. Note that the control block diagram shown in FIG. 30A is a special example of the control block diagram shown in FIG. 49. If the above-mentioned positional offset of the vibration reduction lens in the vibration reduction lens mechanism system is negligible, the vibration reduction lens control may be made using the control blocks shown in FIG. 49 while setting LRY0=0 and g4=1.0. The calculation timings of these formulas 44 and 45 will be explained later.

Figure 50:
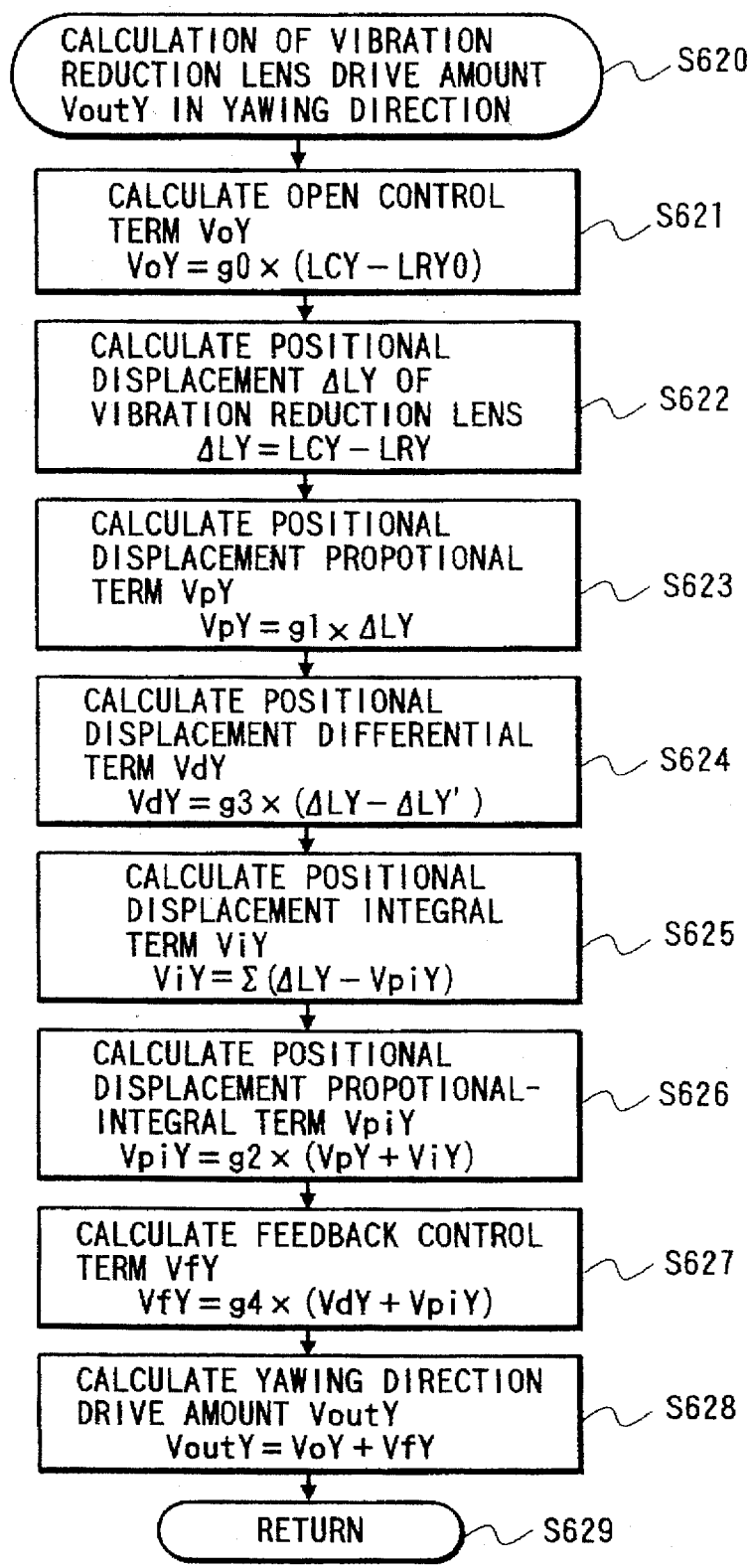
FIG. 50 is a flow chart showing the calculation of the vibration reduction lens drive amount according to the embodiment shown in FIG. 1.

An embodiment of the method of calculating the vibration reduction lens drive amount VoutY in the yawing direction on the basis of the control block diagram shown in FIG. 49 will be explained below with reference to the flow chart in FIG. 50. The process shown in FIG. 50 is another embodiment of the process for calculating the vibration reduction lens drive amount VoutY in the yawing direction shown in FIG. 31, and is executed in step S403 in FIG. 27. This processes starts from step S620. In step S621, the open control term VoY is calculated depending on the vibration reduction lens average position LRY0 that means the positional offset of the vibration reduction lens 2 associated with the yawing direction using formula 42 above. Subsequently, in step S622, the vibration reduction lens positional displacement ΔLY is calculated using formula 25 above. Upon completion of the process in step S622, the positional displacement proportional term VpY is calculated using formula 26 above in step S623. In step S624, the positional displacement differential term VdY is calculated using formula 27 above. Note that ΔLY' is ΔLY obtained by the previous sampling operation, formula 27 corresponds to a portion where the differential value of ΔLY is multiplied with a coefficient g3 of proportionality in FIG. 49, and the differential value of ΔLY is calculated by approximation as a change amount ΔLY−ΔLY' of ΔLY from the previously sampled value. ΔLY' is obtained by holding ΔLY in the previous sampling operation, and ΔLY' upon initial sampling is set to be a predetermined value (e.g., 0) so that this value does not become unstable upon initial sampling. In step S625, the positional displacement integral term ViY is calculated using formula 28 above. Formula 28 calculates the integral portion in FIG. 49 as an accumulation by approximation, and the initial value of ViY upon initial sampling is set to be a predetermined value (e.g., 0). Also, VpiY is calculated in the next step S626. In this case, the previously sampled value is held and used. Since VpiY upon initial sampling is indefinite, formula 28 is calculated using a predetermined value (e.g., 0) as VpiY upon initial sampling. Subsequently, in step S626, the positional displacement proportional-integral term VpiY is calculated using formula 29 above. In step S627, the feedback control term VfY is calculated by formula 43 above using VdY and VpiY calculated in steps S624 and S626, and g4 calculated depending on the vibration reduction lens average position LRY0 in the yawing direction, which means the positional offset, in the yawing direction, of the vibration reduction lens 2. In step S628, the final yawing direction vibration reduction lens drive amount VoutY is calculated by formula 31 above using VoY and VfY calculated in steps S621 and S627. In step S629, the process for calculating the vibration reduction lens drive amount VoutY ends, and the flow advances to step S404 in FIG. 27. Note that the terms VoY, VpY, ViY, VpiY, VdY, VfY, and the like used in the description of FIG. 50 are described using the same terms used in the control block diagram in FIG. 49.

The switching process between the open and closed control modes of the vibration reduction lens drive control as a countermeasure against electrical noise of the vibration reduction lens position detection mechanisms 5Y and 5P under exposure may be similarly controlled even when the vibration reduction lens control in the yawing direction is attained by the flow chart shown in FIG. 50 that replaces the process shown in the flow chart shown in FIG. 31. That is, the process for changing the vibration reduction control mode to the open or closed control mode in the exposure control shown in FIGS. 34, 35, 36, 37, and 39 can be similarly attained by changing the control coefficients g1, g2, and g3 to 0 or their regular values.

An embodiment associated with the execution timings of the above-mentioned various adjustment operations, vibration reduction control, and control such as tilt detection of the camera will be described below. The MPU 1 performs camera control operations other than the vibration reduction control as in a camera without any vibration reduction function, and also performs a series of operations associated with the vibration reduction control. Such operations will be explained below with reference to FIGS. 51, 52, 53, 54, and 55.

Figure 51:
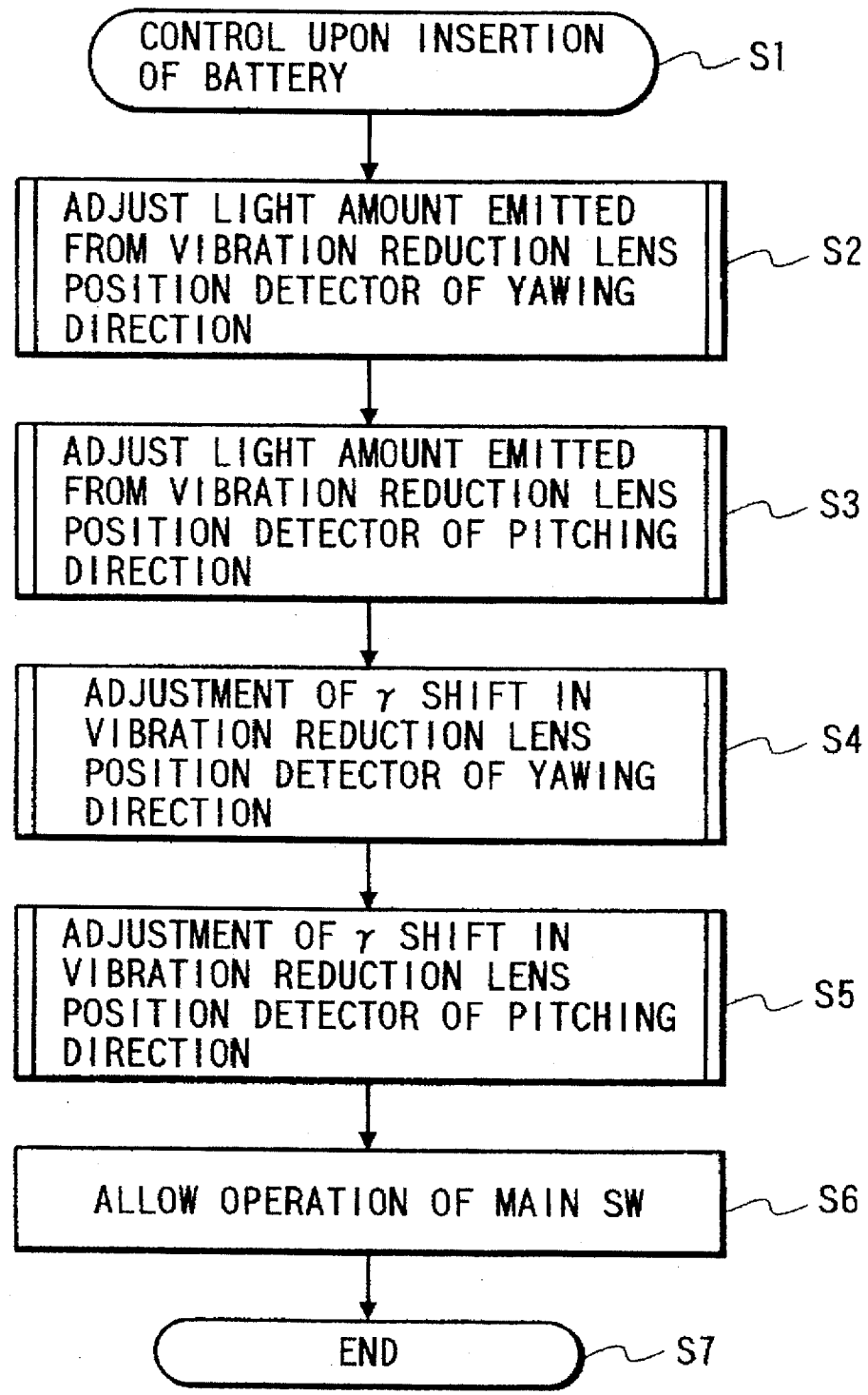
FIG. 51 is a flow chart showing the control upon insertion of a battery according to the embodiment shown in FIG. 1.
Figure 52:
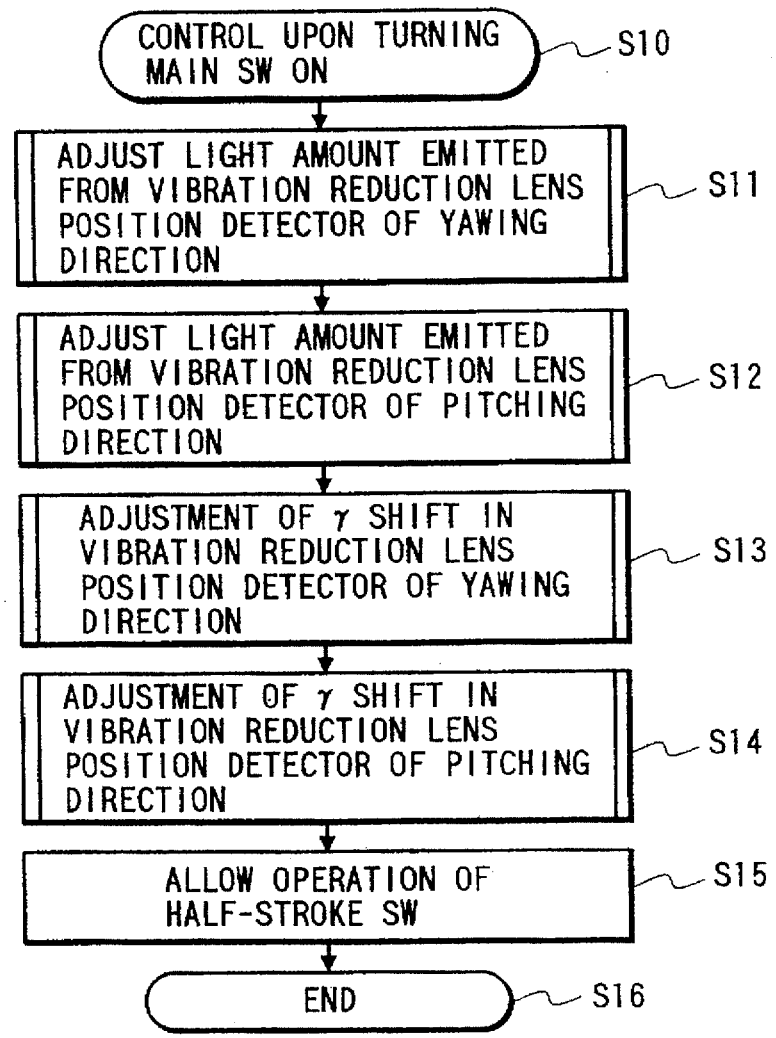
FIG. 52 is a flow chart showing the control upon turning on a main switch according to the embodiment shown in FIG. 1.
Figure 53:
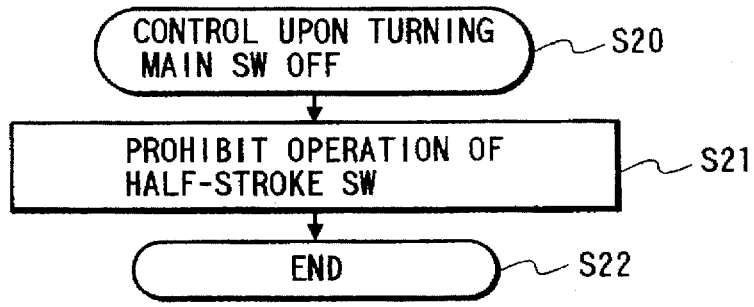
FIG. 53 is a flow chart showing the control upon turning off the main switch according to the embodiment shown in FIG. 1.

When the user inserts a battery (not shown) in the camera, the battery supplies a power supply voltage for the entire electrical circuit of the camera. FIG. 51 is a flow chart showing the process to be initially executed by the MPU 1 when the user inserts the battery in the camera. The process of the control upon insertion of the battery shown in FIG. 51 starts from step S1. In step S2, the light-emission amount of the vibration reduction lens position detection mechanism in the yawing direction is adjusted using the flow charts shown in, e.g., FIGS. 14, 15A and 15B. In step S3, the light-emission amount of the vibration reduction lens position detection mechanism in the pitching direction is adjusted by the same method as in the flow charts shown in, e.g., FIGS. 14, 15A and 15B. In step S4, the $\gamma$ and shift adjustment operations of the vibration reduction lens position detection mechanism in the yawing direction are attained using the flow chart shown in, e.g., FIG. 26. In step S5, the $\gamma$ and shift adjustment operations of the vibration reduction lens position detection mechanism in the pitching direction are attained by the same method as in the flow chart shown in, e.g., FIG. 26. In step S6, the operation of the main switch MSW is allowed. With the process in step S6, the control upon turning on the main switch MSW shown in FIG. 52 and the control upon turning off the main switch MSW shown in FIG. 53 are allowed, as will be described later. Upon completion of the process in step S6, the process of the control upon insertion of the battery ends in step S7.

Figure 54:
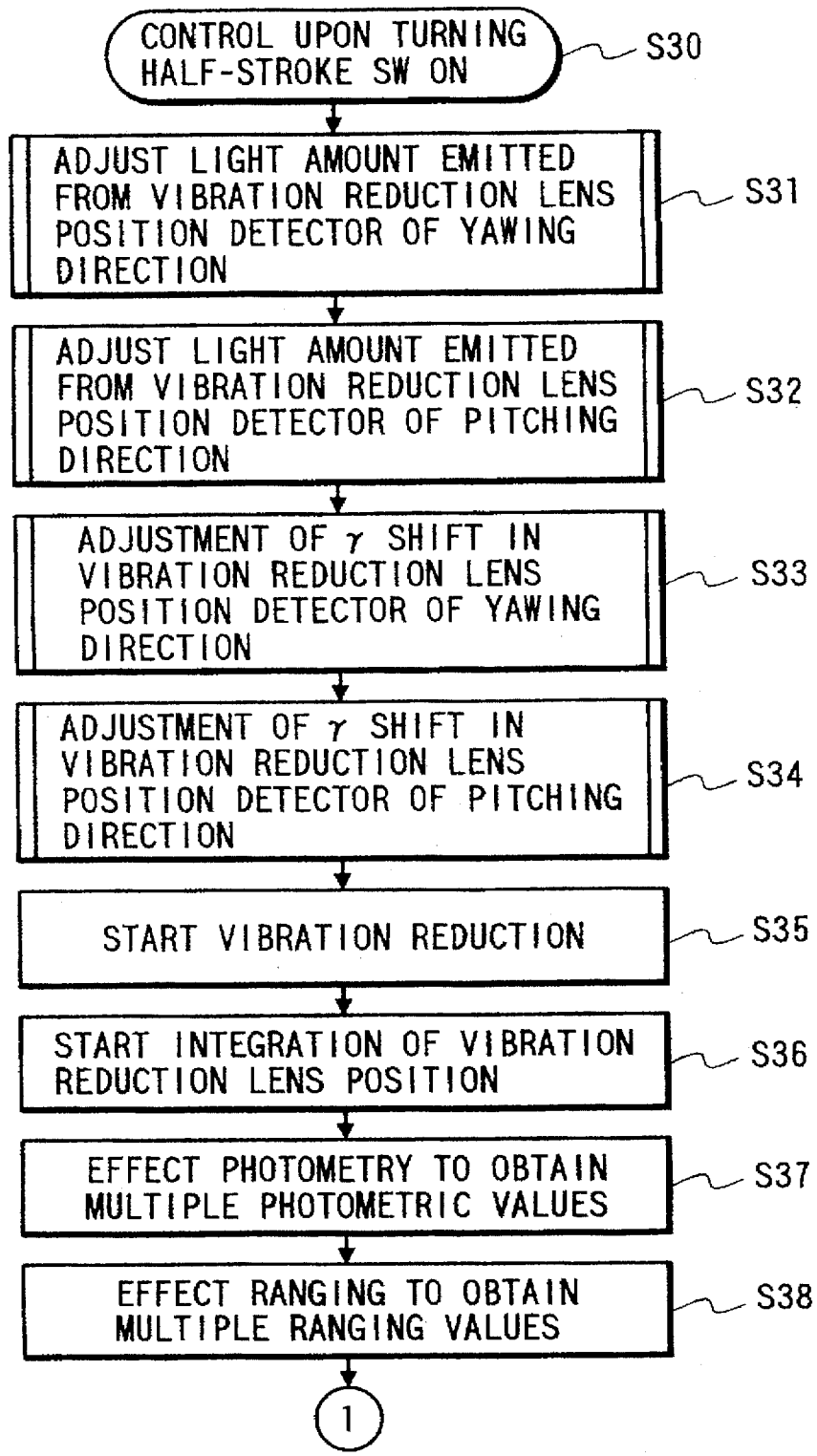
FIG. 54 is a flow chart showing the control upon turning on a half-stroke switch according to the embodiment shown in FIG. 1.
Figure 55:
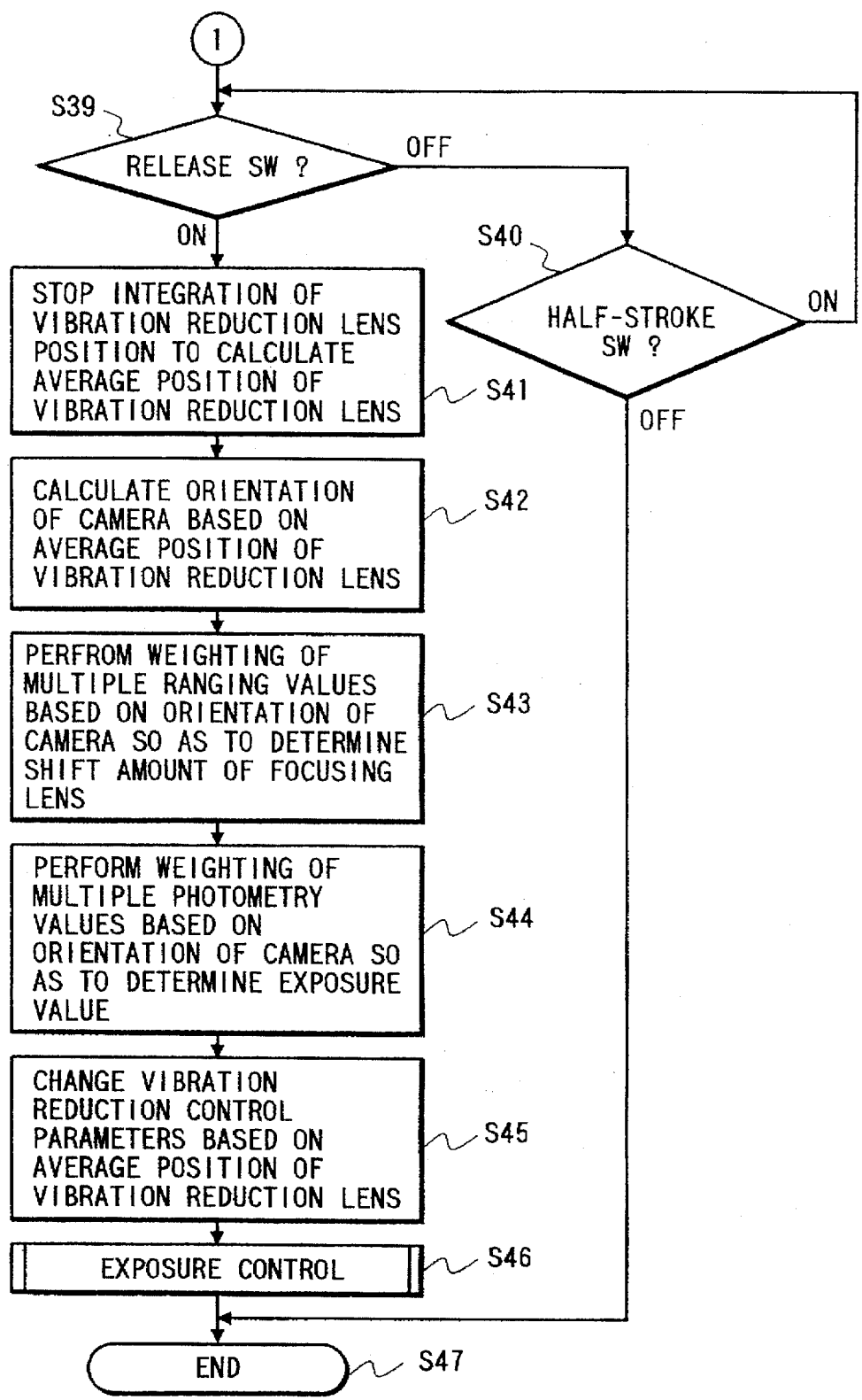
FIG. 55 is a flow chart showing the control upon turning on the half-stroke switch according to the embodiment shown in FIG. 1.
Figure 56:
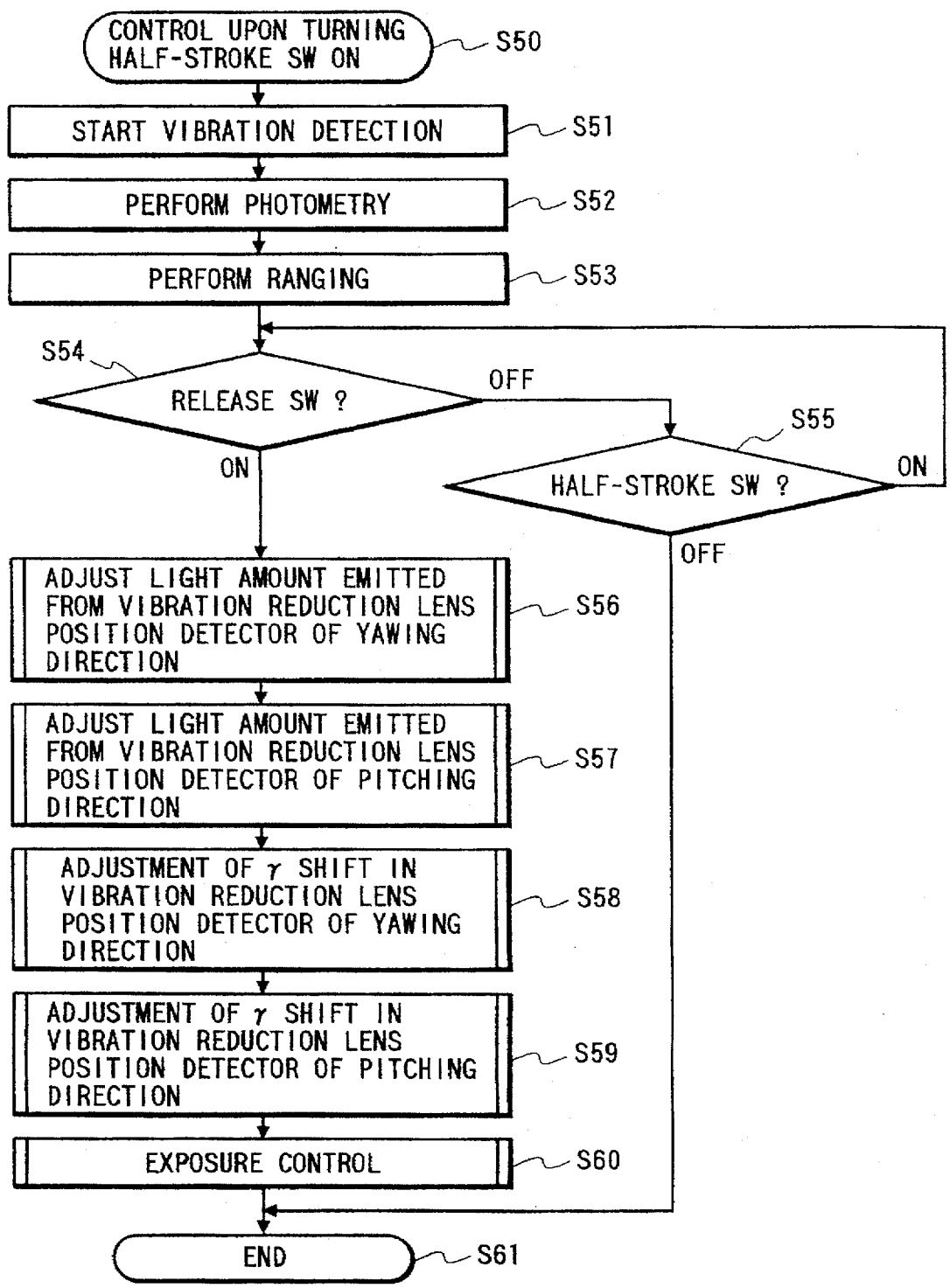
FIG. 56 is a flow chart showing the control upon turning on the half-stroke switch according to the embodiment shown in FIG. 1.
Figure 59:
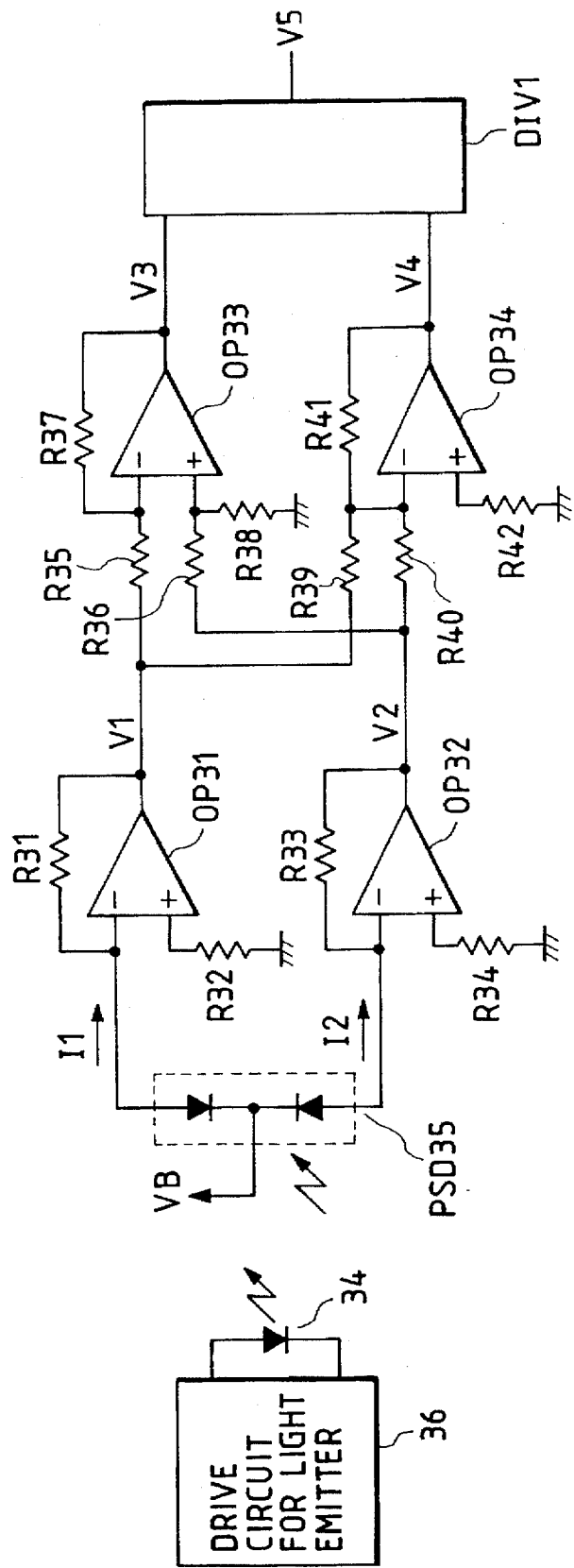
FIG. 59 is a circuit diagram of a detection unit in a conventional vibration reduction lens position detection circuit.

When the user turns on the main switch MSW of the camera, the MPU 1 performs the following process. FIG. 52 is a flow chart showing the process to be executed by the MPU 1 when the user turns on the main switch MSW of the camera. The process of the control upon turning on the main switch MSW in FIG. 52 starts from step S10. In step S11, the light-emission amount of the vibration reduction lens position detection mechanism in the yawing direction is adjusted using the flow charts shown in, e.g., FIGS. 14, 15A and 15B. In step S12, the light-emission amount of the vibration reduction lens position detection mechanism in the pitching direction is adjusted by the same method as in the flow charts shown in, e.g., FIGS. 14, 15A and 15B. In step S13, the $\gamma$ and shift adjustment operations of the vibration reduction lens position detection mechanism in the yawing direction are attained using the flow chart shown in, e.g., FIG. 26. In step S14, the $\gamma$ and shift adjustment operations of the vibration reduction lens position detection mechanism in the pitching direction are attained by the same method as in the flow chart shown in, e.g., FIG. 26. In step S15, the operation of the half-stroke switch SW1 is allowed. With the process in step S15, the process of the control upon turning on the half-stroke switch SW1 shown in FIGS. 54 and 55 or FIG. 56 is allowed. Upon completion of the process in step S15, the process of the control upon turning on the main switch MSW ends in step S16.

When the user turns off the main switch MSW of the camera, the MPU 1 performs the following process. FIG. 53 is a flow chart showing the process to be executed by the MPU 1 when the user turns off the main switch MSW of the camera. The process of the control upon turning off the main switch MSW shown in FIG. 52 starts from step S20. In step S21, the operation of the half-stroke switch SW1 is prohibited. With the process in step S21, the process of the control upon turning on the half-stroke switch SW1 shown in FIGS. 54 and 55 or FIG. 56 is prohibited. Upon completion of the process in step S21, the process of the control upon turning off the main switch MSW ends in step S22.

As described above, according to this embodiment, with the processes of the control upon turning on the main switch MSW shown in FIG. 52 and the control upon turning off the main switch MSW shown in FIG. 53, an image taking operation performed under the control upon turning on the half-stroke switch SW1 shown in FIGS. 54 and 55 or FIG. 56 is allowed while the main switch MSW is ON, and the image taking operation is prohibited while the main switch MSW is OFF.

When the user turns on the half-stroke switch SW1 while the main switch MSW is ON, the MPU 1 performs the following process. FIGS. 54 and 55 are flow charts showing the process to be executed by the MPU 1 when the user turns on the half-stroke switch SW1 while the main switch MSW is ON. The process of the control upon turning on the half-stroke switch SW1 shown in FIGS. 54 and 55 starts from step S30. In step S31, the light-emission amount of the vibration reduction lens position detection mechanism in the yawing direction is adjusted using the flow charts shown in, FIGS. 14, 15A and 15B. In step S32, the light-emission amount of the vibration reduction lens position detection mechanism in the pitching direction is adjusted by the same method as in the flow charts shown in, e.g., FIGS. 14, 15A and 15B. In step S33, the $\gamma$ and shift adjustment operations of the vibration reduction lens position detection mechanism in the yawing direction are attained using the flow chart shown in, e.g., FIG. 26. In step S34, the $\gamma$ and shift adjustment operations of the vibration reduction lens position detection mechanism in the pitching direction are attained by the same method as in the flow chart shown in, e.g., FIG. 26. In step S35, the vibration detection mechanisms 4Y and 4P in the yawing and pitching directions are operated to start vibration detection. In step S36, the vibration reduction lens position integration process in the yawing direction shown in FIG. 43, and the vibration reduction lens position integration process in the pitching direction realized by the same method as that in the yawing direction are allowed to start integration of the vibration reduction lens positions. Upon completion of the process in step S36, the photometry mechanism 22 is operated in step S37 to obtain photometry values of a plurality of regions within the image taking frame. Subsequently, the ranging mechanism 21 is operated in step S38 to obtain ranging values of a plurality of regions within the image taking frame. It is checked in step S39 if the release switch SW2, which is turned on upon pressing the release button to its full-stroke position by the user, is turned on. If YES in step S39, the flow advances to step S41; otherwise, it is checked in step S40 if the half-stroke switch SW1, which is turned on upon pressing the release button to its half-stroke position by the user, is still ON. If it is determined in step S40 that the half-stroke switch SW1 is still ON, the flow returns to step S39; if it is determined in step S40 that the half-stroke switch SW1 is already OFF, the flow advances to step S47 to end the process of the control upon turning on the half-stroke switch SW1. On the other hand, if it is determined in step S39 that the release switch SW2 is ON, the vibration reduction lens position integration process shown in FIG. 43 ends, and the vibration reduction lens average position LR0=(LRY0, LRP0) is calculated by the above-mentioned method using the integrated value and the number of integrations of the vibration reduction lens positions in the yawing direction, and the integrated value and the number of integrations of the vibration reduction lens positions in the pitching direction at that time in step S41. In step S42, θg and |θh| indicating the orientation and tilt of the camera are calculated by the above-mentioned method on the basis of the vibration reduction lens average position LR0=(LRY0, LRP0) calculated in step S41. In step S43, the final ranging value is calculated, by the above-mentioned method, depending on θg and |θh| from the plurality of ranging values obtained in step S38, thus determining the focusing amount by a known method. Although not shown since such mechanism is not closely related to the present invention, for example, an auto-focus camera often performs a focusing operation for adjusting the focusing state on the film surface by moving the entire image taking lens or some lens components of the image taking lens in the optical axis direction on the basis of the obtained focusing amount. Upon completion of the process in step S43, one of the plurality of photometry values obtained in step S37 is determined depending on θg and |θh| using the above-mentioned method, and the shutter time, the aperture value of the image taking lens, and the like, that can provide a proper exposure amount, are calculated by the known method, in step S44. Upon completion of the process in step S44, the control coefficient g4 in the vibration reduction control is calculated using formulas 44 and 45 above, or other control coefficients are determined depending on the above-mentioned vibration reduction lens position LR0=(LRY0, LRP0) in step S45. In step S46, the process of the exposure control shown in FIGS. 34 and 35, FIGS. 36 and 37, or FIG. 39 is executed, and the vibration reduction control under exposure is attained by the process shown in FIGS. 27, 28, 29, and 31 or FIG. 50. Upon completion of the process in step S46, the process of the control upon turning on the half-stroke switch SW1 ends in step S47.

Another embodiment of the control upon turning on the half-stroke switch SW1 to be executed by the MPU 1 when the user turns on the half-stroke switch SW1 while the main switch MSW is ON will be explained below. FIG. 56 is a flow chart showing only a portion associated with the present invention in the process to be executed by the MPU 1 when the user turns on the half-stroke switch SW1 while the main switch MSW is ON, and shows another embodiment of the control upon turning on the half-stroke switch SW1 shown in FIGS. 54 and 55. Note that since the calculation process of the vibration reduction lens average position, the process of calculating one ranging value and one photometry value from multiple ranging values and multiple photometry values using the calculated average position, the process of changing parameters in the vibration reduction control, and the like are shown in FIGS. 54 and 55, and a detailed description thereof will be omitted.

The process of the control upon turning on the half-stroke switch SW1 shown in FIG. 56 starts from step S50. In step S51, the vibration detection mechanisms 4Y and 4P in the yawing and pitching directions are operated to start vibration detection. In step S52, the photometry mechanism 22 is operated to obtain object luminance information. In this case, the photometry mechanism 22 need not always comprise a multiple type photometry mechanism. In step S53, the ranging mechanism 21 is operated to obtain the ranging value information of the object. In this case, the ranging mechanism 21 need not always comprise a multiple type ranging mechanism. Subsequently, it is checked in step S54 if the release switch SW2 which is turned on by pressing the release button to its full-stroke position by the user is turned on. If YES in step S54, the flow advances to step S56; otherwise, it is checked in step S55 if the half-stroke switch SW1 which is turned by pressing the release button to its half-stroke position by the user is still ON. If it is determined in step S55 that the half-stroke switch SW1 is still ON, the flow returns to step S54; if it is determined in step S55 that the half-stroke switch SW1 is already OFF, the flow advances to step S61, thus ending the process of the control upon turning on the half-stroke switch SW1. If it is determined in step S54 that the release switch SW2 is ON, the light-emission amount of the vibration reduction lens position detection mechanism in the yawing direction is adjusted using the flow charts shown in, FIGS. 14, 15A and 15B, in step S56. In step S57, the light-emission amount of the vibration reduction lens position detection mechanism in the pitching direction is adjusted by the same method as in the flow charts shown in, e.g., FIGS. 14, 15A and 15B. In step S58, the γ and shift adjustment operations of the vibration reduction lens position detection mechanism in the yawing direction are attained using the flow chart shown in, e.g., FIG. 26. In step S59, the γ and shift adjustment operations of the vibration reduction lens position detection mechanism in the pitching direction are attained by the same method as in the flow chart shown in, e.g., FIG. 26.

In step S60, the process of the exposure control shown in FIGS. 34 and 35, FIGS. 36 and 37, or FIG. 39 is executed, and the vibration reduction control under exposure is attained by the process shown in FIGS. 27, 28, 29, and 31. Upon completion of the process in step S60, the process of the control upon turning on the half-stroke switch SW1 ends.

Since the adjustment of the light-emission amounts of the light-emission units of the vibration reduction lens position detection mechanisms 5Y and 5P in the yawing and pitching directions, the calculations of the values of the output errors Vd1 and Vd2, and the γ and shift adjustments are automatically performed by the camera itself at a timing corresponding to each of the user's operations and camera operations, i.e., when the user inserts a battery, when the user turns on the main switch MSW, when the half-stroke switch SW1 is turned on upon pressing the release button by the user to perform an image taking operation, when the release switch SW2 is turned on upon pressing the release button to its full-stroke position, or immediately before exposure control, a sufficiently broad dynamic range is assured for the outputs from the vibration reduction lens position detection mechanisms 5Y and 5P without requiring any adjustment using adjustment devices upon delivery of the camera, and sufficiently high vibration reduction lens position detection precision can be assured, thus realizing high-precision vibration reduction control.

When these adjustment operations are performed at the timing upon turning on the half-stroke switch SW1 immediately before an image taking operation, if the time from the half-stroke pressing operation until the full-stroke pressing operation of the release button is not so long, the vibration reduction lens position can be detected with high precision free from the influence of a change in light-emission amount due to a change in temperature, changes in values of the output errors Vd1 and Vd2, and changes in γ and shift adjustment values, thus allowing high-precision vibration reduction control. Furthermore, when these adjustment operations are performed at the timing upon tuning on the full-stroke switch SW1 or the timing immediately before the exposure control, as shown in FIG. 56, since an image taking operation can be performed under the vibration reduction control at a timing immediately after these adjustment operations, the vibration reduction lens position can be detected with high precision free from the influence of a change in light-emission amount due to a change in temperature, changes in values of the output errors Vd1 and Vd2, and changes in γ and shift adjustment values, thus allowing high-precision vibration reduction control.

When each of the vibration reduction lens position detection mechanisms 5Y and 5P is constituted by only a current-voltage conversion unit, and an addition/subtraction calculation unit and a division unit are realized by a program in the MPU 1, the circuit arrangement of each of the vibration reduction lens position detection mechanisms 5Y and 5P can be simplified, and the cost of the entire camera can be further reduced.

Furthermore, in the conventional vibration reduction control using the elastically supported vibration reduction lens 2, a vibration reduction lens target position used for appropriately attaining vibration reduction is calculated on the basis of vibration information output from a vibration detection circuit, and the control is attained by a servo circuit mainly using an analog hardware arrangement on the basis of the vibration reduction lens target position and the actual vibration reduction lens position. However, since the present invention realizes the vibration reduction control in a digital manner using a one-chip microcomputer such as the MPU 1, the control parameters used in the vibration reduction control can be very easily changed. For example, the present invention can quickly cope with, e.g., a change in transfer characteristics of an object to be controlled due to a change in design of the vibration reduction lens mechanism, and is free from the influence of variations and temperature drifts of various control gains and frequency characteristics, aging, or the like, that may pose a serious problem in the arrangement using an analog circuit. Therefore, excellent vibration reduction control can be realized. Note that a one-chip microcomputer such as the MPU 1 used in the above embodiment for performing the above-mentioned control operations is required to have sufficient high-speed calculation performance, and may result in an increase in cost of the camera. However, in recent years, the prices of such one-chip microcomputers have been reducing, and it is expected that the use of the one-chip microcomputer will lead to a cost reduction of the entire camera in a near future.

In order to eliminate the influence of electrical noise on the position detection of the vibration reduction lens due to shutter control and flash emission under exposure, the vibration reduction control is attained by open control at the timings of flash emission and shutter control. Consequently, vibration reduction is performed without using any vibration reduction lens position information mixed with electrical noise, thus improving vibration reduction precision as a whole.

The evil influence of the support structure of the vibration reduction lens 2, i.e., its elastic support structure, for example, the adverse influence on vibration reduction control of the influence of gravity on the vibration reduction lens, the influence of offset elastic forces, and the like, is eliminated by detecting the vibration reduction lens average position and feeding it back to the control of the vibration reduction lens 2, thus allowing high-precision vibration reduction control. By utilizing this evil influence, the orientation of the camera is calculated from the vibration reduction lens average position without adding any special circuits such as a vertical/horizontal position sensor that requires extra cost, and the calculation algorithm of multiple ranging values or multiple photometry values is changed depending on the calculated orientation of the camera, thereby realizing high-precision ranging and photometry operations.

Still another embodiment of the present invention will be described with reference to FIGS. 60, 61A, 61B, 62A, 62B and 62C. The same parts and steps having the same functions as in the prior arts described in "Related Background Art" denote the same reference symbols and numerals, and a detailed description thereof will be omitted.

FIG. 60 is a flow chart showing the operation of a CPU in a camera having a vibration reduction device according to the present invention.

After position detection unit calibration processing is performed in step S702 in FIG. 60, it is determined in calibration step S716 whether calibration processing is normally ended. If NO in step S716, the flow advances to step S717 to end processing. When calibration processing is normally ended, the flow advances to step S703. Any other portion of FIG. 60 is the same as in the flow in FIG. 70.

Figure 61A:
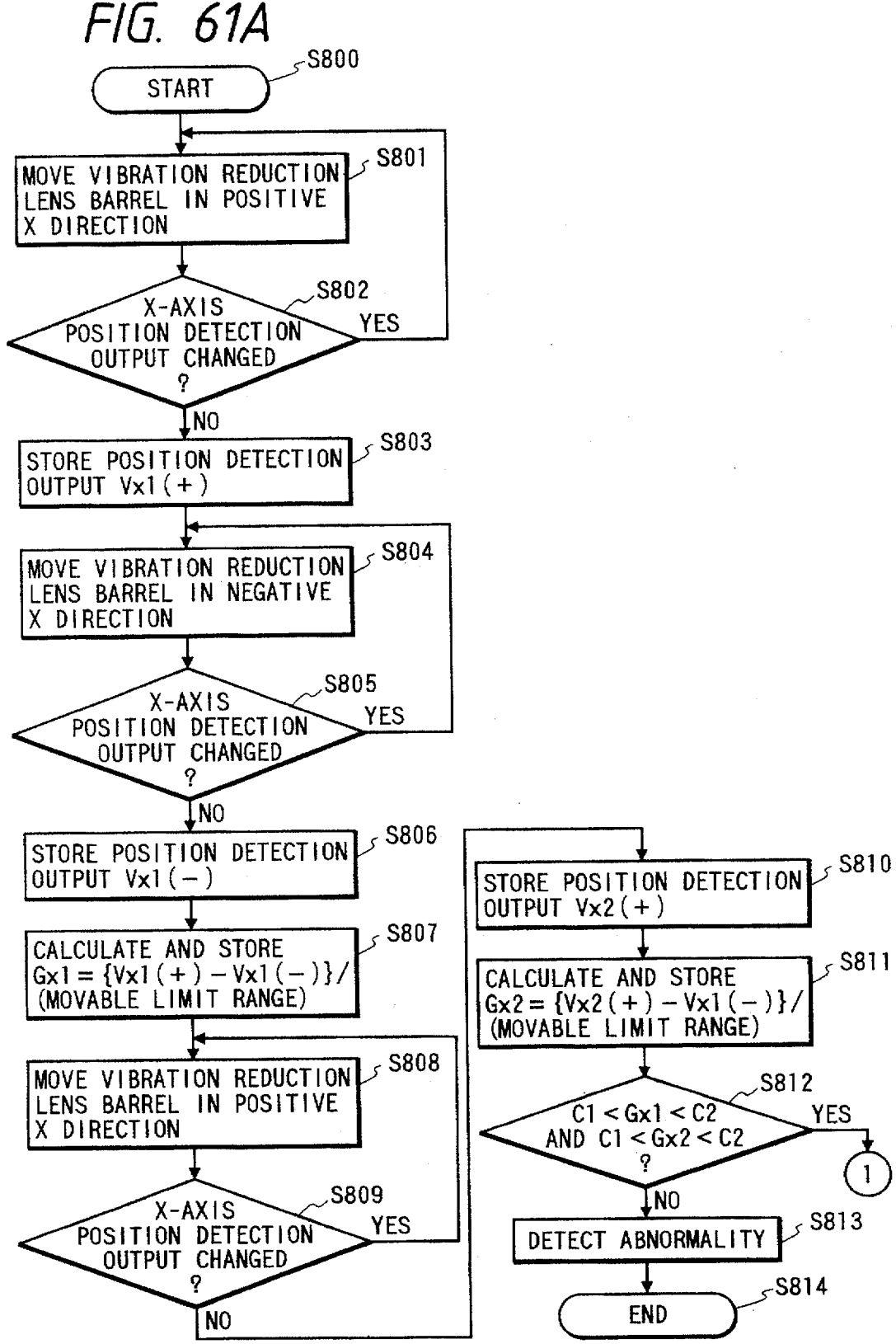
FIGS. 61A and 61B are flow charts showing a method of calibrating the position of a vibration reduction lens of the camera shown in FIG. 60 and outputs from a PSD.
Figure 61B:
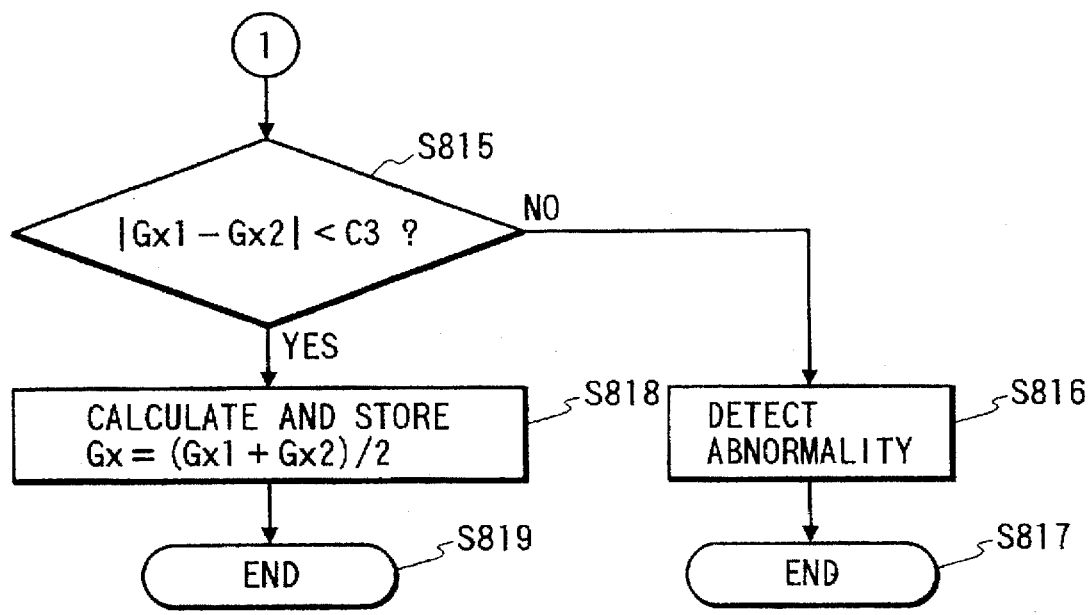

FIGS. 61A and 61B are flow charts showing a method of calibrating the position of the vibration reduction lens and outputs from e PSD according to this embodiment.

Figure 62A:
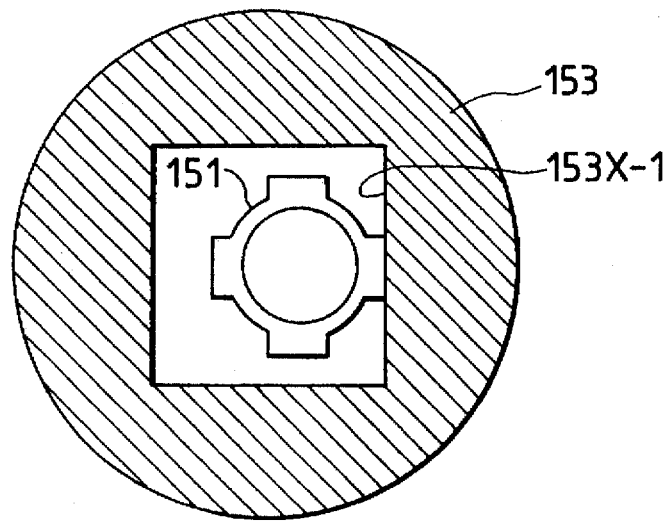
FIGS. 62A, 62B and 62C are views showing the movements of the vibration reduction lens in calibrating the vibration reduction device.
Figure 62B:
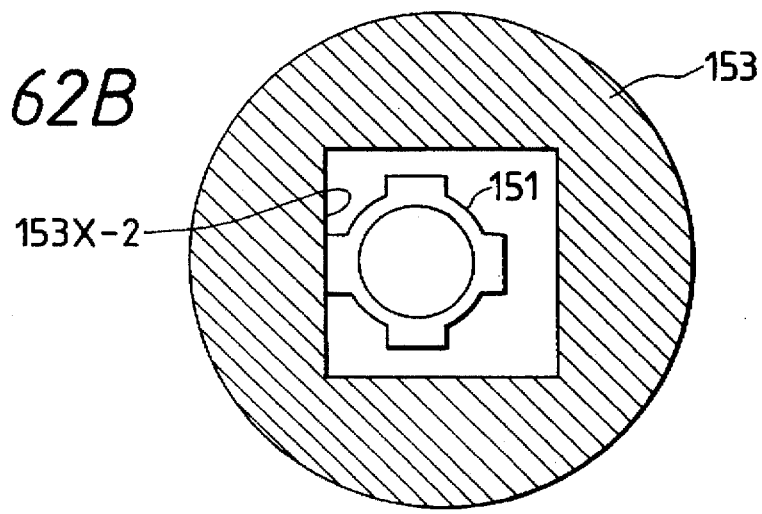
Figure 62C:
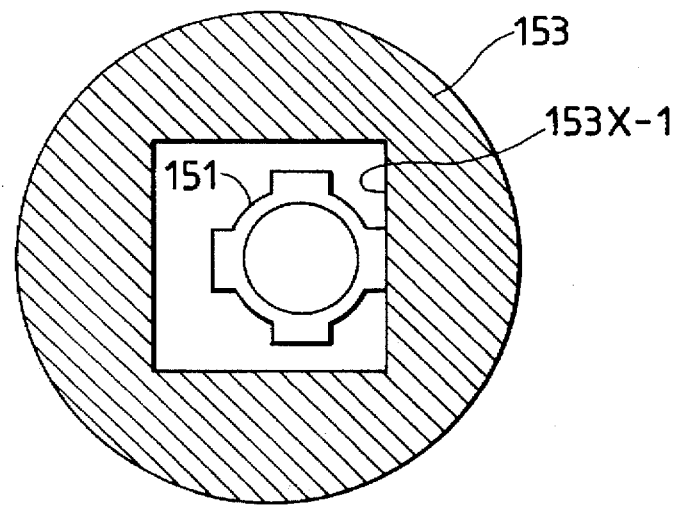
Figure 63:
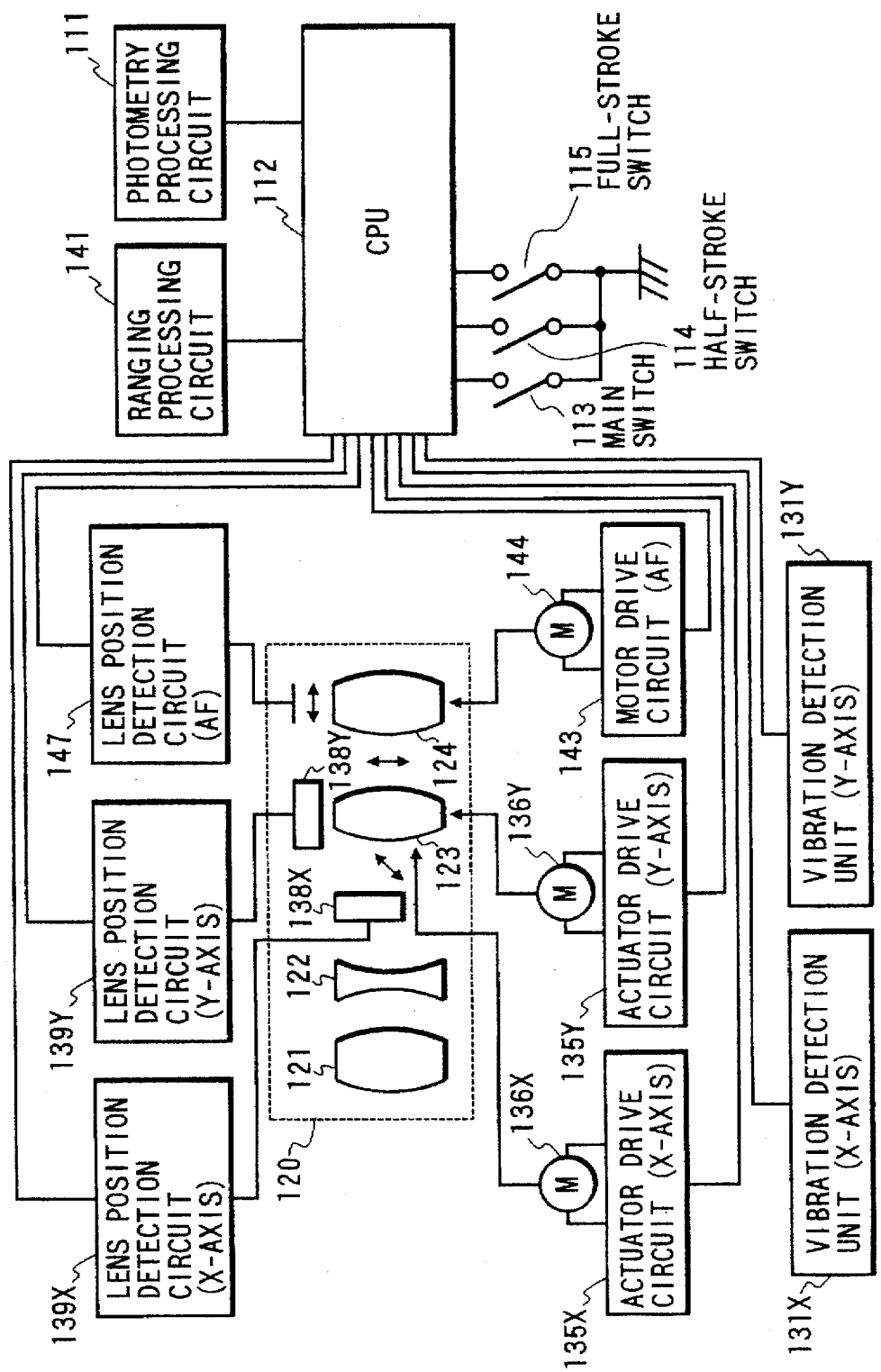
FIG. 63 is a block diagram showing an arrangement of a camera having a vibration reduction device.
Figure 64A:
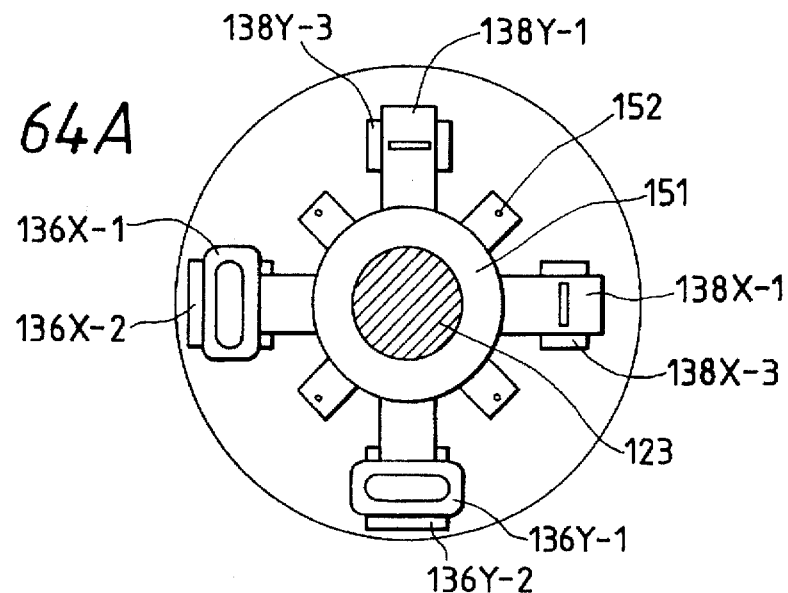
FIGS. 64A, 64B and 64C are views showing a drive unit for the vibration reduction lens in detail.
Figure 64B:
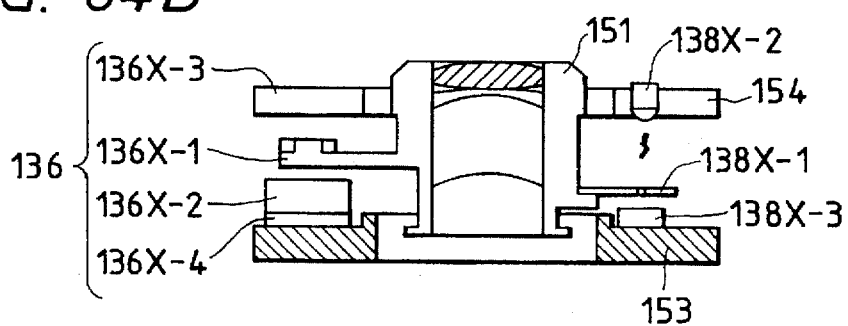
Figure 64C:
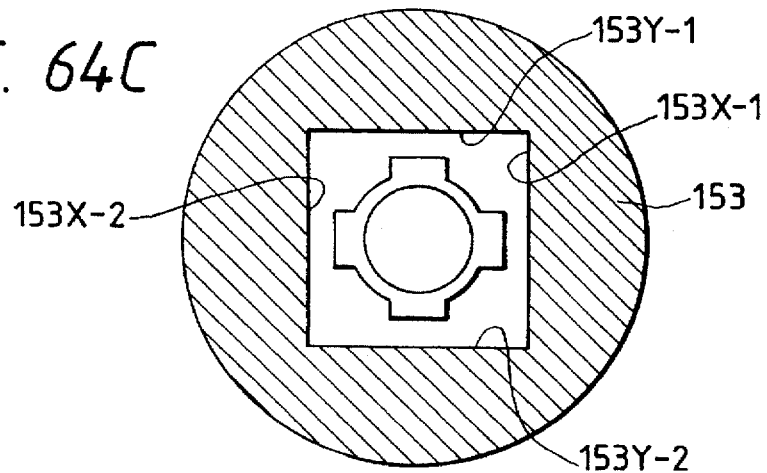
Figure 65A:
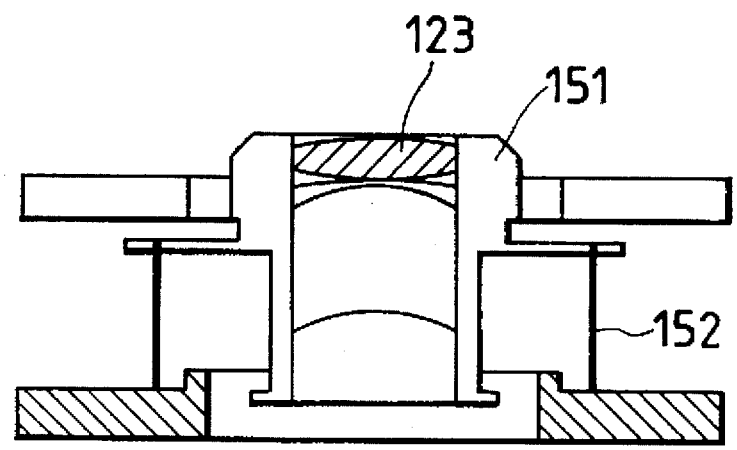
FIGS. 65A and 65B are views showing a support structure for the vibration reduction lens.
Figure 65B:
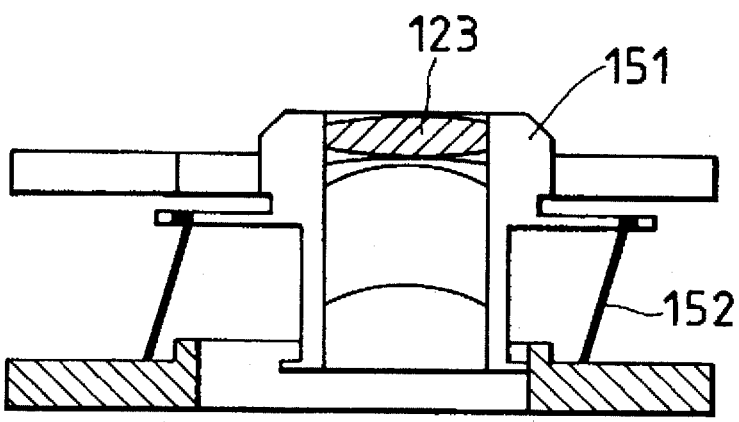
Figure 66:
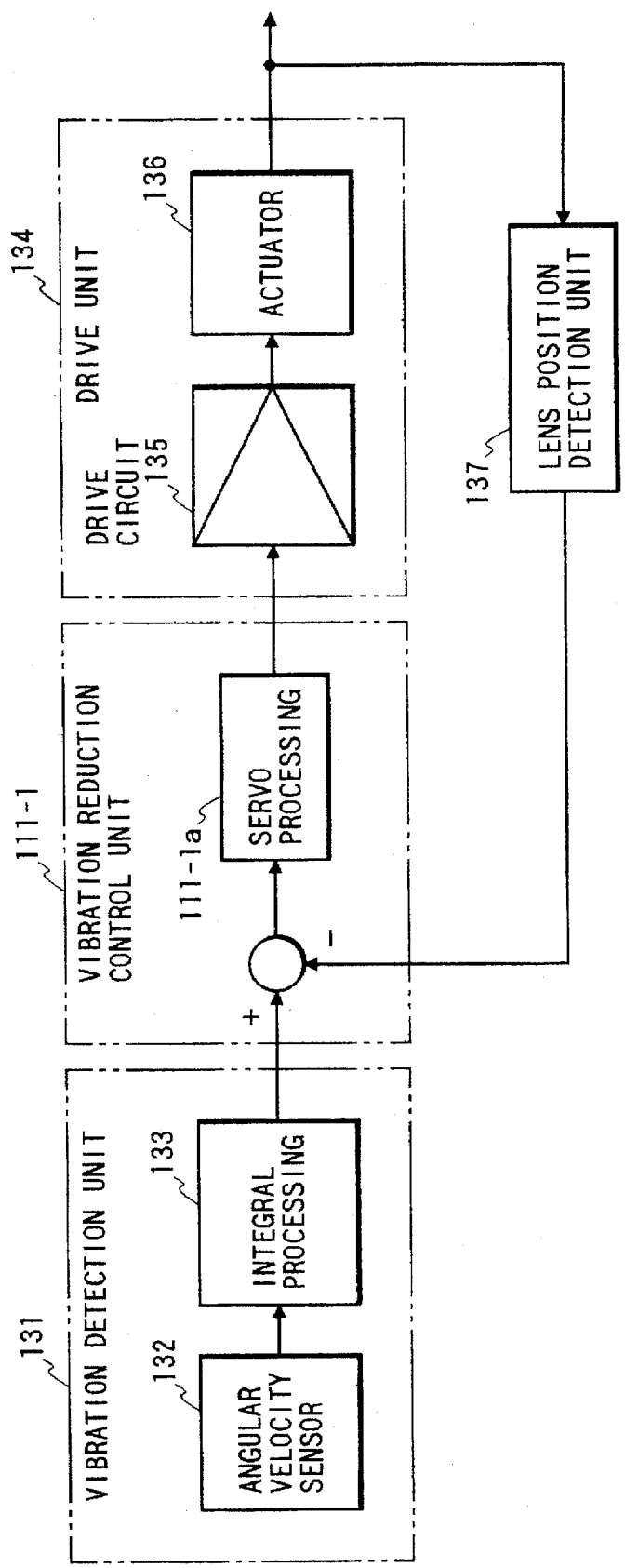
FIG. 66 is a block diagram showing the control system of the vibration reduction device.
Figure 67:
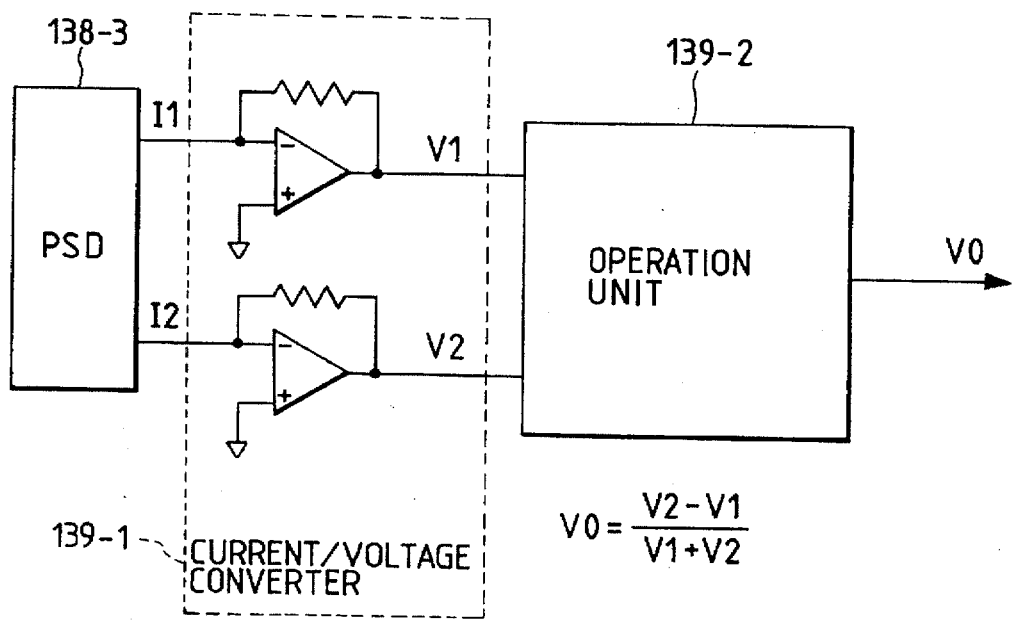
FIG. 67 is a circuit diagram showing an arrangement of an operation circuit for calculating the slit light position from current values output from the PSD.
Figure 69:
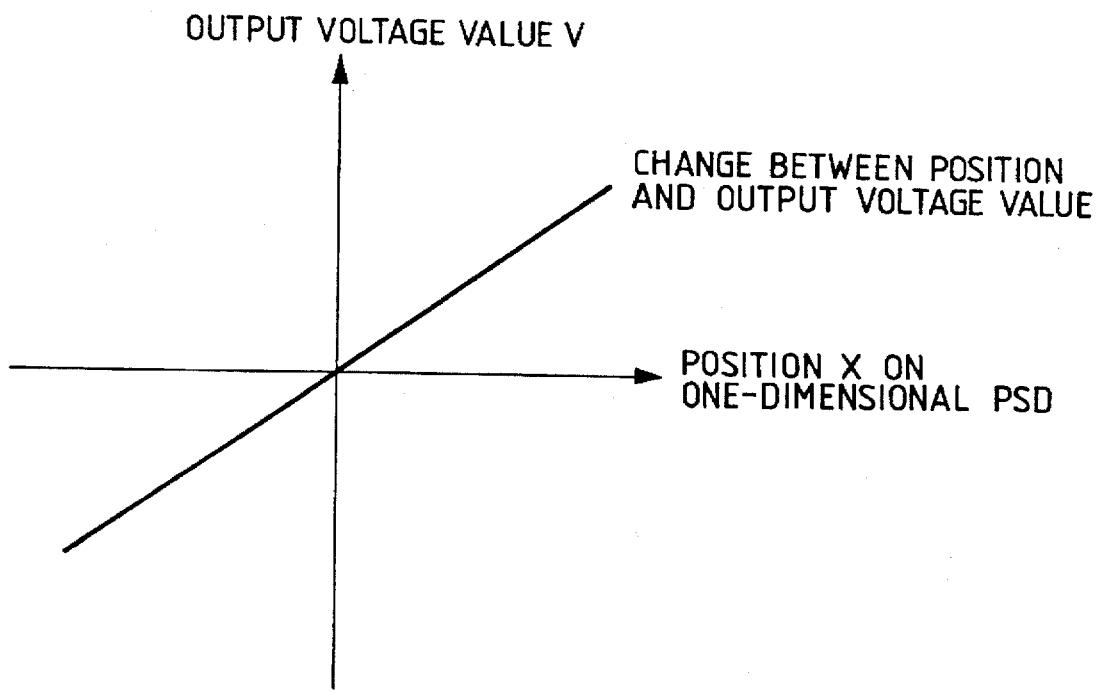
FIG. 69 is a graph showing the relationship between the slit light position on the PSD and an output voltage value.
Figure 68A:
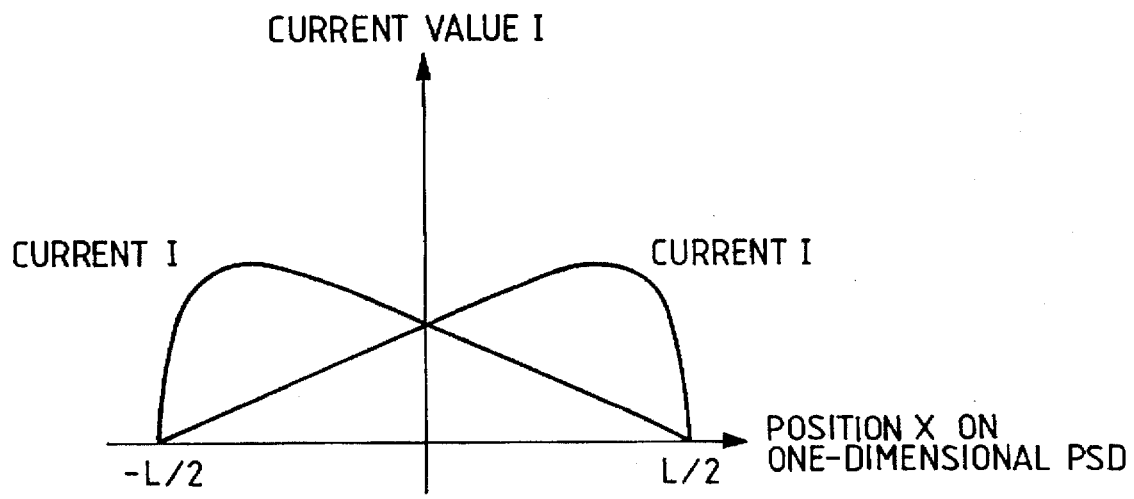
FIGS. 68A and 68B are graphs showing two current values I1 and I2 with respect to the position on a one-dimensional PSD 138-3.
Figure 68B:
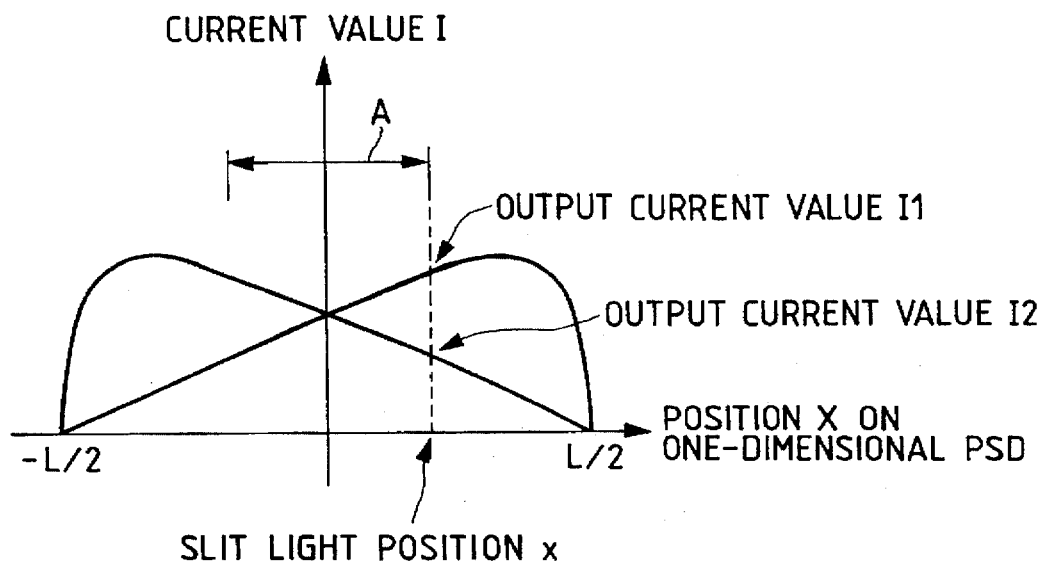
Figure 72A:
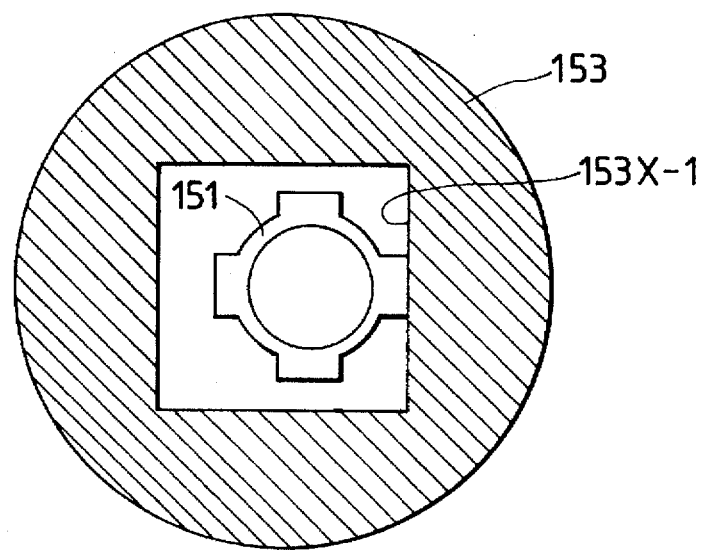
FIGS. 72A and 72B are views showing the movements of the vibration reduction lens in X-axis calibration, in which the right direction is the positive X direction and the upper direction is the positive Y direction.
Figure 72B:
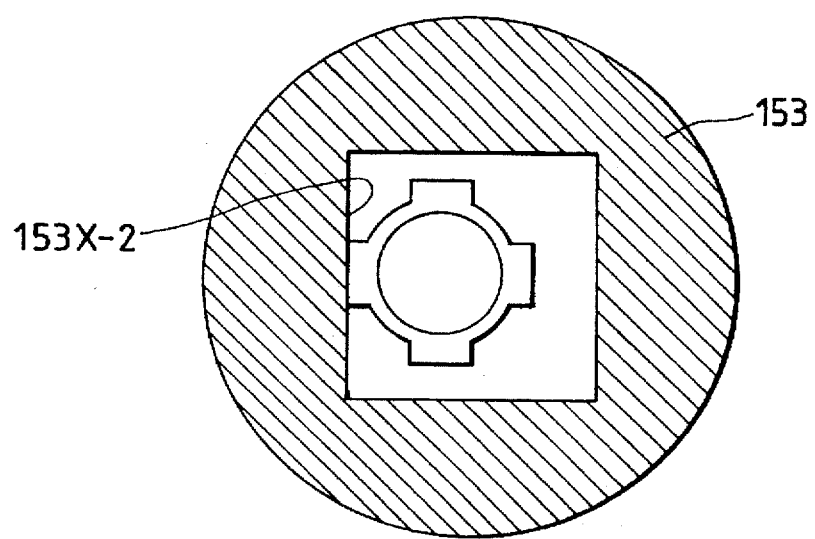

FIGS. 62A, 62B and 62C are views showing the movements of the vibration reduction lens in calibration. The right direction in FIGS. 62A, 62B and 62C is the positive X direction, and the upper direction in FIGS. 62A, 62B and 62C is the positive Y direction.

When processing is started in step S800, the vibration reduction lens barrel 151 is moved in the positive X direction, as shown in FIG. 62A (step S801). In step S802, an X-axis position detection output is detected to determine whether the X-axis position detection output is changed. If YES in step S802, the flow returns to step S801 to move the vibration reduction lens barrel 151 in the positive X direction.

If the X-axis position detection output does not change in step S802, the position of the vibration reduction lens barrel 151 is located at a movable limit member 153X-1, as shown in FIG. 62A. The flow advances to step S803. In step S803, this X-axis position detection output Vx1(+) is stored.

In step S804, the vibration reduction lens barrel 151 is moved in the negative X direction. In step S805, an X-axis position detection output is detected to determine whether the X-axis position detection output is changed. If YES in step S805, the flow returns to step S804 to move the vibration reduction lens barrel 151 in the negative X direction.

In step S805, when the X-axis position detection output does not change, the position of the vibration reduction lens barrel 151 is located at a movable limit member 153X-2, as shown in FIG. 62B. The flow then advances to step S806. In step S806, this X-axis position detection output Vx1(−) is stored.

In step S807, Gx1={Vx1(+)−Vx1(−)}/(movable limit range) is calculated and stored.

In step S808, the vibration reduction lens barrel 151 is moved in the positive X direction again. In step S809, an X-axis position detection output is detected to determine whether the X-axis position detection output is changed. If NO in step S809, the flow returns to step S808 to move the vibration reduction lens barrel 151 in the positive X direction.

In step S809, when the X-axis position detection output does not change, the position of the vibration reduction lens barrel 151 is located at the movable limit member 153X-1, as shown in FIG. 62C, and the flow advances to step S810. In step S810, this X-axis position detection output Vx2(+) is stored.

In step S811, Gx2={Vx2(+)−Vx1(−)}/(movable limit range) is calculated and stored.

The flow advances to step S812 to determine whether the calibration values Gx1 and Gx2 fall within a predetermined calibration value range of C1 to C2. If one of or both of Gx1 and Gx2 do not fall within this range, the flow advances to step S813. An abnormality is determined in step S813. The flow advances to step S814, and processing is ended.

When both the calibration values Gx1 and Gx2 fall within the predetermined calibration value range of C1 to C2 in step S812, the flow advances to step S815 in FIG. 61B.

It is determined in step S815 whether the difference between the calibration values Gx1 and Gx2 is smaller than a predetermined value C3. If the difference between the calibration values Gx1 and Gx2 is equal to or larger than the predetermined value C3, an abnormality is determined in step S816, and processing is ended in step S817.

In step S815, when the difference between the calibration values Gx1 and Gx2 is smaller than the predetermined value C3, the flow advances to step S818. In step S818, the average value of the calibration values is calculated using Gx=(Gx1+Gx2)/2 and stored. Processing is ended in step S819.

X-axis calibration processing has been described above. However, the same processing as described above is performed for Y-axis calibration.

The present invention is not limited to the particular embodiments described above, and various changes and modifications can be made and incorporated in the equivalents of the present invention.

For example, a PSD is exemplified as the sensor of the position detection unit. However, an arrangement using a photodiode, a magnetic sensor, or the like, or an arrangement using a digital sensor can equally be applied.

FIGS. 61A and 61B exemplify an operation in which the vibration reduction lens barrel is moved three times. However, the lens barrel may be moved four or more times within the allowable time.

When calibration values have a large difference, abnormalities in a drive unit such as a deformation of a support rod 152 can be detected as well as abnormalities in the position detection unit.

As has been described above, according to the device of the above embodiment, a vibration reduction optical system is moved a plurality of times within a predetermined range to allow accurate calibration and high-precision vibration reduction. Since the vibration reduction optical system is moved a plurality of times within the predetermined range, a plurality of calibration values can be obtained to allow reliable calibration and high-precision vibration reduction. If a predetermined number of calibration values of the plurality of calibration values fall outside the predetermined range, an abnormality is determined, thereby detecting the abnormalities in the position detection unit and the drive unit prior to image taking. The average value of the plurality of calibration values is defined as a calibration value to allow reliable calibration and high-precision vibration reduction. In addition, when the difference between the plurality of calibration values is larger than the predetermined value, an abnormality is determined, thereby detecting the abnormalities in the position detection unit and the drive unit prior to image taking.

What is claimed is:

1. An image vibration reduction device for reducing an image vibration on an imaging surface, comprising:
   a vibration reduction optical system movable to reduce the image vibration and constituting part of an imaging optical system;
   a vibration reduction optical system displacement detector including a light-emission unit and a light-reception unit using an optical position detection element to optically detect a change in position of said vibration reduction optical system; and
   light-emission amount automatic adjustment means for adjusting a light-emission amount of said light-emission unit at a predetermined time on the basis of an output from said light-reception unit.

2. A device according to claim 1, wherein a movable range of said vibration reduction optical system is limited, and said light-emission amount automatic adjustment means adjusts the light-emission amount of said light-emission unit on the basis of an output from said light-reception unit which is obtained when said vibration reduction optical system is moved within the movable range.

3. A device according to claim 2, wherein said light-emission amount automatic adjustment means adjusts the light-emission amount of said light-emission unit on the basis of an output from said light-reception unit which is obtained when said vibration reduction optical system is moved to at least one end of the movable range.

4. A device according to claim 3, wherein said light-emission amount automatic adjustment means changes, when said vibration reduction optical system is moved to at least one end of the movable range, the light-emission amount of said light-emission unit and adjusts an output from said light-reception unit so as not to saturate the output from said light-reception unit.

5. A device according to claim 1, wherein said light-emission unit comprises a light-emitting element and a plurality of resistors, each of which has one terminal commonly connected to said light-emitting element and the other terminal which is not connected to said light-emitting element and receives a digital signal, thereby changing the light-emission amount.

6. A device according to claim 1, wherein the predetermined time is a time in response to a user operation.

7. A device according to claim 1, wherein the predetermined time is a time at which a battery is loaded in said image vibration reduction device.

8. A device according to claim 1, wherein the predetermined time is a time at which a state of a main switch of said device changes.

9. A device according to claim 1, wherein said device is applied to a camera, and the predetermined time is a time at which a release button of said camera is depressed to a half-stroke position.

10. A device according to claim 1, wherein said device is applied to a camera, and the predetermined time is a time at which a release button of said camera is depressed to a full-stroke position.

11. A device according to claim 1, wherein said device is applied to a camera, and the predetermined time is a time immediately before exposure.

12. An image vibration reduction device for reducing an image vibration on an imaging surface, comprising:
- a vibration reduction optical system movable to reduce the image vibration and constituting part of an imaging optical system;
- a vibration reduction optical system displacement detector including a light-emission unit and a light-reception unit using an optical position detection element to optically detect a change in position of said vibration reduction optical system;
- a light-reception unit output detector for detecting an output of said light-reception unit when a light-emission amount of said light-emission unit is set zero at a predetermined time; and
- displacement correction means for correcting an output from said vibration reduction optical system displacement detector using an output from said light-reception unit output detector.

13. A device according to claim 12, wherein the predetermined time is a time in response to a user operation.

14. A device according to claim 12, wherein the predetermined time is a time at which a battery is loaded in said image vibration reduction device.

15. A device according to claim 12, wherein the predetermined time is a time at which a state of a main switch of said device changes.

16. A device according to claim 12, wherein said device is applied to a camera, and the predetermined time is a time at which a release button of said camera is depressed to a half-stroke position.

17. A device according to claim 12, wherein said device is applied to a camera, and the predetermined time is a time at which a release button of said camera is depressed to a full-stroke position.

18. A device according to claim 12, wherein said device is applied to a camera, and the predetermined time is a time immediately before exposure.

19. An image vibration reduction device applied to an image taking apparatus for forming an image, comprising:
- a vibration reduction optical system which moves within a predetermined movable range so as to reduce an image vibration caused by a vibration of an image taking apparatus;
- a vibration reduction optical system displacement detector for optically detecting a displacement of said vibration reduction optical system;
- adjustment value calculation means for calculating adjustment values for calculating a position of said vibration reduction optical system at a predetermined time in accordance with outputs from said vibration reduction optical system displacement detector at one end and the other end of the predetermined movable range; and
- vibration reduction optical system position calculation means for calculating a position of said vibration reduction optical system on the basis of at least an output from said vibration reduction optical system displacement detector and the adjustment values from said position detection automatic adjustment means.

20. A device according to claim 19, wherein the predetermined time is a time in response to a user operation.

21. A device according to claim 19, wherein the predetermined time is a time at which a battery is loaded in said image vibration reduction device.

22. A device according to claim 19, wherein the predetermined time is a time at which a state of a main switch of said device changes.

23. A device according to claim 19, wherein said device is applied to a camera, and the predetermined time is a time at which a release button of said camera is depressed to a half-stroke position.

24. A device according to claim 19, wherein said device is applied to a camera, and the predetermined time is a time at which a release button of said camera is depressed to a full-stroke position.

25. A device according to claim 19, wherein said device is applied to a camera, and the predetermined time is a time immediately before exposure.

26. An image vibration reduction device for reducing an image vibration on an imaging surface, comprising:
- a vibration reduction optical system movable to reduce the image vibration and constituting part of an imaging optical system;
- a drive unit for driving and moving said vibration reduction optical system to reduce the image vibration;
- a position detection unit for detecting a position of said vibration reduction optical system; and
- calibration means for moving said vibration reduction optical system a plurality of times within a predetermined range to calibrate said position detection unit.

27. A device according to claim 26, wherein said calibration means moves said vibration reduction optical means a plurality of times within the predetermined range to obtain a plurality of calibration values.

28. A device according to claim 27, wherein said calibration means determines that said position detection unit or said drive unit is not normally operated when a predetermined number of calibration values of the plurality of calibration values fall outside the predetermined range.

29. A device according to claim 27, wherein said calibration means defines an average value of the plurality of calibration values as a calibration value.

30. A device according to claim 27, wherein said calibration means determines that said position detection unit or said drive unit is not normally operated when a difference between the plurality of calibration values is larger than a predetermined value.

31. An adjustment method for an image vibration reduction device for reducing an image vibration on an imaging surface, said image vibration reduction device including a vibration reduction optical system movable to reduce the image vibration and constituting part of an imaging optical system, and a vibration reduction optical system displacement detector including a light-emission unit and a light-reception unit using an optical position detection element to optically detect a change in position of said vibration reduction optical system, comprising the step of:
- adjusting a light-emission amount of said light-emission unit at a predetermined time on the basis of an output from said light-reception unit.

32. A method according to claim 31, wherein a movable range of said vibration reduction optical system is limited, and the step of adjusting a light-emission amount comprises adjusting the light-emission amount of said light-emission unit on the basis of an output from said light-reception unit which is obtained when said vibration reduction optical system is moved within the movable range.

33. A method according to claim 32, wherein the step of adjusting a light-emission amount comprises adjusting the light-emission amount of said light-emission unit on the basis of an output from said light-reception unit which is obtained when said vibration reduction optical system is moved to at least one end of the movable range.

34. A method according to claim 33, wherein the step of adjusting a light-emission amount changing the light-emission amount of said light-emission unit when said vibration reduction optical system is moved to at least one end of the movable range and adjusting an output from said light-reception unit so as not to saturate the output from said light-reception unit.

35. A method according to claim 31, wherein said light-emission unit comprises a light-emitting element and a plurality of resistors, each of which has one terminal commonly connected to said light-emitting element and the other terminal which is not connected to said light-emitting element and receives a digital signal, thereby changing the light-emission amount.

36. A method according to claim 31, wherein the predetermined time is a time in response to a user operation.

37. A method according to claim 31, wherein the predetermined time is a time at which a battery is loaded in said image vibration reduction device.

38. A method according to claim 31, wherein the predetermined time is a time at which a state of a main switch of said device changes.

39. A method according to claim 31, wherein said device is applied to a camera, and the predetermined time is a time at which a release button of said camera is depressed to a half-stroke position.

40. A method according to claim 31, wherein said device is applied to a camera, and the predetermined time is a time at which a release button of said camera is depressed to a full-stroke position.

41. A method according to claim 31, wherein said device is applied to a camera, and the predetermined time is a time immediately before exposure.

42. A control method for an image vibration reduction device for reducing an image vibration on an imaging surface, said image vibration reduction device including a vibration reduction optical system movable to reduce the image vibration and constituting part of an imaging optical system, and a vibration reduction optical system displacement detector including a light-emission unit and a light-reception unit using an optical position detection element to optically detect a change in position of said vibration reduction optical system, comprising the steps of:

detecting an output of said light-reception unit when a light-emission amount of said light-emission unit is set zero at a predetermined time; and correcting an output from said vibration reduction optical system displacement detector using an output from said light-reception unit output detector.

43. A method according to claim 42, wherein the predetermined time is a time in response to a user operation.

44. A method according to claim 42, wherein the predetermined time is a time at which a battery is loaded in said image vibration reduction device.

45. A method according to claim 42, wherein the predetermined time is a time at which a state of a main switch of said device changes.

46. A method according to claim 42, wherein said device is applied to a camera, and the predetermined time is a time at which a release button of said camera is depressed to a half-stroke position.

47. A method according to claim 42, wherein said device is applied to a camera, and the predetermined time is a time at which a release button of said camera is depressed to a full-stroke position.

48. A method according to claim 42, wherein said device is applied to a camera, and the predetermined time is a time immediately before exposure.

49. A control method for an image vibration reduction device for reducing an image vibration on an imaging surface by moving a vibration reduction optical system which is movable within a predetermined movable range and constitutes part of an imaging optical system, comprising the steps of:

optically detecting a displacement of said vibration reduction optical system;

calculating adjustment values for calculating a position of said vibration reduction optical system at a predetermined time on the basis of the displacement detection results obtained when said vibration reduction optical system is located at one end and the other end of the predetermined movable range; and calculating a position of said vibration reduction optical system on the basis of at least the calculated adjustment values and the displacement detection results.

50. A method according to claim 49, wherein the predetermined time is a time in response to a user operation.

51. A method according to claim 49, wherein the predetermined time is a time at which a battery is loaded in said image vibration reduction device.

52. A method according to claim 49, wherein the predetermined time is a time at which a state of a main switch of said device changes.

53. A method according to claim 49, wherein said device is applied to a camera, and the predetermined time is a time at which a release button of said camera is depressed to a half-stroke position.

54. A method according to claim 49, wherein said device is applied to a camera, and the predetermined time is a time at which a release button of said camera is depressed to a full-stroke position.

55. A method according to claim 49, wherein said device is applied to a camera, and the predetermined time is a time immediately before exposure.

56. A control method for an image vibration reduction device including a vibration reduction optical system movable within a predetermined range to reduce an image vibration and constituting part of an imaging optical system, a drive unit for driving and moving said vibration reduction optical system to reduce the image vibration on an imaging surface, and a position detection unit for detecting a position of said vibration reduction optical system, comprising the step of:

moving said vibration reduction optical system a plurality of times within the predetermined range to calibrate said position detection unit.

57. A method according to claim 56, wherein the step of moving said vibration reduction optical system comprises moving said vibration reduction optical system a plurality of times a plurality of times to obtain a plurality of calibration values.

58. A method according to claim 57, further comprising the step of determining that said position detection unit or said drive unit is not normally operated when a predetermined number of calibration values of the plurality of calibration values fall outside the predetermined range.

59. A method according to claim 57, further comprising the step of defining an average value of the plurality of calibration values as a calibration value.

60. A method according to claim 57, further comprising the step of determining that said position detection unit or said drive unit is not normally operated when a difference between the plurality of calibration values is larger than a predetermined value.

* * * * *